(12) United States Patent
Olson et al.

(10) Patent No.: US 10,828,596 B2
(45) Date of Patent: Nov. 10, 2020

(54) PROMOTED AMMONIUM SALT-PROTECTED ACTIVATED CARBON SORBENT PARTICLES FOR REMOVAL OF MERCURY FROM GAS STREAMS

(71) Applicant: Midwest Energy Emissions Corp., Lewis Center, OH (US)

(72) Inventors: Edwin S. Olson, Grand Forks, ND (US); John Henry Pavlish, East Grand Forks, MN (US); Michael J. Holmes, Thompson, ND (US)

(73) Assignee: Midwest Energy Emissions Corp., Lewis Center, OH (US)

( * ) Notice: Subject to any disclaimer, the term of this patent is extended or adjusted under 35 U.S.C. 154(b) by 0 days.

(21) Appl. No.: 15/382,114

(22) Filed: Dec. 16, 2016

(65) Prior Publication Data

US 2017/0100692 A1    Apr. 13, 2017

Related U.S. Application Data

(60) Continuation-in-part of application No. 14/195,360, filed on Mar. 3, 2014, now Pat. No. 9,669,355, and a
(Continued)

(51) Int. Cl.
*B01D 53/06* (2006.01)
*B01J 20/20* (2006.01)
(Continued)

(52) U.S. Cl.
CPC ............. *B01D 53/08* (2013.01); *B01D 53/02* (2013.01); *B01D 53/06* (2013.01); *B01D 53/10* (2013.01);
(Continued)

(58) Field of Classification Search
CPC ........ B01D 53/02; B01D 53/04; B01D 53/06; B01D 53/08; B01D 53/10; B01D 53/64;
(Continued)

(56) References Cited

U.S. PATENT DOCUMENTS 1,984,164 A    12/1934    Stock
2,317,857 A    4/1943    Soday
(Continued)

FOREIGN PATENT DOCUMENTS

CA    1099490 A    4/1981
CA    2150529 A1    12/1995
(Continued)

OTHER PUBLICATIONS

"Canadian Application Serial No. 2,871,422, Office Action dated Apr. 24, 2018", 4 pgs.
(Continued)

*Primary Examiner* — Frank M Lawrence, Jr.
(74) *Attorney, Agent, or Firm* — Schwegman Lundberg & Woessner, P.A.

(57) ABSTRACT

Promoted ammonium salt-protected activated carbon sorbent particles for removal of mercury from gas streams. A method of separating mercury from a mercury-containing gas stream includes contacting a mercury-containing gas stream with an activated carbon sorbent including promoted ammonium salt-protected activated carbon sorbent particles, to form a mercury-sorbent composition. The method also includes separating at least some of the mercury-sorbent composition from the mercury-containing gas stream, to give a separated gas.

16 Claims, 9 Drawing Sheets

Related U.S. Application Data continuation-in-part of application No. 14/712,558, filed on May 14, 2015, which is a continuation of application No. 13/966,768, filed on Aug. 14, 2013, now Pat. No. 8,821,819, which is a continuation of application No. 13/427,665, filed on Mar. 22, 2012, now Pat. No. 8,512,655, which is a continuation of application No. 12/419,219, filed on Apr. 6, 2009, now Pat. No. 8,168,147, which is a continuation of application No. 12/201,595, filed on Aug. 29, 2008, now abandoned, which is a division of application No. 11/209,163, filed on Aug. 22, 2005, now Pat. No. 7,435,286.

(60) Provisional application No. 61/773,549, filed on Mar. 6, 2013, provisional application No. 60/605,640, filed on Aug. 30, 2004.

(51) Int. Cl.
*B01D 53/08* (2006.01)
*B01J 20/02* (2006.01)
*B01J 20/30* (2006.01)
*B01D 53/64* (2006.01)
*B01D 53/10* (2006.01)
*B01D 53/83* (2006.01)
*B01D 53/02* (2006.01)

(52) U.S. Cl.
CPC ............ *B01D 53/64* (2013.01); *B01D 53/83* (2013.01); *B01J 20/02* (2013.01); *B01J 20/0259* (2013.01); *B01J 20/0288* (2013.01); *B01J 20/20* (2013.01); *B01J 20/3078* (2013.01); *B01J 20/3085* (2013.01); *B01D 2253/102* (2013.01); *B01D 2253/25* (2013.01); *B01D 2257/602* (2013.01); *B01D 2258/0283* (2013.01); *Y10S 95/901* (2013.01)

(58) Field of Classification Search
CPC ............ B01D 53/83; B01D 2253/102; B01D 2253/25; B01D 2257/602; B01D 2259/0283; B01J 20/02; B01J 20/0259; B01J 20/0288; B01J 20/20; B01J 20/3078; B01J 20/3085; Y10S 95/901
USPC ....... 95/134; 96/153; 423/210; 110/345, 203
See application file for complete search history.

(56) References Cited

U.S. PATENT DOCUMENTS

| | | |
|---|---|---|
| 2,456,272 A | 12/1948 | Gregory |
| 3,194,629 A | 7/1965 | Dreibelbis et al. |
| 3,341,185 A | 9/1967 | Kennedy |
| 3,662,523 A | 5/1972 | Revoir et al. |
| 3,786,619 A | 1/1974 | Melkersson et al. |
| 3,826,618 A | 7/1974 | Capuano |
| 3,849,267 A | 11/1974 | Hilgen et al. |
| 3,876,393 A | 4/1975 | Kasai et al. |
| 3,935,708 A | 2/1976 | Harrewijne et al. |
| 4,013,516 A | 3/1977 | Greenfield et al. |
| 4,094,777 A | 6/1978 | Sugier et al. |
| 4,101,631 A | 7/1978 | Ambrosini et al. |
| 4,196,173 A | 4/1980 | DeJong et al. |
| 4,338,896 A | 7/1982 | Papasideris |
| 4,342,192 A | 8/1982 | Heyn et al. |
| 4,500,327 A * | 2/1985 | Nishino .............. B01D 53/02 502/406 |
| 4,530,765 A | 7/1985 | Sabherwal |
| 4,699,896 A | 10/1987 | Sing et al. |
| 4,708,853 A | 11/1987 | Matviya et al. |
| 4,772,455 A | 9/1988 | Izumi et al. |
| 4,786,483 A | 11/1988 | Audeh |
| 4,814,152 A | 3/1989 | Yan |
| 4,820,318 A | 4/1989 | Chang et al. |
| 4,889,698 A | 12/1989 | Moller et al. |
| 4,956,162 A | 9/1990 | Smith et al. |
| 5,245,120 A | 9/1993 | Srinivasachar et al. |
| 5,288,306 A | 2/1994 | Aibe et al. |
| 5,300,137 A | 4/1994 | Weyand et al. |
| 5,336,835 A | 8/1994 | McNamara |
| 5,346,674 A | 9/1994 | Weinwurm et al. |
| 5,409,522 A | 4/1995 | Durham et al. |
| 5,419,834 A | 5/1995 | Straten |
| 5,435,980 A * | 7/1995 | Felsvang ............... B01D 53/10 423/210 |
| 5,462,908 A | 10/1995 | Liang et al. |
| 5,480,619 A | 1/1996 | Johnson et al. |
| 5,500,306 A | 3/1996 | Hsu et al. |
| 5,505,766 A | 4/1996 | Chang |
| 5,556,447 A | 9/1996 | Srinivasachar et al. |
| 5,569,436 A | 10/1996 | Lerner |
| 5,575,982 A | 11/1996 | Reiss et al. |
| 5,607,496 A | 3/1997 | Brooks |
| 5,672,323 A | 9/1997 | Bhat et al. |
| 5,695,726 A | 12/1997 | Lerner |
| 5,785,935 A | 7/1998 | Fristad et al. |
| 5,827,352 A | 10/1998 | Altman et al. |
| 5,891,324 A | 4/1999 | Ohtsuka |
| 6,001,762 A | 12/1999 | Harmer et al. |
| 6,013,593 A | 1/2000 | Lee et al. |
| 6,027,551 A | 2/2000 | Hwang et al. |
| 6,074,974 A | 6/2000 | Lee et al. |
| 6,080,281 A | 6/2000 | Attia |
| 6,103,205 A | 8/2000 | Wojtowicz et al. |
| 6,136,072 A | 10/2000 | Sjostrom et al. |
| 6,136,749 A | 10/2000 | Gadkaree et al. |
| 6,214,304 B1 | 4/2001 | Rosenthal et al. |
| 6,258,334 B1 | 7/2001 | Gadkaree et al. |
| 6,284,199 B1 | 9/2001 | Downs et al. |
| 6,342,462 B1 | 1/2002 | Kulprathipanja |
| 6,372,187 B1 | 4/2002 | Madden et al. |
| 6,375,909 B1 | 4/2002 | Dangtran et al. |
| 6,383,981 B1 | 5/2002 | Blankenship et al. |
| 6,471,936 B1 | 10/2002 | Chen et al. |
| 6,475,451 B1 | 11/2002 | Leppin et al. |
| 6,475,471 B1 | 11/2002 | Wehrli |
| 6,528,030 B2 | 3/2003 | Madden et al. |
| 6,558,454 B1 | 5/2003 | Chang et al. |
| 6,576,585 B2 | 6/2003 | Fischer et al. |
| 6,579,507 B2 | 6/2003 | Pahlman et al. |
| 6,596,661 B2 | 7/2003 | Neufert |
| 6,610,263 B2 | 8/2003 | Pahlman et al. |
| 6,638,485 B1 | 10/2003 | Iida et al. |
| 6,719,828 B1 | 4/2004 | Lovell |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,960,329 B2 | 11/2005 | Sellakumar |
| 7,017,330 B2 | 3/2006 | Bellows |
| 7,081,434 B2 | 7/2006 | Sinha |
| 7,124,591 B2 | 10/2006 | Baer et al. |
| 7,211,707 B2 | 5/2007 | Axtell et |
| 7,247,279 B2 | 7/2007 | Pahlman et al. |
| 7,293,414 B1 | 11/2007 | Huber |
| 7,361,209 B1 | 4/2008 | Durham et al. |
| 7,435,286 B2 | 10/2008 | Olson et al. |
| 7,442,239 B2 | 10/2008 | Armstrong et al. |
| 7,479,263 B2 | 1/2009 | Chang et al. |
| 7,514,052 B2 * | 4/2009 | Lissianski ............. B01D 53/56 423/210 |
| 7,521,032 B2 | 4/2009 | Honjo et al. |
| 7,544,338 B2 | 6/2009 | Honjo et al. |
| 7,563,311 B2 | 7/2009 | Graham |
| 7,611,564 B2 | 11/2009 | Mcchesney et al. |
| 7,622,092 B2 | 11/2009 | Honjo et al. |
| 7,722,843 B1 | 5/2010 | Srinivasachar |
| 7,767,174 B2 | 8/2010 | Liu et al. |

(56) References Cited

U.S. PATENT DOCUMENTS

| | | |
|---|---|---|
| 7,780,765 B2 | 8/2010 | Srinivasachar et al. |
| 7,938,571 B1 | 5/2011 | Irvine |
| 7,942,566 B1 | 5/2011 | Irvine |
| 8,007,749 B2 | 8/2011 | Chang et al. |
| 8,080,088 B1* | 12/2011 | Srinivasachar ........ B01D 53/02 502/417 |
| 8,168,147 B2 | 5/2012 | Olson et al. |
| 8,168,149 B2 | 5/2012 | Gal et al. |
| 8,173,566 B2 | 5/2012 | Olson et al. |
| 8,216,535 B2 | 7/2012 | Pollack et al. |
| 8,512,655 B2 | 8/2013 | Olson et al. |
| 8,652,235 B2 | 2/2014 | Olson et al. |
| 8,821,819 B2 | 9/2014 | Olson et al. |
| 9,011,805 B2 | 4/2015 | Olson et al. |
| 9,468,886 B2 | 10/2016 | Olson et al. |
| 9,669,355 B2 | 6/2017 | Olson et al. |
| 10,130,930 B2 | 11/2018 | Olson |
| 10,343,114 B2 | 7/2019 | Olson et al. |
| 10,471,412 B2 | 11/2019 | Olson et al. |
| 10,589,225 B2 | 3/2020 | Olson et al. |
| 10,596,517 B2 | 3/2020 | Olson et al. |
| 10,668,430 B2 | 6/2020 | Olson et al. |
| 2001/0002387 A1 | 5/2001 | Tsutsumi et al. |
| 2001/0003116 A1 | 6/2001 | Neufert |
| 2002/0033097 A1 | 3/2002 | El-Shoubary et al. |
| 2002/0043496 A1 | 4/2002 | Boddu et al. |
| 2002/0114749 A1 | 8/2002 | Cole |
| 2002/0134242 A1 | 9/2002 | Yang et al. |
| 2002/0150516 A1* | 10/2002 | Pahlman ................ B01D 53/06 422/171 |
| 2003/0057293 A1 | 3/2003 | Boecking |
| 2003/0104937 A1 | 6/2003 | Sinha |
| 2003/0113239 A1 | 6/2003 | Pahlman et al. |
| 2003/0136509 A1 | 7/2003 | Virtanen |
| 2003/0161771 A1 | 8/2003 | Oehr |
| 2003/0206843 A1 | 11/2003 | Nelson, Jr. |
| 2003/0206846 A1 | 11/2003 | Jangbarwala |
| 2004/0003716 A1 | 1/2004 | Nelson, Jr. |
| 2004/0013589 A1 | 1/2004 | Vosteen et al. |
| 2004/0076570 A1 | 4/2004 | Jia |
| 2004/0086439 A1 | 5/2004 | Vosteen et al. |
| 2004/0109800 A1 | 6/2004 | Pahlman et al. |
| 2004/0244657 A1 | 12/2004 | Srinivasachar et al. |
| 2005/0000197 A1 | 1/2005 | Krantz |
| 2005/0019240 A1 | 1/2005 | Lu et al. |
| 2005/0074380 A1 | 4/2005 | Boren et al. |
| 2005/0147549 A1 | 7/2005 | Lissianski et al. |
| 2005/0227146 A1 | 10/2005 | Ghantous et al. |
| 2005/0274307 A1 | 12/2005 | Lissianski et al. |
| 2006/0048646 A1 | 3/2006 | Olson et al. |
| 2006/0057044 A1 | 3/2006 | Chang et al. |
| 2006/0112823 A1 | 6/2006 | Avina |
| 2006/0191835 A1 | 8/2006 | Petrik et al. |
| 2006/0204418 A1 | 9/2006 | Chao et al. |
| 2007/0167309 A1 | 7/2007 | Olson |
| 2007/0168213 A1 | 7/2007 | Comrie |
| 2007/0180990 A1 | 8/2007 | Downs et al. |
| 2007/0234902 A1 | 10/2007 | Fair et al. |
| 2007/0259781 A1 | 11/2007 | Sinha |
| 2007/0295347 A1 | 12/2007 | Paine, III et al. |
| 2008/0090951 A1 | 4/2008 | Mao et al. |
| 2008/0107579 A1 | 5/2008 | Downs et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0292512 A1 | 11/2008 | Kang |
| 2009/0031708 A1 | 2/2009 | Schmidt |
| 2009/0062119 A1 | 3/2009 | Olson et al. |
| 2009/0081092 A1 | 3/2009 | Yang et al. |
| 2009/0136401 A1 | 5/2009 | Yang et al. |
| 2009/0235848 A1 | 9/2009 | Eiteneer et al. |
| 2009/0297413 A1 | 12/2009 | Olson et al. |
| 2009/0320678 A1 | 12/2009 | Chang et al. |
| 2010/0024642 A1 | 2/2010 | Fukumoto et al. |
| 2010/0047146 A1 | 2/2010 | Olson et al. |
| 2011/0076210 A1 | 3/2011 | Pollack et al. |
| 2011/0168018 A1 | 7/2011 | Mohamadalizadeh et al. |
| 2012/0100053 A1 | 4/2012 | Durham et al. |
| 2012/0183458 A1 | 7/2012 | Olson et al. |
| 2013/0157845 A1 | 6/2013 | Nalepa et al. |
| 2013/0280156 A1 | 10/2013 | Olson et al. |
| 2014/0056787 A1 | 2/2014 | Olson et al. |
| 2014/0099244 A1 | 4/2014 | Olson et al. |
| 2014/0224121 A1 | 8/2014 | Mimna et al. |
| 2014/0255279 A1 | 9/2014 | Olson et al. |
| 2014/0308188 A1 | 10/2014 | Olson et al. |
| 2015/0098878 A1 | 4/2015 | Olson |
| 2015/0246315 A1 | 9/2015 | Olson et al. |
| 2017/0056853 A1* | 3/2017 | Mimna .................. B01D 53/64 |
| 2017/0128908 A1 | 5/2017 | Olson et al. |
| 2017/0173524 A1 | 6/2017 | Olson et al. |
| 2017/0173557 A1 | 6/2017 | Olson et al. |
| 2017/0239644 A1 | 8/2017 | Olson et al. |
| 2018/0133646 A1 | 5/2018 | Pavlish et al. |
| 2018/0229182 A1 | 8/2018 | Olson et al. |
| 2018/0257030 A1 | 9/2018 | Olson et al. |
| 2018/0257031 A1 | 9/2018 | Olson et al. |
| 2018/0280870 A1 | 10/2018 | Olson et al. |
| 2019/0009247 A1 | 1/2019 | Olson et al. |
| 2019/0329179 A1 | 10/2019 | Olson et al. |
| 2019/0329215 A1 | 10/2019 | Olson et al. |
| 2019/0336913 A1 | 11/2019 | Olson et al. |
| 2020/0009532 A1 | 1/2020 | Olson et al. |

FOREIGN PATENT DOCUMENTS

| | | |
|---|---|---|
| CA | 2327602 A1 | 6/2001 |
| CA | 2400898 A1 | 8/2001 |
| CA | 2584327 A1 | 4/2006 |
| CA | 2757309 | 10/2010 |
| CA | 2757309 | 1/2017 |
| CN | 1048173 A | 1/1991 |
| CN | 101048218 A | 10/2007 |
| CN | 101816922 A | 9/2010 |
| CN | 105188910 A | 12/2015 |
| CN | 104619410 B | 5/2016 |
| CN | 107661744 | 2/2018 |
| DE | 3426059 A1 | 1/1986 |
| DE | 3816600 A1 | 11/1989 |
| DE | 10233173 A1 | 2/2004 |
| DE | 202012003747 U1 | 11/2012 |
| EP | 0208490 A1 | 1/1987 |
| EP | 1386655 A1 | 2/2004 |
| EP | 1458474 | 9/2004 |
| EP | 1570894 A1 | 9/2005 |
| FR | 2529802 | 1/1984 |
| GB | 2122916 A | 1/1984 |
| JP | 4953590 A | 5/1974 |
| JP | 4953593 A | 5/1974 |
| JP | 4966592 A | 6/1974 |
| JP | 4943197 B4 | 11/1974 |
| JP | 506438 B4 | 3/1975 |
| JP | 51003386 A | 1/1976 |
| JP | 50145324 A | 3/1980 |
| JP | 09256812 | 9/1997 |
| KR | 1020027006149 | 7/2002 |
| SU | 732207 A1 | 5/1980 |
| SU | 1163982 A | 6/1985 |
| WO | WO-0162368 A1 | 8/2001 |
| WO | WO-0228513 A2 | 4/2002 |
| WO | WO-03072241 A1 | 9/2003 |
| WO | WO-2004089501 A2 | 10/2004 |
| WO | WO-2004094024 A2 | 11/2004 |
| WO | WO-2006039007 A2 | 4/2006 |
| WO | WO-2006039007 A3 | 4/2006 |
| WO | WO-2006099611 A1 | 9/2006 |
| WO | WO-2009018539 A3 | 2/2009 |
| WO | WO-2010123609 A1 | 10/2010 |
| WO | WO-2012030560 A1 | 3/2012 |
| WO | WO-2013162968 A2 | 10/2013 |

(56) References Cited

FOREIGN PATENT DOCUMENTS

WO    WO-2013162968 A3    10/2013
WO    WO-2014137907 A2    9/2014

OTHER PUBLICATIONS

"U.S. Appl. No. 15/295,594, Restriction Requirement dated Jun. 29, 2018", 5 pgs.
"U.S. Appl. No. 15/978,760, Non Final Office Action dated Jun. 29, 2018", 9 pgs.
"U.S. Appl. No. 15/295,594, Response filed Jul. 3, 2018 to Restriction Requirement dated May 22, 2018", 9 pgs.
"U.S. Appl. No. 15/449,112, Notice of Allowance dated Jul. 12, 2018", 8 pgs.
"U.S. Appl. No. 15/978,760 , Response filed Jul. 13, 2018 to Non Final Office Action dated Jun. 29, 2018", 12 pgs.
"U.S. Appl. No. 14/712,558, Non Final Office Action dated Jul. 2, 2018", 16 pgs.
"Chinese Application Serial No. 201480025701.9, Response filed Mar. 27, 2018 to Office Action dated Jan. 16, 2018", w English Claims, 20 pgs.
"Canadian Application Serial No. 2,871,422, Response filed Feb, 26, 2018 to Office Action dated Aug. 31, 2017", w Amended Claims, 53 pgs.
"Chinese Application Serial No. 201480025701.9, Office Action dated Jan. 16, 2018", (English Translation), 8 pgs.
"Canadian Application Serial No. 2,871,422, Office Action dated Aug. 31, 2017", 4 pgs.
"Canadian Application Serial No. 2,871,422, Response filed Jun. 21, 2017 to Office Action dated Dec. 22, 2016", 41 pgs.
"Supplementary European Search Report, dated Dec. 6, 2012", 2 pgs.
"European Application Serial No. 13719338.9, Notification Regarding Rule 164 and Article 94(3) EPC dated Apr. 24, 2017", 8 pgs.
"Response filed Sep. 4, 2017 to Notification Regarding Rule 164 and Article 94(3) EPC dated Apr. 24, 2017", 7 pgs.
"Database WPI Week 197450", Thomson Scientific, London, GB; AN 1974-86199V XP002514926.
U.S. Appl. No. 15/853,029, filed Dec. 22, 2017, Sorbents for the Oxidation and Removal of Mercury.
U.S. Appl. No. 15/997,091, filed Jun. 4, 2018, Sorbents for the Oxidation and Removal of Mercury.
U.S. Appl. No. 15/951,970, filed Apr. 12, 2018, Sorbents for the Oxidation and Removal of Mercury.
U.S. Appl. No. 15/974,343, filed May 8, 2018, Sorbents for the Oxidation and Removal of Mercury.
U.S. Appl. No. 15/978,760, filed May 14, 2018, Sorbents for the Oxidation and Removal of Mercury.
"U.S. Appl. No. 14/712,558, Supplemental Preliminary Amendment filed May 15, 2015", 6 pgs.
"U.S. Appl. No. 14/712,558, Advisory Action dated Feb. 12, 2018", 8 pgs.
"U.S. Appl. No. 15/449,112, Final Office Action dated Feb. 15, 2018", 13 pgs.
"U.S. Appl. No. 14/712,558, Examiner Interview Summary dated Mar. 5, 2018", 3 pgs.
"U.S. Appl. No. 15/589,359, Non Final Office Action dated Feb. 21, 2018", 15 pgs.
"U.S. Appl. No. 14/712,558, Response filed Jan. 23, 2018 to Final Office Action dated Dec. 6, 2017", 13 pgs.
"U.S. Appl. No. 15/449,112, Response filed Jan. 16, 2018 to Non Final Office Action dated Sep. 27, 2017", 16 pgs.
Zhu, Jianzhong, "Enhanced mercury ion adsorption by amine-modified activated carbon", Journal of hazardous materials 166, (2009), 866-872.
"U.S. Appl. No. 15/589,359, Preliminary Amendment filed Jan. 3, 2018", 6 pgs.
"U.S. Appl. No. 14/712,558, Final Office Action dated Dec. 6, 2017", 9 pgs.

"U.S. Appl. No. 10/554,018 Response filed Nov. 1, 2010 to Final Office Action dated Apr. 27, 2010", 17 pgs.
"U.S. Appl. No. 10/554,018, Final Office Action dated Apr. 27, 2010", 8 pgs.
"U.S. Appl. No. 10/554,018, Non Final Office Action dated Oct. 6, 2009", 8 pgs.
"U.S. Appl. No. 10/554,018, Notice of Allowance dated Jan. 19, 2012", 7 pgs.
"U.S. Appl. No. 10/554,018, Response filed Feb. 8, 2010 to Non Final Office Action dated Oct. 6, 2009", 9 pgs.
"U.S. Appl. No. 10/554,018, Response filed Aug. 10, 2009 to Restriction Requirement dated Jun. 9, 2009", 1 pg.
"U.S. Appl. No. 10/554,018, Restriction Requirement dated Jun. 9, 2009", 5 pgs.
"U.S. Appl. No. 11/209,163, Advisory Action dated Apr. 21, 2008", 3 pgs.
"U.S. Appl. No. 11/209,163, Final Office Action dated Jan. 23, 2008", 20 pgs.
"U.S. Appl. No. 11/209,163, Non Final Office Action dated Aug. 13, 2007", 14 pgs.
"U.S. Appl. No. 11/209,163, Notice of Allowance dated Jul. 14, 2008", 7 pgs.
"U.S. Appl. No. 11/209,163, Preliminary Amendment filed Feb. 27, 2007", 9 pgs.
"U.S. Appl. No. 11/209,163, Response filed Mar. 24, 2008 to Final Office Action dated Jan. 23, 2008", 29 pgs.
"U.S. Appl. No. 11/209,163, Response filed Jul. 9, 2007 to Restriction Requirement dated Jun. 7, 2007", 2 pgs.
"U.S. Appl. No. 11/209,163, Response filed Nov. 13, 2007 to Non Final Office Action dated Aug. 13, 2007", 19 pgs.
"U.S. Appl. No. 11/209,163, Restriction Requirement dated Jun. 7, 2007", 6 pgs.
"U.S. Appl. No. 12/184,860, Examiner Interview Summary dated Apr. 5, 2011", 3 pgs.
"U.S. Appl. No. 12/184,860, Final Office Action dated May 11, 2011", 15 pgs.
"U.S. Appl. No. 12/184,860, Non Final Office Action dated Jan. 19, 2011", 14 pgs.
"U.S. Appl. No. 12/184,860, Response filed Apr. 7, 2011 to Non Final Office Action dated Jan. 19, 2011", 12 pgs.
"U.S. Appl. No. 12/184,860, Response filed Jul. 8, 2011 to Final Office Action dated May 11, 2011", 11 pgs.
"U.S. Appl. No. 12/201,595, Final Office Action dated Mar. 10, 2010", 13 pgs.
"U.S. Appl. No. 12/201,595, Non Final Office Action dated Apr. 16, 2009", 21 pgs.
"U.S. Appl. No. 12/201,595, Response filed Oct. 16, 2009 to Non Final Office Action dated Apr. 16, 2009", 18 pgs.
"U.S. Appl. No. 12/419,219, Final Office Action dated Oct. 14, 2010", 17 pgs.
"U.S. Appl. No. 12/419,219, Non Final Office Action dated Jan. 15, 2010", 13 pgs.
"U.S. Appl. No. 12/419,219, Non Final Office Action dated Feb. 23, 2011", 17 pgs.
"U.S. Appl. No. 12/419,219, Non Final Office Action dated Aug. 4, 2011", 16 pgs.
"U.S. Appl. No. 12/419,219, Notice of Allowance dated Jan. 10, 2012", 7 pgs.
"U.S. Appl. No. 12/419,219, Preliminary Amendment filed Apr. 6, 2009", 7 pgs.
"U.S. Appl. No. 12/419,219, Response filed Feb. 14, 2011 to Final Office Action dated Oct. 14, 2010", 19 pgs.
"U.S. Appl. No. 12/419,219, Response filed May 20, 2011 to Non Final Office Action dated Feb. 23, 2011", 14 pgs.
"U.S. Appl. No. 12/419,219, Response filed Jul. 15, 2010 to Non Final Office Action dated Jan. 15, 2010", 22 pgs.
"U.S. Appl. No. 12/419,219, Response filed Oct. 27, 2011 to Non Final Office Action dated Aug. 4, 2011", 12 pgs.
"U.S. Appl. No. 12/429,058, Advisory Action dated May 29, 2012", 3 pgs.
"U.S. Appl. No. 12/429,058, Ex Parte Quayle Action dated Feb. 14, 2013", 7 pgs.

(56) References Cited

OTHER PUBLICATIONS

"U.S. Appl. No. 12/429,058, Examiner Interview Summary dated Dec. 28, 2012", 4 pgs.
"U.S. Appl. No. 12/429,058, Final Office Action dated Oct. 31, 2012", 21 pgs.
"U.S. Appl. No. 12/429,058, Final Office Action dated Dec. 20, 2011", 21 pgs.
"U.S. Appl. No. 12/429,058, Non Final Office Action dated Jun. 11, 2012", 18 pgs.
"U.S. Appl. No. 12/429,058, Non Final Office Action dated Jul. 19, 2011", 20 pgs.
"U.S. Appl. No. 12/429,058, Notice of Allowance dated Jan. 16, 2014", 5 pgs.
"U.S. Appl. No. 12/429,058, Notice of Allowance dated Sep. 11, 2013", 11 pgs.
"U.S. Appl. No. 12/429,058, Response filed Jan. 31, 2013 to Final Office Action dated Oct. 31, 2012", 19 pgs.
"U.S. Appl. No. 12/429,058, Response filed Mar. 7, 2013 to Ex Parte Quayle Action dated Feb. 14, 2013", 7 pgs.
"U.S. Appl. No. 12/429,058, Response filed May 11, 2012 to Final Office Action dated Dec. 20, 2011", 11 pgs.
"U.S. Appl. No. 12/429,058, Response filed Sep. 11, 2012 to Non Final Office Action dated Jun. 11, 2012", 16 pgs.
"U.S. Appl. No. 12/429,058, Response filed Oct. 18, 2011 to Non Final Office Action dated Jul. 19, 2011", 17 pgs.
"U.S. Appl. No. 13/427,665, Non Final Office Action dated Jan. 4, 2013", 23 pgs.
"U.S. Appl. No. 13/427,665, Non Final Office Action dated Aug. 3, 2012", 12 pgs.
"U.S. Appl. No. 13/427,665, Notice of Allowance dated Apr. 16, 2013", 8 pgs.
"U.S. Appl. No. 13/427,665, Response filed Mar. 21, 2013 to Non Final Office Action dated Jan. 4, 2013", 20 pgs.
"U.S. Appl. No. 13/427,665, Response filed Oct. 10, 2012 to Non Final Office Action dated Aug. 3, 2012", 15 pgs.
"U.S. Appl. No. 13/427,685, Preliminary Amendment filed Mar. 22, 2012", 3 pgs.
"U.S. Appl. No. 13/453,274, Advisory Action dated Nov. 24, 2014", 3 pgs.
"U.S. Appl. No. 13/453,274, Final Office Action dated Oct. 16, 2014", 4 pgs.
"U.S. Appl. No. 13/453,274, Non Final Office Action dated May 30, 2014", 6 pgs.
"U.S. Appl. No. 13/453,274, Notice of Allowance dated Jan. 5, 2015", 5 pgs.
"U.S. Appl. No. 13/453,274, Response filed Sep. 2, 2014 to Non Final Office Action dated May 30, 2014", 13 pgs.
"U.S. Appl. No. 13/453,274, Response filed Nov. 6, 2014 to Final Office Action dated Oct. 16, 2014", 7 pgs.
"U.S. Appl. No. 13/453,274, Response filed Dec. 9, 2014 to Advisory Action dated Nov. 24, 2014", 6 pgs.
"U.S. Appl. No. 13/966,768, Non Final Office Action dated Dec. 6, 2013", 7 pgs.
"U.S. Appl. No. 13/966,768, Notice of Allowability dated Aug. 1, 2014", 6 pgs.
"U.S. Appl. No. 13/966,768, Notice of Allowance dated Apr. 18, 2014", 7 pgs.
"U.S. Appl. No. 13/966,768, Preliminary Amendment filed Aug. 14, 2013", 3 pgs.
"U.S. Appl. No. 13/966,768, Response filed Mar. 6, 2014 to Non Final Office Action dated Dec. 6, 2013", 6 pgs.
"U.S. Appl. No. 13/966,768, Supplemental Preliminary Amendment filed Aug. 15, 2013", 6 pgs.
"U.S. Appl. No. 14/102,896, Advisory Action dated Dec. 16, 2015", 3 pgs.
"U.S. Appl. No. 14/102,896, Final Office Action dated Aug. 26, 2015", 12 pgs.
"U.S. Appl. No. 14/102,896, Non Final Office Action dated Mar. 23, 2015", 13 pgs.
"U.S. Appl. No. 14/102,896, Notice of Allowance dated Jun. 10, 2016", 7 pgs.
"U.S. Appl. No. 14/102,896, Response filed Jan. 22, 2016 to Advisory Action dated Dec. 16, 2015", 11 pgs.
"U.S. Appl. No. 14/102,896, Response filed Jun. 22, 2015 to Non Final Office Action dated Mar. 23, 2015", 10 pgs.
"U.S. Appl. No. 14/102,896, Response filed Nov. 24, 2015 to Final Office Action dated Aug. 26, 2015", 5 pgs.
"U.S. Appl. No. 14/195,360, Corrected Notice of Allowance dated Feb. 27, 2017", 2 pgs.
"U.S. Appl. No. 14/195,360, Corrected Notice of Allowance dated Mar. 29, 2017", 2 pgs.
"U.S. Appl. No. 14/195,360, Final Office Action dated Mar. 18, 2016", 18 pgs.
"U.S. Appl. No. 14/195,360, Final Office Action dated Nov. 22, 2016", 7 pgs.
"U.S. Appl. No. 14/195,360, Non Final Office Action dated Jun. 20, 2016", 11 pgs.
"U.S. Appl. No. 14/195,360, Non Final Office Action dated Nov. 24, 2015", 19 pgs.
"U.S. Appl. No. 14/195,360, Notice of Allowance dated Feb. 27, 2017", 5 pgs.
"U.S. Appl. No. 14/195,360, Response filed Jan. 18, 2017 to Final Office Action dated Nov. 22, 2016", 7 pgs.
"U.S. Appl. No. 14/195,360, Response filed Feb. 22, 2016 to Non Final Office Action dated Nov. 24, 2015", 21 pgs.
"U.S. Appl. No. 14/195,360, Response filed May 17, 2016 to Final Office Action dated Mar. 18, 2016", 15 pgs.
"U.S. Appl. No. 14/318,270, Advisory Action dated Feb. 17, 2017", 4 pgs.
"U.S. Appl. No. 14/318,270, Final Office Action dated Nov. 25, 2016", 25 pgs.
"U.S. Appl. No. 14/318,270, Non Final Office Action dated Jun. 2, 2016", 24 pgs.
"U.S. Appl. No. 14/318,270, Notice of Allowance dated May 15, 2017", 8 pgs.
"U.S. Appl. No. 14/318,270, Response filed Jan. 25, 2017 to Final Office Action dated Nov. 25, 2016", 14 pgs.
"U.S. Appl. No. 14/318,270, Response filed Feb. 27, 2017 to Final Office Action dated Nov. 25, 2016", 15 pgs.
"U.S. Appl. No. 14/318,270, Response filed Mar. 2, 2016 to Restriction Requirement dated Jan. 14, 2016", 9 pgs.
"U.S. Appl. No. 14/318,270, Response filed Aug. 22, 2016 to Non Final Office Action dated Jun. 2, 2016", 14 pgs.
"U.S. Appl. No. 14/318,270, Restriction Requirement dated Jan. 14, 2016", 8 pgs.
"U.S. Appl. No. 14/564,860, Non Final Office Action dated Jul. 12, 2016", 6 pgs.
"U.S. Appl. No. 14/564,860, Preliminary Amendment filed Dec. 10, 2014", 8 pgs.
"U.S. Appl. No. 14/564,860, Preliminary Amendment filed Dec. 10, 2014", 6 pgs,.
"U.S. Appl. No. 14/564,860, Response filed May 6, 2016 to Restriction Requirement dated Mar. 16, 2016", 9 pgs.
"U.S. Appl. No. 14/564,860, Response filed Oct. 3, 2016 to Non Final Office Action dated Jul. 12, 2016", 11 pgs.
"U.S. Appl. No. 14/564,860, Restriction Requirement dated Mar. 16, 2016", 5 pgs.
"U.S. Appl. No. 14/712,558, Non Final Office Action dated Jul. 6, 2017", 7 pgs.
"U.S. Appl. No. 14/712,558, Response filed Oct. 6, 2017 to Non Final Office Action dated Jul. 6, 2017", 12 pgs.
"U.S. Appl. No. 15/295,594, Preliminary Amendment filed Jan. 26, 2017", 8 pgs.
"U.S. Appl. No. 15/295,594, Preliminary Amendment filed Jun. 13, 2017", 7 pgs.
"U.S. Appl. No. 15/449,112, Non Final Office Action dated Sep. 27, 2017", 17 pgs.
"Application Serial No. PCT/US04/12828, International Search Report dated Oct. 22, 2004", 2 pgs.
"Application Serial No. PCT/US2014/019916, International Preliminary Report on Patentability dated Sep. 17, 2015", 14 pgs.

(56) References Cited

OTHER PUBLICATIONS

"U.S. Appl. No. 14/195,360, Response filed Sep. 16, 2016 to Non Final Office Action dated Jun. 30, 2016", 12 pgs.
"Bromine and its Compounds", Jolles, Z. E., Editor, Academic Press, Inc. New York, NY, (1966), pp. 193 and 205.
"Canadian Application Serial No. 2,523,132, Office Action dated Jul. 18, 2011", 3 pgs.
"Canadian Application Serial No. 2,523,132, Response filed Jan. 16, 2012 to Office Action dated Jul. 18, 2011", 5 pgs.
"Canadian Application Serial No. 2,584,327, Office Action dated Mar. 3, 2009", 4 pgs.
"Canadian Application Serial No. 2,584,327, Office Action dated Dec. 7, 2009", 2 pgs.
"Canadian Application Serial No. 2,584,327, Response filed Mar. 19, 2010 to Office Action dated Dec. 7, 2009", 8 pgs.
"Canadian Application Serial No. 2,584,327, Response filed Sep. 2, 2009 to Office Action dated Mar. 3, 2009", 21 pgs.
"Canadian Application Serial No. 2,707,363, First Examiners Report Received Jun. 16, 2011", 2 pgs.
"Canadian Application Serial No. 2,757,309, Office Action dated Dec. 7, 2015", 3 pgs.
"Canadian Application Serial No. 2,757,309, Response filed Jun. 6, 2016 to Office Action dated Dec. 7, 2015", 13 pgs.
"Canadian Application Serial No. 2,757,309, Voluntary Amendment filed Jan. 30, 2015", 27 pgs.
"Canadian Application Serial No. 2,871,422, Response filed Feb. 26, 2016 to Office Action dated Sep. 9, 2015", 13 pgs.
"Canadian Application Serial No. 2,871,422, Office Action dated Apr. 2, 2015", 5 pgs.
"Canadian Application Serial No. 2,871,422, Office Action dated Sep. 9, 2015", 3 pgs.
"Canadian Application Serial No. 2,871,422, Response filed Aug. 28, 2015 to Canadian Office Action dated Arp. 2, 2015", 22 pgs.
"Chinese Application Serial No. 200480017704.4, Office Action dated Dec. 8, 2011", (w/ English Translation), 6 pgs.
"Chinese Application Serial No. 200480017704.4, Response filed Jan. 20, 2012 to Office Action dated Dec. 8, 2012", (w/ English Translation of Amended Claims), 10 pgs.
"Chinese Application Serial No. 200580037037.0, Chinese Office Action, dated Jun. 25, 2013 (and English translation)", no english translation, 46 pgs.
"Chinese Application Serial No. 201380033231.6, Office Action dated Sep. 21, 2015", w/ Partial English Translation, 6 pgs.
"Chinese Application Serial No. 201380033231.6, Response filed Jan. 14, 2016 to Office Action dated Sep. 21, 2015", w/English Claims, 7 pgs.
"Chinese Application Serial No. 201480025701.9, Office Action dated Jul. 25, 2016", (With English Translation), 4 pgs.
"Darco® FGD-Powdered Activated Carbon", Norit Americas Inc, Datasheet No. 1100, May 2009), 1 pg.
"European Application Serial No. 05814011.2, Response filed Sep. 9, 2011 to European Search Report dated Apr. 14, 2009 and Office Actioin dated Nov. 5, 2009", 20 pgs.
"European Application Serial No. 05814011.2, Communication Pursuant to Article 94(3) EPC dated Nov. 5, 2009", 4 pgs.
"European Application Serial No. 05814011.2, Decision to grant dated Jun. 8, 2012", 2 pgs.
"European Application Serial No. 05814011.2, Extended European Search Report dated Apr. 14, 2009", 13 pgs.
"European Application Serial No. 05814011.2, Office Action dated Jan. 25, 2008", 2 pgs.
"European Application Serial No. 05814011.2, Office Action dated Jan. 31, 2012", 4 pgs.
"European Application Serial No. 05814011.2, Office Action dated Apr. 27, 2012", 6 pgs.
"European Application Serial No. 05814011.2, Office Action dated Nov. 5, 2009", 2 pgs.
"European Application Serial No. 05814011.2, Partial European Search Report dated Apr. 14, 2009", 13 pgs.
"European Application Serial No. 05814011.2, Response filed Feb. 28, 2012 to Office Action dated Jan. 31, 2012", 30 pgs.
"European Application Serial No. 05814011.2, Response filed Apr. 18, 2008 to Office Action dated Jan. 25, 2008 and Third Party Observations submitted Dec. 4, 2007", 7 pgs.
"European Application Serial No. 05814011.2, Response filed May 11, 2010 to Communication Pursuant to Article 94(3) EPC dated Nov. 5, 2009", 11 pgs.
"European Application Serial No. 05814011.2, Response filed May 11, 2010 to Office Action dated Nov. 5, 2009", 11 pgs.
"European Application Serial No. 05814011.2, Response filed Sep. 9, 2011 to Extended European Search Report dated Apr. 14, 2009", 20 pgs.
"European Application Serial No. 05814011.2, Third Party Observations submitted Mar. 19, 2012", 7 pgs.
"European Application Serial No. 05814011.2, Third Party Observations submitted Dec. 4, 2007", 5 pgs.
"European Application Serial No. 10767465.7, Decision to grant dated Apr. 17, 2014", 2 pgs.
"European Application Serial No. 10767465.7, Extended European Search Report dated Dec. 6, 2012", 5 pgs.
"European Application Serial No. 10767465.7, Intention to Grant dated Mar. 17, 2014", 44 pgs.
"European Application Serial No. 10767465.7, Intention to Grant dated Sep. 30, 2013", 44 pgs.
"European Application Serial No. 10767465.7, Response filed Feb. 3, 2014 to Intention to Grant dated Sep. 30, 2013", 11 pgs.
"European Application Serial No. 10767465.7, Response filed Jun. 20, 2013 to Extended European Search Report dated Dec. 6, 2012", 18 pgs.
"European Application Serial No. 11189249.3, Communication Pursuant to Article 94(3) EPC dated Nov. 26, 2012", 4 pgs.
"European Application Serial No. 11189249.3, Decision to Refuse dated Dec. 19, 2013", 18 pgs.
"European Application Serial No. 11189249.3, Extended European Search Report dated Feb. 1, 2012", 7 pgs.
"European Application Serial No. 11189249.3, Office Action dated Nov. 4, 2013", 4 pgs.
"European Application Serial No. 11189249.3, Response filed Feb. 4, 2013 to Communication Pursuant to Article 94(3) EPC dated Nov. 26, 2012", 9 pgs.
"European Application Serial No. 11189249.3, Response filed Aug. 28, 2012 to Extended European Search Report dated Feb. 1, 2012", 9 pgs.
"European Application Serial No. 11189249.3, Summons to Attend Oral Proceedings dated Apr. 15, 2013", 7 pgs.
"European Application Serial No. 11189252.7, Communication Pursuant to Article 94(3) EPC dated Jan. 9, 2013", 4 pgs.
"European Application Serial No. 11189252.7, Decision to grant dated May 2, 2014", 2 pgs.
"European Application Serial No. 11189252.7, Extended European Search Report dated Jan. 23, 2012", 6 pgs.
"European Application Serial No. 11189252.7, Extended European Search Report dated May 9, 2012", 12 pgs.
"European Application Serial No. 11189252.7, Office Action dated Oct. 30, 2013", 4 pgs.
"European Application Serial No. 11189252.7, Office Action dated Dec. 11, 2013", 6 pgs.
"European Application Serial No. 11189252.7, Response filed Feb. 11, 2013 to Communication Pursuant to Article 94(3) EPC dated Jan. 9, 2013", 5 pgs.
"European Application Serial No. 11189252.7, Response filed Oct. 10, 2013 to Office Action dated Apr. 15, 2013", 18 pgs.
"European Application Serial No. 11189252.7, Response filed Nov. 22, 2012 to Extended European Search Report dated May 9, 2012", 13 pgs.
"European Application Serial No. 11189252.7, Summons to Attend Oral Proceedings dated Apr. 15, 2013", 6 pgs.
"European Application Serial No. 13719338.9, Office Action dated Dec. 19, 2014", 2 pgs.
"European Application Serial No. 13719338.9, Response filed Jun. 29, 2015 to Office Action dated Dec. 19, 2014", 19 pgs.

(56) References Cited

OTHER PUBLICATIONS

"International Application No. PCT/US2008/071986, International Search Report dated Jan. 30, 2009", 3 pgs.

"International Application Serial No. PCT/US2005/030018, International Preliminary Report on Patentability dated Dec. 27, 2006", 3 pgs.

"International Application Serial No. PCT/US2005/030018, International Search Report dated Jul. 25, 2006", 2 pgs.

"International Application Serial No. PCT/US2005/030018, Written Opinion dated Jul. 25, 2006", 3 pgs.

"International Application Serial No. PCT/US2010/022807, International Preliminary Report on Patentability dated Nov. 3, 2011", 6 pgs.

"International Application Serial No. PCT/US2010/022807, International Search Report dated Sep. 13, 2010", 3 pgs.

"International Application Serial No. PCT/US2010/022807, Written Opinion dated Sep. 13, 2010", 4 pgs.

"International Application Serial No. PCT/US2013/036964, International Preliminary Report on Patentability dated Jul. 17, 2014", 11 pgs.

"International Application Serial No. PCT/US2013/036964, International Search Report dated Nov. 29, 2013", 7 pgs.

"International Application Serial No. PCT/US2013/036964, Invitation to Pay Additional Fees and Partial Search Report dated Aug. 2, 2013", 7 pgs.

"International Application Serial No. PCT/US2013/036964, Written Opinion dated Apr. 15, 2014", 10 pgs.

"International Application Serial No. PCT/US2013/036964, Written Opinion dated Nov. 29, 2013", 13 pgs.

"International Application Serial No. PCT/US2014/019916, International Search Report dated Oct. 13, 2014", 6 pgs.

"International Application Serial No. PCT/US2014/019916, Invitation to Pay Additional Fees and Partial Search Report dated May 30, 2014", 6 pgs.

"International Application Serial No. PCT/US2014/019916, Written Opinion dated Oct. 13, 2014", 13 pgs.

"Powdered Activated Carbon", Cabot Corp, [Online] retrieved from the Internet: <http://www.cabotcorp.com/solutions/products-plus/activated-carbon/powdered>, (Jan. 3, 2015), 3 pgs.

Arenillas, A, et al., "CO2 removal potential of carbons prepared by co-pyrolysis of sugar and nitrogen containing compounds", Journal of analytical and applied pyrolysis 74.1, (2005), 298-306.

Bakandritsos, A., et al., "Aqueous and Gaseous Adsorption from Montmorillonite-Carbon Composites and from Derived Carbons", Langmuir, 21, (2005), 2349-2355.

Bakandritsos, A., et al., "High Surface Area Montmorillonite—Carbon Composites and Derived Carbons", Chemistry of Materials, vol. 16, No. 8, (Mar. 16, 2004), 1551-1559.

Bimer, Jan, et al., "Modified active carbons from precursors enriched with nitrogen functions: sulfur removal capabilities", (1998), 519-525.

Chang, Shih-Ger, "Method for Oxidation of Mercury Vapor", U.S. Appl. No. 60/560,904, filed Apr. 9, 2004, (Apr. 9, 2004), 9 pgs.

Criswell, Gordon, et al., "Progress Report on Mercury Control Retrofit at the Colstrip Power Station", Paper #91, Mega Symposium, Baltimore, MD, (Aug. 2011), 1-23.

Darder, M., et al., "Caramel-clay nanocomposites", Journal of Materials Chemistry, 15, (2005), 3913-3918.

Diamantopoulou, LR G Skodras, et al., "Sorption of mercury by activated carbon in the presence of flue gas components", Fuel Processing Technology 91.2, (2010), 158-163.

Dong, J., et al., "Mercury Removal from Flue Gases by Novel Regenerable Magnetic Nanocomposite Sorbents", Environ, Sci, Technol., 43, (2009), 3266-3271.

Dunham, G. E., et al., "Mercury Capture by an Activated Carbon in a Fixed-Bed Bench-Scale System", Environmental Progress, 17(3), (1998), 203-208.

Eisazadeh, H,, "Removal of Mercury from Water Using Polypyrrole and its Composites", Chinese Journal of Polymer Science, 25(4), (2007), 393-397.

Felsvang, K., et al., "Mercury Reduction and Control Options", The U.S. EPA-DOE-EPRI Combined Power Plant Air Pollutant Control Symposium; The Mega Symposium and the A&WMA Specialty Conference and Mercury Emissions: Fate, Effects and Control; Chicago, IL, (Aug. 2001), 1-19.

Fernandez-Saavedra, R., et al., "Polymer-Clay Nanocomposites as Precursors of Nanostructured Carbon Materials for Electrochemical Devices: Templating Effect of Clays", Journal of Nanoscience and Nanotechnology, 8, (2008), 1741-1750.

Ghorbani, M., et al., "Application of polyaniline nanocomposite coated on rice husk ash for removal of Hg(II) from aqueous media", Synthetic Metals, (2001), 4 pgs.

Ghorishi, Behrooz, et al., "Sorption of Mercury Species by Activated Carbons and Calcium-Based Sorbents: Effect of Temperature, Mercury Concentration and Acid Gases", Waste Manage, Res., 16:6, (1998), 582-593.

Gomez-Aviles, A., et al., "Functionalized Carbon-Silicates from Caramel-Sepiolite Nanocomposites", Angew. Chem. Int. Ed., 46, (2007), 923-925.

Gomez-Aviles, A., et al., "Multifunctional materials based on graphene-like/sepiolite nanocomposites", Applied Clay Science, 47, (2010), 203-211.

Ha, et al., "Effect of unburnt carbon on the corrosion performance of fly ash cement mortar", Construction and Building Materials, (Sep. 1, 2005), 7 pgs.

Ikeue, K., et al., "Noble-metal-containing nanoporous carbon synthesized within the interlayer space of montmorillonite and its catalytic property", Applied Catalysis A: General, 351, (2008), 68-74.

Kawabuchi, Yuji, et al., "Chemical vapor deposition of heterocyclic compounds over active carbon fiber to control its porosity and surface function", Langmuir 13.8, (1997), 2314-2317.

Kyotani, T., et al., "Formation of highly orientated graphite from polyacrylonitrile by using a two-dimensional space between montmorillonite lamellae", Nature, 331, (1988), 331-333.

Lancia, A., et al., "Adsorption of Mercuric Chloride Vapours from Incinerator Flue Gases Calcium Hydroxide Particles", Combust. Sci. & Tech., 93, (1993), 277-289.

Laumb, Jason D., et al., "X-ray photoelectron spectroscopy analysis of mercury sorbent surface chemistry", Fuel Processing Technology, 85, (2004), 577-585.

Li, Y., et al., "Removal of elemental mercury from simulated coal-combustion flue gas using a SiO2—TiO2 nanocomposite", Fuel Processing Technology, 89, (2008), 567-573.

M, Hocquel, "Quecksilber and seine Verbindungen bei der Abfallverbrennung", with English Abstract p. 3, (Dec. 31, 2000), 112 pgs.

Maroto-Valer, M. Mercedes, et al., "Development of Activated Carbons From Coal and Biomass Combustion and Gasification Chars", (2004), 2 pgs.

Mochida, I., et al., "Preparation of nitrogen containing pitches from quinoline and isoquinoline by AID of AlCl3", Carbon, 33(8), (1995), 1069-1077.

Nguyen-Thanh, D., et al., "High Porosity Carbonaceous Adsorbents Templated From Porous Clay Heterostructures", Prepr. Pap.-Am. Chem. Soc., Div. Fuel Chem., 51(1), (2006), 7-8.

Nguyen-Thanh, D., et al., "Metal-loaded carbonaceous adsorbents templated from porous clay heterostructures", Microporous and Mesoporous Materials, 92, (2006), 47-55.

Nickels, Dale L, et al., "Processing and reuse of activated carbon used to adsorb mercury from power plant flue gases", Final report, (2004).

Olson, David, et al., "The reduction of gas phase air toxics from combustion and incineration sources using the MET-Mitsui-BF activated coke process", Fule Processing Technology, (2000), 13 pgs.

Olson, David G., et al., "The Reduction of Gas Phase Air Toxics from Combustion and Incineration Sources using the MET-Mitsui-BF Activated Coke Process", Fuel Processing Technology, 65-66, (2000), 393-405.

Olson, E. S., et al., "Catalytic effects of carbon sorbents for mercury capture", Journal of Hazardous Materials, 74, (2000), 61-79.

(56) References Cited

OTHER PUBLICATIONS

Olson, Edwin S., et al., "Surface Compositions of Carbon Sorbents Exposed to Simulated Low-Rank Coal Flue Gases", J. Air & Water Waste Manage. Assoc., 55, (2005), 747-754.
Padak, Bihter, "Understanding mercury binding on activated carbon", Carbon 47.1 2, (2009), 2855-2864.
Przepiorski, J, et al., "High temperature ammonia treatment of activated carbon for enhancement of CO2 adsorption", Applied Surface Science 225.1, (2004), 235-242.
Rachel, Ribeirovieira Azzi Rios, et al., "Tailoring Activated Carbon by Surface Chemical Modification with O, S, and N Containing Molecules", Materials Research. 6 (2), (2003), 129-135.
Raymundo-Pinero, E, et al., "Structural characterization of N-containing activated carbon fibers prepared from a low softening point petroleum pitch and a melamine resin", Carbon 40.4, (2002), 597-608.
Smokey, et al., "Alternative to Activated Carbon for Mercury Control", Power Engineering, (Oct. 2012), 10 pgs.
Streng, Sabine, et al., "Toxics control by activated charcoal within the "system Dusseldorf" full scale experience", B. Fuel Processing Technology, (1994), 14 pgs.
Tsuji, K, et al., "The Activated Coke Process for Combinded SOx/NOx/Air Toxics Reduction", Air and Water Management Assoc., (Mar. 10, 1993), 27 pgs.
Vosteen, B, et al., "Chlor-und Bromgestutzte Hg-Sorption an Elektrofilter-Flugaschen eines kohlegefeuerten Schmelzkammerkessels und an Zementrohmehl", Matin-Luther-Universitat Halle-Wittenberg, (2003), 1-30.
Vosteen, B. W., et al., "", Flyer on Mercury Abatement given at the VDI-Wissensforum, Dusseldorf,Germany, (2003), 6 pgs.
Vosteen, B. W., "Bromin-enhanced Mercury Abatement from Combustion Flue Gases—Recent Industrial Application and Laboratory Researcg", VGB PowerTech, vol. 86, Issue Mar. 2006, (2006), 70-75.
Vosteen, N., "Emissionsminderung von Quecksilber Burch chlor—und bromgestutzte Hg-Oxidation in Rauchgas", (Sep. 2003), 1-23.
Wan, Q., et al., "Removal of gaseous elemental mercury over a CeO—WO3/TiO2 nanocomposite in simulated coal-fired flue gas", Chemical Engineering Journal, 170, (2011), 512-517.
Wang, B., et al., "Performance of a diatomite-based sorbent in removing mercury from aqueous and oil matrices", J. Environ. Eng. Sci., 6, (2007), 469-476.
Zhang, Y., et al., "High efficient removal of mercury from aqueous solution by polyaniline/humic acid nanocomposite", Journal of Hazardous Materials, 175, (2010), 404-409.
Zhao, Yongxin, et al., "Effectsof Sulfur Dioxide and Nitric Oxide on Mercury Oxidation and Reducton under Homogeneous Conditions", J. Air & Waste Manage. Assoc., 56, (2006), 628-635.
Zheng, Yuanjing, et al., "Review of technologies for mercury removal from flue gas from cement production processes", Progress in Energy and Combustion Science, vol. 38, No. 5, (Apr. 26, 2012), 599-629.
"U.S. Appl. No. 15/974,343, Non Final Office Action dated Oct. 29, 2018", 22 pgs.
"U.S. Appl. No. 15/997,091, Non Final Office Action dated Nov. 2, 2018", 27 pgs.
"U.S. Appl. No. 14/712,558, Non-Final Office Action dated Oct. 19, 2018", 35 pgs.
"U.S. Appl. No. 15/978,760, Non Final Office Action dated Oct. 10, 2018", 17 pgs.
"U.S. Appl. No. 14/712,558, Non Final Office Action dated Oct. 19, 2018", 26 pgs.
"U.S. Appl. No. 15/295,594, Non Final Office Action dated Oct. 23, 2018", 20 pgs.
"U.S. Appl. No. 15/589,359, Non Final Office Action dated Oct. 22, 2018", 12 pgs.
Pietrzak, "Preparation of nitrogen-enriched activated carbons from brown coal", Energy and Fuels 20.3, (2006), 1275-1280.
"U.S. Appl. No. 15/295,594, Response filed Jul. 24, 2018 to Restriction Requirement dated Jun. 29, 2018", 9 pgs.
"U.S. Appl. No. 15/589,359, Response filed Jul. 26, 2018 to Non Final Office Action dated Jun. 4, 2018", 14 pgs.
"U.S. Appl. No. 15/997,091, Non Final Office Action dated Jul. 27, 2018", 13 pgs.
"U.S. Appl. No. 15/974,343, Non Final Office Action dated Jul. 27, 2018", 12 pgs.
"U.S. Appl. No. 15/997,091,Response filed Aug. 14, 2018 to Non Final Office Action dated Jul. 27, 2018", 10 pgs.
"U.S. Appl. No. 15/974,343, Response filed Aug. 14, 2018 to Non Final Office Action dated Jul. 27, 2018", 11 pgs.
"U.S. Appl. No. 14/712,558, Response filed Aug. 14, 2018 to Non Final Office Action dated Jul. 2, 2018", 11 pgs.
"U.S. Appl. No. 15/589,359, Final Office Action dated Sep. 12, 2018", 14 pgs.
"U.S. Appl. No. 15/589,359, Response filed Sep. 14, 2018 to Final Office Action dated Sep. 12, 2018", 18 pgs.
"U.S. Appl. No. 15/295,594, Response filed Apr. 23, 2019 to Non Final Office Action dated Oct. 23, 2018", 45 pgs.
"U.S. Appl. No. 15/589,359, Advisory Action dated May 22, 2019", 3 pgs.
"U.S. Appl. No. 15/589,359, Response filed Apr. 30, 2019 to Final Office Action dated Mar. 1, 2019", 11 pgs.
"U.S. Appl. No. 15/978,760, Ex Parte Quayle Action dated Apr. 19, 2019", 13 pgs.
"U.S. Appl. No. 15/978,760, Notice of Allowability dated May 30, 2019", 3 pgs.
"U.S. Appl. No. 15/978,760, Notice of Allowance dated May 8, 2019", 7 pgs.
"U.S. Appl. No. 15/978,760, Response filed Mar. 20, 2019 to Final Office Action dated Dec. 26, 2018", 90 pgs.
"U.S. Appl. No. 15/978,760, Response filed Apr. 23, 2019 to Ex Parte Quayle Action dated Apr. 19, 2019", 15 pgs.
"Coal Combustion Products (CCPs): Characteristics, Utilization and Beneficiation", Edited by Torn Rohl, et al., Woodhead Publishing (Elsevier), (2017), 565 pgs.
"Control of Mercury Emissions from Coal Fired Electric Utility Boilers: An Update", US EPA Air Pollution Prevention and Control Division, National Risk Management Research Laboratory, Office of Research and Development, (Feb. 18, 2005), 59 pgs.
"Sorbent Enhancement Additives for Mercury Control", US DOE Office of Fossil Energy, National Energy Technology Laboratory, (Jun. 2008), 4 pgs.
Benson, Steven A., et al., "JV Task 73—Mercury Control Technologies for Electric Utilities Burning Subbituminous Coals—Draft Final Report", University of North Dakota Energy and Environmental Research Center, (Jun. 2005), 165 pgs.
Benson, Steven A., et al., "Pilot-and Full-Scale Demonstration of Advanced Mercury Control Technologies for Lignite-Fired Power Plants", University of North Dakota Energy and Environmental Research Center, (Feb. 2005), 97 pgs.
Berry, Mark, et al., "Mercury control evaluation of calcium bromide injection into a PRB-fired furnace with an SCR", Proc. of the Air Quality VI Conference, Arlington, VA, (2007), 9 pgs.
Brown, Thomas D., et al., "Mercury Measurement and Its Control: What We Know, Have Learned, and Need to Further Investigate", Journal of the Air and Waste Management Association, 49(6), (Jun. 1999), 98 pgs.
Feeley, Thomas J., et al., "A Review of DOE/NETL's Mercury Control Technology R and D Program for Coal-Fired Power Plants", DOE/NETL Hg R and D Program Review, (Apr. 2003), 32 pgs.
French, Charles L., et al., "Study of Hazardous Air Pollutant Emissions from Electric Utility Steam Generating Units—Final Report to Congress: vol. 1", US EPA Office of Air Quality Planning and Standards, (Feb. 1998), 502 pgs.
Ghorishi, Behrooz S., et al., "In-Flight Capture of Elemental Mercury by Chlorine-Impregnated Activated Carbon", Proc. of the 94th Annual Meeting of the Air and Waste Management Association, Orlando, FL, (Jun. 2001), 14 pgs.
Jones, Andrew P., et al., "DOE/NETL's Phase II Mercury Control Technology Field Testing Program: Preliminary Economic Analysis of Activated Carbon Injection", Environmental Science and Technology, 41(4), (2007), 7 pgs.

(56) References Cited

OTHER PUBLICATIONS

Keating, Martha H., et al., "Mercury Study Report to Congress vol. 1: Executive Summary", US EPA Office of Air Quality Planning and Standards, (Dec. 1997), 95 pgs.

Kilgroe, James D., et al., "Control of Mercury Emissions from Coal-Fired Electric Utility Boilers: Interim Report", US EPA Office of Research and Development, National Risk Management Laboratory, Air Pollution Prevention and Control Division, (Dec. 2001), 485 pgs.

Nelson, Sid Jr., et al., "How China Can Leapfrog the World in Mercury Emission Reductions", Proc. of the AWMA Intl. Specialty Conference on Leapfrogging Opportunities for Air Quality Improvement, (2010), 24 pgs.

Pavlish, John H., et al., "Status review of mercury control options for coal-fired power plants", Fuel Processing Technology, vol. 82, (2003), 77 pgs.

Yang, Yang, et al., "Effect of HBr formation on mercury oxidation via CaBr(2) addition to coal during combustion", RSC Advances, 6(64), (2016), 7 pgs.

"U.S. Appl. No. 14/712,558, Amendment and Response filed Dec. 3, 2018 to Non Final Office Action dated Oct. 19, 2018", 28 pgs.

"U.S. Appl. No. 14/712,558, Final Office Action dated Jan. 11, 2019", 27 pgs.

"U.S. Appl. No. 15/589,359, Amendment and Response filed Jan. 17, 2019 to Non Final Office Action dated Oct. 22, 2018", 14 pgs.

"U.S. Appl. No. 15/589,359, Final Office Action dated Mar. 1, 2019", 10 pgs.

"U.S. Appl. No. 15/974,343, Amendment and Response filed Dec. 3, 2018 to Non Final Office Action dated Oct. 29, 2018", 37 pgs.

"U.S. Appl. No. 15/974,343, Final Office Action dated Jan. 14, 2019", 25 pgs.

"U.S. Appl. No. 15/978,760, Amendment and Response filed Dec. 3, 2018 to Non Final Office Action dated Oct. 10, 2018", 25 pgs.

"U.S. Appl. No. 15/978,760, Final Office Action dated Dec. 26, 2018", 21 pgs.

"U.S. Appl. No. 15/997,091, Final Office Action dated Jan. 11, 2019", 20 pgs.

"U.S. Appl. No. 15/997,091, Response filed Dec. 3, 2018 Non Final Office Action dated Nov. 2, 2018", 40 pgs.

"U.S. Appl. No. 14/712,558, Non Final Office Action dated Sep. 12, 2019", 15 pgs.

"U.S. Appl. No. 14/712,558, Response filed Jul. 10, 2019 to Final Office Action dated Jan. 11, 2019", 57 pgs.

"U.S. Appl. No. 14/712,558, Response filed Sep. 17, 2019 to Non Final Office Action dated Sep. 12, 2019", 12 pgs.

"U.S. Appl. No. 15/295,594, Final Office Action dated Aug. 2, 2019", 18 pgs.

"U.S. Appl. No. 15/589,359, Non Final Office Action dated Jun. 21, 2019", 7 pgs.

"U.S. Appl. No. 15/589,359, Notice of Allowance dated Jul. 31, 2019", 7 pgs.

"U.S. Appl. No. 15/589,359, Response filed Jul. 16, 2019 to Non Final Office Action dated Jun. 21, 2019", 7 pgs.

"U.S. Appl. No. 15/974,343, Non Final Office Action dated Aug. 21, 20019", 13 pgs.

"U.S. Appl. No. 15/974,343, Notice of Allowance dated Sep. 17, 2019", 7 pgs.

"U.S. Appl. No. 15/974,343, Response Filed Jul. 10, 2019 to Final Office Action dated Jan. 14, 2019", 81 pgs.

"U.S. Appl. No. 15/997,091, Non Final Office Action dated Aug. 23, 2019", 14 pgs.

"U.S. Appl. No. 15/997,091, Notice of Allowance dated Sep. 18, 2019", 8 pgs.

"U.S. Appl. No. 15/997,091, Response filed Jul. 10, 2019 to Final Office Action dated Jan. 11, 2019", 80 pgs.

"U.S. Appl. No. 16/509,071, Non Final Office Action dated Sep. 11, 2019", 21 pgs.

"Ch. 35: Mercury, Hazardous Air Pollutants and other Multi-Pollutant Control", Tomei, G. L. (Ed.). Steam: its generation and use, Babcock and Wilcox Co., (2015), 24 pgs.

"U.S. Appl. No. 15/589,359, Corrected Notice of Allowability dated Oct. 11, 2019", 2 pgs.

"U.S. Appl. No. 15/974,343, Corrected Notice of Allowability dated Oct. 23, 2019", 2 pgs.

"U.S. Appl. No. 15/974,343, Non Final Office Action dated Dec. 2, 2019", 12 pgs.

"U.S. Appl. No. 15/997,091, Corrected Notice of Allowability dated Oct. 23, 2019", 3 pgs.

"U.S. Appl. No. 15/997,091, Corrected Notice of Allowability dated Nov. 22, 2019", 3 pgs.

"U.S. Appl. No. 16/509,071, Response filed Oct. 3, 2019 to Non Final Office Action dated Sep. 11, 2019", 26 pgs.

"U.S. Appl. No. 16/509,102, Amendment and Response filed Nov. 11, 2019 to Non Final Office Action dated Oct. 23, 2019", 34 pgs.

"U.S. Appl. No. 16/509,102, Non Final Office Action dated Oct. 23, 2019", 26 pgs.

"U.S. Appl. No. 16/509,146, Amendment and Response filed Nov. 11, 2019 to Non Final Office Action dated Oct. 17, 2019", 34 pgs.

"U.S. Appl. No. 16/509,146, Non Final Office Action dated Oct. 17, 2019", 24 pgs.

"Defendant's Answer and Counterclaim", *Midwest Energy Emissions Corp., et al., v. Vistra Energy Corp., et al.*—Case 1:19-cv-01334-RGA, (Oct. 9, 2019), 71 pgs.

"Original Complaint for Patent Infringement", *Midwest Energy Emissions Corp., et al., v. Vistra Energy Corp., et al.*—Case 1:19-cv-01334-UNA, (Jul. 17, 2019), 31 pgs.

"Plaintiff's Answer to Defendant's Counterclaims", *Midwest Energy Emissions Corp., et al., v. Vistra Energy Corp., et al*—Case 1:19-cv-01334-RGA, (Oct. 30, 2019), 37 pgs.

Olson, E.S., et al., "Chemical mechanisms in mercury emission control technologies", J. Phys. IV France 107, Proc. of the XIIth Intl. Conference on Heavy Metals in the Environment vol. II, pp. 979-982, (2003), 6 pgs.

Olson, Edwin S., "Abstract—Multiple Site Model for Flue Gas—Mercury interactions on Activated Carbons: The Basic Site", Abstracts of Papers Part 1, 225th ACS National Meeting, New Orleans, LA, (2003), 3 pgs.

Olson, Edwin S., et al., "An Improved Model for Flue Gas—Mercury Interactions on Activated Carbons", Proceedings of the Combined Power Plant Air Pollutant Control Mega Symposium, (May 2003), 8 pgs.

Olson, Edwin, et al., "The Multiple Site Model for Flue Gas—Mercury Interactions on Activated Carbons: The Basic Site", Fuel Chemistry Preprints, 48(1), (2003), 3 pgs.

"Activated carbon", Wikipedia, [Online] Retrieved from the Internet: <URL: https://en.wikipedia.org/wiki/Activated_carbon>, (Retrieved on May 11, 2020), 21 pgs.

"U.S. Appl. No. 14/712,558, Notice of Allowance dated Dec. 13, 2019", 7 pgs.

"U.S. Appl. No. 15/853,029, Restriction Requirement dated May 21, 2020", 8 pgs.

"U.S. Appl. No. 15/951,970, Non Final Office Action dated May 27, 2020", 26 pgs.

"U.S. Appl. No. 15/974,343, Notice of Allowance dated Apr. 13, 2020", 7 pgs.

"U.S. Appl. No. 15/974,343, Response filed Apr. 2, 2020 to Non-Final Office action filed Dec. 2, 2019", 13 pgs.

"U.S. Appl. No. 16/130,670, Non Final Office Action dated Dec. 16, 2019", 8 pgs.

"U.S. Appl. No. 16/130,670, Response filed Jun. 16, 2020 to Non Final Office Action dated Dec. 16, 2019", 14 pgs.

"U.S. Appl. No. 16/509,071, Final Office Action dated Dec. 12, 2019", 23 pgs.

"U.S. Appl. No. 16/509,071, Non Final Office Action dated May 29, 2020", 31 pgs.

"U.S. Appl. No. 16/509,071, Response filed May 12, 2020 to Final Office Action dated Dec. 12, 2019", 31 pgs.

"U.S. Appl. No. 16/509,102, Final Office Action dated Feb. 14, 2020", 13 pgs.

"U.S. Appl. No. 16/509,146, Final Office Action dated Feb. 14, 2020", 23 pgs.

"DARCO Hg, Powdered Activated Carbon Data SHeet", CABOT Corp., (Oct. 24, 2017), 2 pgs.

(56) References Cited

OTHER PUBLICATIONS

"Fluegas Properties Calculator", Increase Performance Inc., [Online] Retrieved from the Internet: <URL: http://www.increase-performance.com/calc-flue-gas-prop.html>, (Retrieved on May 11, 2020), 1 pg.

"STEAM Table 8a, 8b", Steam: Its Generation and Use 42nd Ed, (2015), 2 pgs.

"U.S. Appl. No. 15/449,112, Advisory Action dated Apr. 24, 2018", 3 pgs.

"U.S. Appl. No. 14/712,558, Supplemental Amendment Filed May 15, 2018", 6 pgs.

"U.S. Appl. No. 15/449,112, Response filed Feb. 15, 2018 to Final Office Action dated Feb. 15, 2018", 13 pgs.

"U.S. Appl. No. 15/589,359, Response filed May 18, 2018 to Non Final Office Action dated Feb. 21, 2018", 14 pgs.

"U.S. Appl. No. 15/295,594, Supplemental Amendment Filed May 15, 2018", 10 pgs.

"U.S. Appl. No. 15/978,760, Preliminary Amendment Filed May 15, 2018", 7 pgs.

"U.S. Appl. No. 15/974,343 Preliminary Amendment Filed May 15, 2018", 7 pgs.

"U.S. Appl. No. 15/295,594, Restriction Requirement dated May 22, 2018", 6 pgs.

"U.S. Appl. No. 15/589,359, Final Office Action dated Jun. 4, 2018", 13 pgs.

"U.S. Appl. No. 14/712,558, Supplemental Amendment filed Jun. 13, 2018", 14 pgs.

"U.S. Appl. No. 14/712,558, Response filed Apr. 2, 2018 to Final Office Action dated Dec. 6, 2017", 7 pgs.

"U.S. Appl. No. 15/449,112, Response filed Apr. 6, 2018 to Final Office Action dated Feb. 15, 2018", 13 pgs.

\* cited by examiner

PROMOTED AMMONIUM SALT-PROTECTED ACTIVATED CARBON SORBENT PARTICLES FOR REMOVAL OF MERCURY FROM GAS STREAMS

CROSS-REFERENCE TO RELATED APPLICATIONS

This application is a continuation-in-part of and claims the benefit of priority under 35 U.S.C. § 120 to U.S. patent application Ser. No. 14/712,558, filed on May 14, 2015, which is a continuation of U.S. patent application Ser. No. 13/966,768, filed on Aug. 14, 2013 (now U.S. Pat. No. 8,821,819), which is a continuation of U.S. patent application Ser. No. 13/427,665, filed on Mar. 22, 2012 (now U.S. Pat. No. 8,512,655), which is a continuation of U.S. patent application Ser. No. 12/419,219, filed on Apr. 6, 2009 (now U.S. Pat. No. 8,168,147), which is a continuation of U.S. patent application Ser. No. 12/201,595, filed on Aug. 29, 2008, which is a division of U.S. patent application Ser. No. 11/209,163, filed on Aug. 22, 2005 (now U.S. Pat. No. 7,435,286), which claims the benefit of priority under 35 U.S.C. § 119(e) to U.S. Provisional Patent Application No. 60/605,640, filed on Aug. 30, 2004, the disclosures of which are incorporated herein in their entirety by reference. This application is also a continuation-in-part of and claims the benefit of priority under 35 U.S.C. § 120 to U.S. Utility application Ser. No. 14/195,360, filed Mar. 3, 2014, which claims the benefit of priority under 35 U.S.C. § 119(e) to U.S. Provisional Patent Application Ser. No. 61/773,549, filed Mar. 6, 2013, the disclosures of which are incorporated herein in their entirety by reference.

STATEMENT OF GOVERNMENT SUPPORT

This invention was made with U.S. Government support under grant numbers R 827649-01 and CR 830929-01 awarded by the U.S. Environmental Protection Agency and under Contract Number DE-FC26-98FT40320. The U.S. Government has certain rights in this invention.

BACKGROUND

Mercury (Hg) emissions have become a health and environmental concern because of their toxicity and ability to bioaccumulate. The U.S. Environmental Protection Agency (EPA) has issued regulations for the control of mercury emissions from waste-to-energy, cement production, and coal-fired power plants. Mercury in flue gas from industrial sources (e.g., power plants) can be captured by sorbents such as activated carbon, which can then be removed by particulate separation devices. The amount of standard sorbents (e.g., activated carbon) needed to serve the market is large. Standard sorbents are not always effective and become more expensive as larger amounts are used.

Inhibition of mercury capture from gas streams by active carbon sorbents can occur when sulfur(VI) (e.g. $SO_3$, $H_2SO_4$) is present in the gas stream, with increasing inhibition at higher concentrations. Low sulfur coals when burned can produce $SO_3$ concentrations in the flue gas from 1-5 ppm, whereas high sulfur coals when burned can produce $SO_3$ concentrations in the flue gas in excess of 30 ppm. Additionally, many utilities desire to operate $SO_3$ injection systems at a minimum of about 5-6 ppm to improve ash collectability. Mercury capture above sulfur(VI) concentrations of 3 ppm by mole is limited. Sulfur(VI) concentration of about 6 ppm can diminish elemental mercury capture by about 25%-50% or more. With this reduction, it becomes difficult, if not impossible, to economically achieve desired mercury emission levels. The scientific understanding of why a severe inhibition of mercury sorption exists when sulfur(VI) concentrations increase by such a small amount is limited.

SUMMARY OF THE INVENTION

In various embodiments, the present invention provides a method for separating mercury from a mercury-containing gas stream. The method includes contacting a mercury-containing gas stream with an activated carbon sorbent including promoted ammonium salt-protected activated carbon sorbent particles, to form a mercury-sorbent composition. The method also includes separating at least some of the mercury-sorbent composition from the mercury-containing gas stream, to give a separated gas.

In various embodiments, the present invention provides a method for separating mercury from a mercury-containing gas stream. The method includes contacting a mercury-containing gas stream with an activated carbon sorbent including HBr-promoted ammonium sulfate-protected activated carbon sorbent particles, to form a mercury-sorbent composition. The method also includes separating at least some of the mercury-sorbent composition from the mercury-containing gas stream, to give a separated gas.

In various embodiments, the present invention provides ammonium salt-protected activated carbon sorbent particles including ammonia, an ammonium salt, or a combination thereof.

In various embodiments, the present invention provides a method of making the promoted ammonium salt-protected activated carbon particles. The method includes subjecting a mixture including a precursor activated carbon sorbent and an ammonium salt to heating (e.g., in hot flue gas or in hot air), microwaving, irradiation, or a combination thereof, to form an activated carbon sorbent including promoted ammonium salt-protected activated carbon sorbent particles.

In various embodiments, the present invention provides a method for separating mercury from a mercury-containing gas stream. The method includes contacting a mercury-containing gas stream with an activated carbon sorbent comprising promoted or non-promoted activated carbon sorbent particles and ammonia, to form a mercury-sorbent composition. The method includes separating at least some of the mercury-sorbent composition from the mercury-containing gas stream, to give a separated gas.

In various embodiments, the present invention provides certain advantages over other mercury sorbents and methods of using the same, at least some of which are unexpected. For example, in some embodiments, the promoted ammonium salt-protected activated carbon sorbent particles provide significantly more effective and economical mercury sorbents for effluent gases, advantageously applicable to treating gas streams from fired equipment and gasification systems. In some embodiments, ammonia formed from the ammonium salt-protection/decomposition adsorbed or complexed on the sorbent surface or in the gas phase that (e.g., owing to its basic character) can react with $SO_2$ or $SO_3$ in the mercury-containing gas stream and can prevent their interference with the sorption of mercury in or near active sites on the activated carbon. In some embodiments, the promoted ammonium salt-protected activated carbon sorbent particles can separate mercury from a gas stream more effectively than other sorbents, such as in the presence of $SO_3$. In various embodiments, mercury removal efficiencies of promoted ammonium salt-protected activated carbon sorbent particles exceeds or matches that of conventional methods with added benefits such as reduced costs. The method and materials of various embodiments of the present invention can operate more efficiently than other methods of mercury removal. In some embodiments, the method and materials of various embodiments can remove a given amount of mercury for a smaller amount of financial expenditure, as compared to other methods. For example, the method and materials of various embodiments can remove a larger amount of mercury for a given mass of carbon, as compared to other methods of removing mercury, including as compared to other methods of removing mercury that include a carbon sorbent.

In some embodiments, in-flight preparation (e.g., in the furnace, in the mercury-containing gas, in the injection/transport system, or a combination thereof) of the promoted ammonium salt-protected carbon sorbent on location produces certain advantages. For example, the treatment system can be combined with the carbon (or sorbent) injection system at the end-use site. With this technique, the halogen/halide is introduced to the carbon-air (or other gas, such as a combustion or gasification gas) mixture in a transport line (or other part of the sorbent storage and injection system), or prepared in-flight in the mercury-containing gas. In some embodiments, this can provide the following benefits over current conventional concepts for treating sorbents off-site: capital equipment costs at a treatment facility are eliminated; costs to operate the treatment facility are eliminated; there are no costs for transporting carbon and additive to a treatment facility; the inventive process uses existing hardware and operation procedures; the inventive technology ensures that the sorbent is always fresh, and thus, more reactive; no new handling concerns are introduced; there are no costs for removing carbon from treatment system; the inventive process allows rapid on-site tailoring of additive-sorbent ratios in order to match the requirements of flue gas changes, such as may be needed when changing fuels or reducing loads, thus further optimizing the economics; the inventive technology reduces the amount of spent sorbents that are disposed; or a combination thereof.

In various embodiment, another advantage of the present invention relates to the use of a feedback system to more efficiently utilize certain aspects of the invention. Where possible and desirable, the mercury control technology of the present invention may utilize continuous measurement of mercury emissions as feedback to assist in control of the sorbent injection rate. Tighter control on the sorbent and optional component(s) levels can be achieved in this way, which will ensure mercury removal requirements are met with minimal material requirements, thus minimizing the associated costs. In some embodiments, the mercury emissions are continuously measured downstream of the injection location, such as in the exhaust gas at the stack.

In some embodiments, the promoted ammonium salt-protected activated carbon sorbent particles can be regenerated and reused, reducing disposal of spent sorbents and decreasing the cost of mercury removal. In some embodiments, preparation or promotion of the promoted ammonium salt-protected activated carbon sorbent particles can advantageously occur on-site. On-site preparation and promotion can have advantages including, for example: reduction or elimination of equipment costs and operating costs of a separate preparation facility or location, reduction or elimination of transportation costs, fresher and more reactive sorbent, reduction of handling, on-site tailoring of composition (such as when changing fuels or reducing loads).

BRIEF DESCRIPTION OF THE FIGURES

The drawings illustrate generally, by way of example, but not by way of limitation, various embodiments of the present invention.

DETAILED DESCRIPTION OF THE INVENTION

Figure 1:
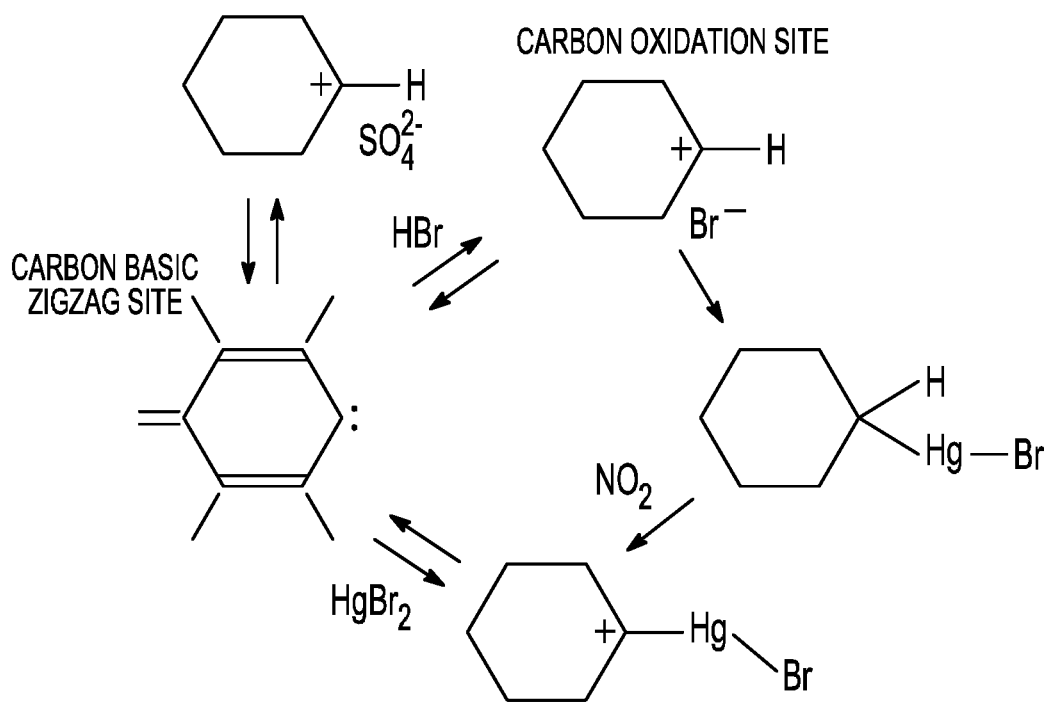
FIG. 1 illustrates a proposed mechanistic model of the chemical reactions resulting in the oxidation and capture of mercury, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less.

The term "solvent" as used herein refers to a liquid that can dissolve a solid, liquid, or gas. Non-limiting examples of solvents are silicones, organic compounds, water, alcohols, ionic liquids, and supercritical fluids.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to a temperature of about 15° C. to 28° C.

As used herein, "mineral" refers to a naturally occurring solid chemical substance formed through biogeochemical processes, having, for example, characteristic chemical composition, highly ordered atomic structure, and specific physical properties.

Method for Separating Mercury from a Mercury-Containing Gas Stream.

In various embodiments, the present invention provides a method for separating mercury from a mercury-containing gas stream. The method includes contacting a mercury-containing gas stream with an activated carbon sorbent including promoted ammonium salt-protected activated carbon sorbent particles, to form a mercury-sorbent composition. The method includes separating at least some of the mercury-sorbent composition from the mercury-containing gas stream, to give a separated gas.

The mercury-containing gas stream can have any suitable source. In some embodiments, the method includes combusting coal to form the mercury-containing gas stream. The mercury-containing gas stream can include any suitable concentration of sulfur(VI), such as about 1 ppm to about 2000 ppm, or about 1 ppm or less, or less than, equal to, or greater than about 2 ppm, 3, 4, 5, 6, 7, 8, 9, 10, 12, 14, 16, 18, 20, 25, 30, 35, 40, 45, 50, 60, 70, 80, 90, 100, 125, 150, 200, 250, 300, 400, 500, 750, 1,000, 1,250, 1,500, 1,750, or about 2,000 or more. The activated carbon sorbent can have any suitable location within the mercury-containing gas stream, such as in a fixed bed, in a moving bed, in a scrubber (e.g., in scrubber slurry), in a filter (e.g., fixed or travelling), suspended in the mercury-containing gas stream, or a combination thereof. The mercury-containing gas stream can include a concentration of sulfur(VI) that is greater than about 0 ppm by mole, such as greater than about 1 ppm or about 3 ppm by mole (e.g., any suitable concentration described herein) and the activated carbon sorbent can form a mercury-sorbent composition at a higher absorption rate relative to a corresponding activated carbon sorbent including less or substantially no ammonium salt-protection. The mercury-containing gas stream can further include a concentration of sulfur(VI) that is greater than about 0 ppm by mole, such as greater than about 1 ppm or about 3 ppm by mole (e.g., any suitable concentration described herein) and the activated carbon sorbent can form a mercury-sorbent composition at a higher absorption rate relative to a corresponding activated carbon sorbent including at least one of a) less or substantially no halide- or halogen-promotion, wherein the activated carbon sorbent including the activated carbon sorbent particles is promoted (e.g., halide- or halogen-promoted), and b) less or substantially no ammonium salt-protection.

The activated carbon sorbent combines with at least some of the mercury in the mercury-containing gas stream to form the mercury-sorbent composition, such as about 0.001 wt % to about 100 wt % of mercury in the mercury-containing gas stream, such as about 70 wt % to about 100 wt %, or such as less than, equal to, or greater than about 0.001 wt %, 0.01, 0.1, 1, 2, 3, 4, 5, 6, 7, 8, 9, 10, 12, 14, 16, 18, 20, 25, 30, 35, 40, 45, 50, 55, 60, 65, 70, 75, 80, 85, 90, 91, 92, 93, 94, 95, 96, 97, 98, 99, 99.9, 99.99, or about 99.999 wt % or more.

The method can include injecting a sorbent into the mercury-containing gas stream. The injected sorbent can be the activated carbon sorbent including the promoted ammonium salt-protected activated carbon sorbent particles. The precursor can be a promoted non-ammonium salt-protected activated carbon sorbent, wherein the ammonium salt-protection occurs after injection of the precursor into the mercury-containing gas stream. The precursor can be an ammonium salt-protected non-promoted activated carbon sorbent, wherein the halide-promotion occurs after injection of the precursor into the mercury-containing gas stream. The precursor can be a non-promoted non-ammonium salt-protected activated carbon sorbent, wherein halide-promotion and ammonium salt-protection occurs after injection of the precursor in the mercury-containing gas stream.

The activated carbon sorbent and the promoted ammonium salt-protected activated carbon sorbent particles have any suitable particle size, such as a particle size of about 0.1 µm to about 1000 µm, about 0.1 µm to about 10 µm, or about 0.1 µm or less, or less than, equal to, or greater than about 0.5 µm, 1, 2, 3, 4, 5, 6, 8, 10, 12, 14, 16, 18, 20, 25, 30, 35, 40, 45, 50, 60, 70, 80, 90, 100, 125, 150, 175, 200, 250, 300, 350, 400, 450, 500, 600, 700, 800, 900, or about 1000 µm or more. The promoted ammonium salt-protected activated carbon sorbent particles can be 100 wt % of the activated carbon sorbent, or the activated carbon sorbent can include 0.001 wt % to about 99.999 wt % of the promoted ammonium salt-protected activated carbon sorbent particles, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 85, 90, 92, 94, 96, 97, 98, 99, 99.9, 99.99, or about 99.999 wt % or more.

The activated carbon sorbent can include an alkaline component, such as an alkaline component chosen from alkali elements, alkaline earth elements, alkali salts, alkaline earth salts, and combinations thereof. For example, the alkali salts or alkaline earth salts can be an oxide, a hydroxide, a carbonate, or a phosphate. The activated carbon sorbent can include a mercury-stabilizing reagent selected from the group consisting of S, Se, $H_2S$, $SO_2$, $H_2Se$, $SeO_2$, $CS_2$, $P_2S_5$, and combinations thereof. The activated carbon sorbent can optionally include a substrate including at least one of diatomaceous earth, a clay (e.g., bentonite), a zeolite, or a mineral (e.g., lime). For example, the activated carbon sorbent can optionally include a substrate including at least one of mica, talc, phyllosilicates, feldspars, bentonite, dolomite, kaolin, kaolinite, montmorillonite, smectite, illite, chlorite, or a combination thereof.

The activated carbon sorbent can include a product of subjecting a mixture including a carbonaceous material and the substrate to heating, microwaving, irradiating, or a combination thereof; comprises a material derived from the product via one or more of halide-promotion and ammonium salt-protection; or a combination thereof. The heating can be performed in hot gas or hot air, or any other suitable method of heating. The heating can include heating to about 100° C. to about 1200° C., or about 100° C. or less, or less than, equal to, or greater than about 150, 200, 250, 300, 350, 400, 500, 600, 700, 800, 900, 1,000, 1,100, or about 1,200° C. or more. The heating of the mixture including the carbonaceous material and the substrate to form the product thereof can be performed prior to contacting the activated sorbent and the mercury-containing gas stream. The heating of the mixture including the carbonaceous material and the substrate to form the product thereof can be performed in the mercury-containing gas stream. In some embodiments, the activated carbon sorbent includes a carbon nanocomposite sorbent.

The promoted ammonium salt-protected activated carbon sorbent particles can include promoted ammonium salt-protected powdered activated carbon, granular activated carbon, carbon black, carbon fiber, aerogel carbon, pyrolysis char, any carbonaceous material described herein or a material derived via pyrolysis or devolatization thereof, or a combination thereof. The promoted ammonium salt-protected activated carbon sorbent particles, non-promoted ammonium salt-protected activated carbon sorbent particles, promoted non-ammonium salt-protected activated carbon sorbent particles, or non-promoted non-ammonium salt-protected activated carbon sorbent particles, can have any suitable particle size (e.g., longest dimension of the particle) such as a particle size of about 0.1 µm to about 1000 µm, about 0.1 µm to about 30 µm, or about 0.1 µm or less, or less than, equal to, or greater than about 0.5 µm, 1, 2, 3, 4, 5, 6, 8, 10, 12, 14, 16, 18, 20, 25, 30, 35, 40, 45, 50, 60, 70, 80, 90, 100, 125, 150, 175, 200, 250, 300, 350, 400, 450, 500, 600, 700, 800, 900, or about 1000 µm or more.

The promoted ammonium salt-protected activated carbon sorbent particles include a product of subjecting a mixture including a carbonaceous material and a nitrogenous material to heating, microwaving, irradiating, or a combination thereof; including a material derived from the product via one or more of halide-promotion and ammonium salt-protection; or a combination thereof. The promoted ammonium salt-protected activated carbon sorbent particles can include a product of acid or base treatment of the product of subjecting a mixture including a carbonaceous material and a nitrogenous material to heating (e.g., by hot gas, hot air, or via any suitable heating method), microwaving, irradiating, or a combination thereof. The carbonaceous material can include powdered activated carbon, granular activated carbon, carbon black, carbon fiber, aerogel carbon, pyrolysis char, brown sugar, barley sugar, caramel, cane sugar, corn syrup, starch, molasses, a glucan, a galactan, a xylan, a sugar waste product, or a combination thereof.

The nitrogenous material can include a nitrogen-containing organic or inorganic material. The nitrogenous material can include a nitrogen heterocycle, a nitrogen-containing polymer or copolymer, a nitrile, a carbamate, an amino acid, nitrobenzene, hydroxylamine, urea, hydrazine, sulfamic acid, an ammonium salt, or a combination thereof. The nitrogenous material can include indole, quinoxaline, carbazole, isoquinoline, nitrobenzene, urea, sulfamic acid, polyvinylpyrrolidone, vinylpyrrolidone-vinyl acetate copolymer, vinylpyrrolidone-acrylic acid copolymer, vinylpyrrolidone-maleic acid copolymer, polyethylenimine, alanine, piperazine, quinolone, quinoxaline, diazabicyclooctane, an amino acid, an ammonium salt, or a combination thereof.

The promoted ammonium salt-protected activated carbon sorbent particles can include nitrogen atoms in at least a surface layer thereof, such as nitrogen atoms resulting from the nitrogenous material from heating of a carbonaceous material and a nitrogenous material prior to promotion and ammonium protection/decomposition, or nitrogen atoms resulting from ammonia produced from ammonium salt protection, or a combination thereof. The surface layer can be a continuous or discontinuous layer. The surface layer can have any suitable thickness, such as about 0.001% to about 99% of a radius of the particles (e.g. wherein the radius is half of the longest dimension), 0.001% to about 50%, or 0.001% or less, or less than, equal to, or greater than about 0.01%, 0.1, 1, 2, 3, 4, 5, 6, 8, 10, 12, 14, 16, 18, 20, 25, 30, 35, 40, 45, or about 50% or more. Any suitable proportion of the surface layer of the promoted ammonium salt-protected activated carbon sorbent particles can be nitrogen atoms, such as about 0.001 wt % to about 99 wt % nitrogen, 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 wt % or more. The promoted ammonium salt-protected activated carbon sorbent particles can have any suitable overall nitrogen atom concentration, such as about 0.001 wt % to about 50 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, or about 50 wt % or more.

In some embodiments, a concentration of nitrogen atoms in the surface layer can be greater than a concentration of nitrogen atoms in a core of the promoted ammonium salt-protected activated carbon sorbent particles. The core of the promoted ammonium salt-protected activated carbon sorbent particles can be about 0 wt % to about 99 wt % nitrogen atoms, about 1 wt % to about 6 wt % nitrogen atoms, or about 1 wt % or less, or less than, equal to, or greater than about 2 wt %, 3, 4, 5, 6, 7, 8, 9, 10, 12, 14, 16, 18, 20, 25, 30, 35, 40, 45, 50, 55, 60, 65, 70, 75, 80, 85, 90, 95, or about 99 wt % or more. The surface layer of the promoted ammonium salt-protected activated carbon sorbent particles can include about 0.001 wt % to about 99 wt % nitrogen atoms, about 5 wt % to about 80 wt % nitrogen atoms, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 85, 90, 95, or about 99 wt % or more.

In some embodiments, nitrogen atoms are substantially homogeneously distributed throughout the promoted ammonium salt-protected activated carbon sorbent particles, with a substantially equal concentration in the core and the surface layer.

The nitrogen atoms in the surface layer (e.g., the ammonia, or nitrogen atoms from other sources) can decrease neutralization of carbocations in the promoted ammonium salt-protected activated carbon sorbent particles by at least one of $SO_3$, $H_2SO_4$, and $HSO_4^{1-}$, as compared to corresponding promoted ammonium salt-protected activated carbon sorbent particles including less or substantially no nitrogen in a corresponding particle surface layer. The nitrogen atoms in the surface layer can at least partially block carbocations in the promoted ammonium salt-protected activated carbon sorbent particles from at least one of $SO_3$, $H_2SO_4$, and $HSO_4^{1-}$, as compared to a corresponding promoted ammonium salt-protected activated carbon sorbent particles including less or substantially no nitrogen in a corresponding particle surface layer.

The separating at least some of the mercury-sorbent composition from the mercury-containing gas stream can includes separating in a particulate separator. The particulate separator can include an electrostatic precipitator (ESP), a baghouse, a wet scrubber, a filter, cyclone, fabric separator, or any combination thereof. The contacting, the separating, or a combination thereof, can occur in an aqueous scrubber. The scrubber can include an aqueous slurry that includes the activated carbon sorbent.

The method can further include regenerating the mercury-sorbent composition to give a regenerated activated carbon sorbent.

In some embodiments, the present invention provides a method for separating mercury from a mercury-containing gas stream. The method can include contacting a mercury-containing gas stream with an activated carbon sorbent comprising promoted activated carbon sorbent particles and ammonia, to form a mercury-sorbent composition. The method can include separating at least some of the mercury-sorbent composition from the mercury-containing gas stream, to give a separated gas. In various embodiments, the ammonia can be injected into the mercury-containing gas stream (or an ammonium precursor such as urea can be injected, which generates ammonia), such as along with or separately from the sorbent or a precursor thereof.
Promotion.

The promoted ammonium salt-protected activated carbon can include a halide, a hydrogen halide, or a combination thereof, such as complexed with the activated carbon. The promotion of the mercury oxidizing capability of the activated carbon can be effected by addition of several classes of Lewis and Bronstead acids to the carbene site on the precursor activated carbon. The halide, hydrogen halide, or combination thereof, is the promoter, and the complexing of the same with the activated carbon results in promotion of the oxidative reactivity of the activated carbon sorbent precursor with elemental mercury. The halide, hydrogen halide, or combination thereof is about 0.001 wt % to about 30 wt % of the promoted ammonium salt-protected activated carbon, about 1 wt % to about 15 wt %, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 18, 20, 22, 24, 26, 28, or about 30 wt % or more.

The promoted ammonium salt-protected activated carbon sorbent particles can be promoted prior to addition to the mercury-containing gas stream. The method can further include promoting precursor activated carbon sorbent particles (e.g. activated carbon that has received ammonium salt protection or that is free of ammonium salt protection) with a promoter (e.g., halide promoter) to form promoted activated carbon sorbent particles. Promoting precursor activated carbon sorbent particles with the promoter can include chemically reacting carbene species edge sites in the activated carbon sorbent particles with the promoter. Promoting precursor activated carbon sorbent particles with the promoter can include subjecting a mixture including the precursor activated carbon sorbent particles and the promoter to heating (e.g., in hot air or gas, or via any suitable heating method), microwaving, irradiating, or a combination thereof. During the promoting the promoter can be substantially in vapor or gaseous form. The promoting can occur at any suitable time; for example, the promoting of the precursor activated carbon sorbent particles can occur in-flight in the mercury-containing gas stream, or can occur prior to addition of the activated carbon sorbent particles to the mercury-containing gas stream. In some embodiments, the promoting can occur in an aqueous scrubber, wherein the scrubber includes an aqueous slurry that includes the promoter.

The method can include combusting coal that includes the promoter (e.g., halide promoter), a promoter precursor, or a combination thereof (e.g., coal to which the promoter precursor has been added). The promoter precursor can transform into the promoter during or after the combustion. The promoter can combine with an injected activated carbon sorbent downstream of the combustion to form a promoted activated carbon sorbent. The method can include adding the promoter, promoter precursor, or a combination thereof, to the coal prior to the combustion thereof. The promoter, promoter precursor, or a combination thereof, can be added to the coal in any suitable way, for example, as a solid, liquid, gas, or in an organic solvent, such as a hydrocarbon, a chlorinated hydrocarbon, supercritical carbon dioxide, or a combination thereof.

The method can include injecting into the mercury-containing gas stream the promoter, a promoter precursor, or a combination thereof. For example, the promoter, the promoter precursor, or a combination thereof, can be injected (e.g., as a solid, liquid, gas, or combination thereof) into the furnace, into the flue gas, or into any suitable location that allows the promoter to combine with the activated carbon sorbent to form a promoted activated carbon sorbent. In some embodiments, the promoter, promoter precursor, or a combination thereof, is added together with the precursor activated carbon sorbent particles into the mercury-containing gas stream. The promoter, promoter precursor, or a combination thereof, can be added into the mercury-containing gas stream separately from addition of the precursor activated carbon sorbent particles into the mercury-containing gas stream.

The method can include adding the promoter or promoter precursor within (e.g., to) the coal/gas combustion zone, or gasification zone. The promoter precursor can transform into the promoter during or after the combustion, or gasification. The promoter can combine with an injected activated carbon sorbent downstream of the combustion to form a promoted activated carbon sorbent.

The promoter can be any suitable promoter that forms a promoted activated carbon sorbent as described herein. For example, the promoter can be a halide promoter such as HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, NHBr, $NH_4Cl$, NHsI, $NH_4F$, or a combination thereof. The promoter precursor can be a metal halide or a nonmetal halide. The promoter can be HBr.

The method can include forming the promoter form a promoter precursor, such as during combustion with the coal or downstream of the coal combustion in the flue gas. The promoter precursor can be any suitable material that can transform into a suitable promoter, such as an elemental halogen, a Group V halide, a Group VI halide, a hydrohalide, an ammonium halide, a metal halide, a nonmetal halide, an alkali earth metal halide, an alkaline earth metal halide, or a combination thereof. The promoter precursor can be NaBr, NaCl, NaI, Br⁻, Cl⁻, I⁻, KI, KCl, LiCl, LiBr, $CuCl_2$, $CuBr_2$, AgCl, AgBr, $CHI_3$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, or a combination thereof. The promoter precursor can have any suitable particle size, such as a particle size of about 0.1 μm to about 1000 μm, or about 0.1 μm or less, or less than, equal to, or greater than 1, 2, 3, 4, 5, 6, 7, 8, 9, 10, 12, 14, 16, 18, 20, 25, 30, 35, 40, 45, 50, 60, 70, 80, 90, 100, 125, 150, 175, 200, 250, 300, 350, 400, 450, 500, 600, 700, 800, 900, or about 1000 μm or more.

Ammonium Salt Protection.

The promoted ammonium salt-protected activated carbon can include ammonia (e.g., ammonia that forms from thermal decomposition of the ammonium salt), the ammonium salt, or a combination thereof. The ammonia can result from the ammonium salt protection of the activated carbon sorbent precursor (e.g., of a promoted activated carbon sorbent or a non-promoted activated carbon sorbent). The ammonia or ammonium salt can be any suitable proportion of the promoted ammonium salt-protected activated carbon, such as about 0.001 wt % to about 30 wt %, about 0.01 wt % to about 15 wt %, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 18, 20, 22, 24, 26, 28, or about 30 wt % or more. The released ammonia can collect in the pore structures of the carbon sorbent or release into the gas phase in close proximity to the sorbent particle. In either space the ammonia can reacts with and neutralize Sulfur(VI) species in the gas phase, removing them from the gas phase and preventing their interference with the active site on the carbon surface. Some ammonia can also bind to deposits of ammonium salt surrounding the active site, and can react with sulfur VI species before they neutralize the carbon active site.

In some embodiments, the promoted ammonium salt-protected activated carbon can include an anionic counterion of the ammonium salt. The anionic counterion can result from the ammonium salt protection of the activated carbon sorbent precursor (e.g., of a promoted activated carbon sorbent or a non-promoted activated carbon sorbent). The anionic counterion of the ammonium salt can be any suitable proportion about 0.001 wt % to about 30 wt % of the promoted ammonium salt-protected activated carbon, 0.01 wt % to about 15 wt %, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 18, 20, 22, 24, 26, 28, or about 30 wt % or more.

The method can further include protecting a precursor activated carbon sorbent with an ammonium salt to form the promoted ammonium salt-protected activated carbon sorbent particles. The precursor activated carbon sorbent can be a promoted activated carbon sorbent, or an activated carbon sorbent that is free of halide-promotion. The protecting of the promoted or non-promoted activated carbon sorbent particles with the ammonium salt can include subjecting a mixture including the activated carbon sorbent particles and the ammonium salt to heating, microwaving, irradiating, or a combination thereof. The mixture including the activated carbon sorbent particles and the ammonium salt can have any suitable ratio of the activated carbon sorbent particles (e.g., either promoted or unpromoted) to the ammonium salt, such as about 1:100 to about 100:1, about 1:1 to about 1:5, or about 1:100 or less, or less than, equal to, or greater than about 1:90, 1:80, 1:70, 1:60, 1:50, 1:40, 1:30, 1:20, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 20:1, 30:1, 40:1, 50:1, 60:1, 70:1, 80:1, 90:1, or about 100:1 or more.

The promoted ammonium salt-protected activated carbon sorbent particles can be ammonium salt-protected prior to addition to the mercury-containing gas stream, wherein the ammonium salt-protection of the promoted activated carbon sorbent particles or of precursor activated carbon sorbent particles occurs prior to addition of the promoted activated carbon sorbent particles to the mercury-containing gas stream. The ammonium salt-protection of the promoted activated carbon sorbent particles or of precursor activated carbon sorbent particles (e.g., activated carbon sorbent particles free of promotion) can occur in-flight in the mercury-containing gas stream.

The ammonium salt can be added to a coal-burning power plant at any suitable location. The method can include injecting the ammonium salt into the mercury-containing gas stream, such as into the flue gas, such as at any location within the combustion zone or downstream of the combustion zone. The ammonium salt can be added together with the promoted activated carbon sorbent particles or precursor activated carbon sorbent particles (e.g., activated carbon sorbent particles free of halide-promotion) into the mercury-containing gas stream. The ammonium salt can be added into the mercury-containing gas stream separately from addition of the promoted activated carbon sorbent particles or precursor activated carbon sorbent particles into the mercury-containing gas stream.

The ammonium salt can be any suitable ammonium salt that can form an ammonium salt-protected activated carbon sorbent as described herein. The ammonium salt can be an ammonium halide that is also used as a promoter precursor in the method, wherein addition of the promoter precursor and the ammonium salt can occur simultaneously as the same step in the method, advantageously producing ammonia and promoting the activated carbon. The ammonium salt can be an ammonium halide, a methylammonium halide, an ammonium salt of an oxyacid of a Group VI element, an ammonium salt of an oxyacid of a Group V element, or a combination thereof. The counterion of the ammonium salt can be an anion of a halogen or Group VI element, an oxyanion of a Group VI element such as sulfate, sulfite, thiosulfate, dithionite, or an oxyanion of a Group V element such as nitrate, nitrite, phosphate, phosphite, thiophosphate, or carbonate. The ammonium salt can be ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof. The ammonium salt can be ammonium sulfate. The ammonium salt can have any suitable particle size, such as a particle size of about 0.1 μm to about 1000 μm, about 0.1 μm to about 10 μm, or about 0.1 μm or less, or less than, equal to, or greater than about 0.5 μm, 1, 2, 3, 4, 5, 6, 8, 10, 12, 14, 16, 18, 20, 25, 30, 35, 40, 45, 50, 60, 70, 80, 90, 100, 125, 150, 175, 200, 250, 300, 350, 400, 450, 500, 600, 700, 800, 900, or about 1000 μm or more.

Sorption of Mercury.

Figure 2:
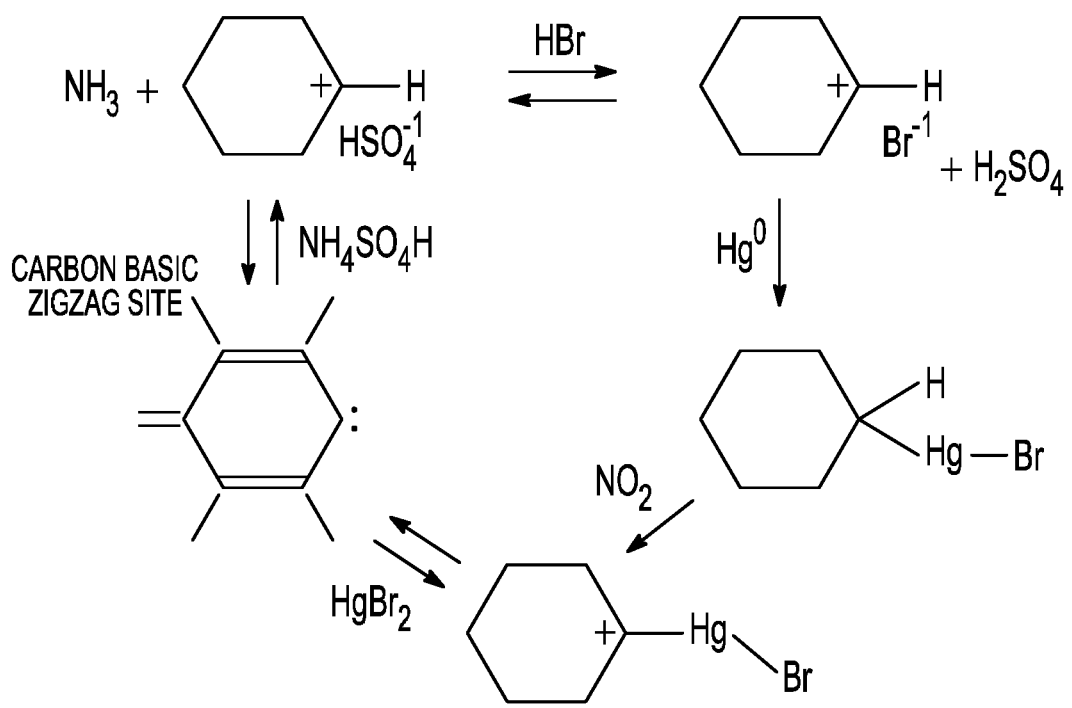
FIG. 2 illustrates a proposed mechanistic model of the chemical reactions resulting in the oxidation and capture of mercury, in accordance with various embodiments.

Referring now to FIG. 1, there is illustrated a theory developed from scientific evidence to explain the nature of the promoting compounds. For example, as illustrated in FIG. 2, hydrogen bromide reacts with the unsaturated structure of the activated carbon. This may be, by way of illustration only, a carbene species on the edge of the graphene sheet structures of the carbon. Molecular bromine or a bromine compound reacts to form a similar structure, with a positive carbon that is active for oxidizing the mercury with subsequent capture by the sorbent.

It has now been found that the formation of the new halide (e.g., bromide) compound with carbon increases their reactivity toward mercury and other pollutants. Additionally, the resulting halide compound is uniquely suited to facilitate oxidation of the mercury. The effectiveness of the oxidation can result from the promotion effect of the halide, exerted on the developing positive charge on the mercury during the oxidation, known in the chemical art as a specific catalytic effect. Thus, as the mercury electrons are drawn toward the positive carbon, the halide anion electrons are pushing in from the other side, protecting the positive charge developing on the mercury and lowering the energy requirement for the oxidation process. Bromide is especially reactive, owing to the highly polarizable electrons in the outer 4p orbitals of the ion. Thus, adding HBr or $Br_2$ (or a precursor that forms one or both of these) to the carbon forms a similar carbenium bromide, in which the positive carbon oxidizes the mercury with the assistance of the bromide ion. Iodide is an even more nucleophilic species, hence lowers the energy requirement even more, giving higher reaction rates. Chlorine is less effective, but still facilitates oxidation.

A mechanistic model showing the promotion, as well as mercury oxidation and capture, and protection when using ammonium salts is illustrated in FIG. 2. The model in FIG. 2 illustrates the embodiment that uses ammonium sulfate as the ammonium salt. This ammonium salt in the in-flight mode decomposes initially to ammonia and ammonium bisulfate (e.g., 100-250° C.), as shown in Reaction 1. Injection at higher temperatures (e.g., 400° C.) may result in further decomposition to ammonium pyrosulfate. In either case, ammonium salt is available for reaction on the carbon sorbent surface.

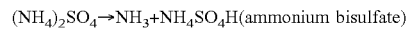

$(NH_4)_2SO_4 \rightarrow NH_3 + NH_4SO_4H$ (ammonium bisulfate)

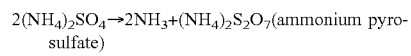

$2(NH_4)_2SO_4 \rightarrow 2NH_3 + (NH_4)_2S_2O_7$ (ammonium pyrosulfate)        Reaction 1:

In the model described in FIG. 2, the ammonium salt is a donor for the proton that adds to the graphene zig-zag carbon in the graphene edge. The product is the carbenium ion, a potential oxidant for elemental mercury. The byproduct is ammonia and bisulfate ion pairing with the carbenium ion. The primary promoter, hydrogen halide or bimolecular halogen, having been generated by introduction of halide salt to the furnace (or elsewhere), is conveyed in the gas phase to the sorbent surface. Hydrogen bromide is selected as the halide in the illustration, but hydrogen iodide or hydrogen chloride will react similarly. The hydrogen halide reacts at the carbene reaction site on the edge carbon, donating a proton and resulting in the formation of a carbenium ion on the carbon edge. The halide ion, which remains after donation of the proton, forms the highly reactive carbenium-halide ion pair which is the essence of promotion to the active state for most effective mercury oxidation.

Other similar ammonium salts will similarly donate hydrogen ion to the zig-zag carbon from the ammonium ion to form a carbenium ion which is subsequently converted by hydrogen halides in the gas stream to the carbenium halide ion pair in the promotion mechanism as shown for ammonium sulfate.

Ammonia formed on the surface and residing on the carbon surface (and near capture sites) as well as the sulfuric acid generated are capable of intercepting $SO_3$ from the gas phase as shown in Reactions 3 and 4, preventing their reaction with the active carbon site, thereby protecting the site from deactivation and allowing mercury capture to occur. Thus the embodiments that utilize ammonium salt as the optional component are highly effective in protecting sorbent sites from flue gas contaminants (e.g. $SO_2$, $SO_3$, $NO_x$, selenates, and the like), in particular $SO_3$.

NH$_3$+SO$_3$→NH$_3$SO$_3$(sulfamic acid)  Reaction 3:

H2SO$_4$+SO$_3$→H$_2$S$_2$O$_7$(pyrosulfuric acid)+NH$_3$

H$_2$S$_2$O$_7$+NH$_3$→(NH$_4$)$_2$S$_2$O$_7$(ammonium pyrosulfate)  Reaction 4:

With other anionic species derived from the ammonium salt, there may be some additional subsequent reactions of the byproducts of the reactions. Or there may be decomposition reactions of the salts that produce secondary components valuable for the capture of mercury. For example, when ammonium thiosulfate is used, the reaction proceeds with formation of the carbenium ion. Subsequently, the thiosulfate reacts with mercury halide to form more stable mercury sulfide.

Contacting the mercury-containing gas stream with the activated carbon sorbent including promoted ammonium salt-protected activated carbon sorbent particles to form the mercury-sorbent composition can include chemically reacting the mercury in the mercury-containing gas stream with the promoted ammonium salt-protected activated carbon sorbent. The promoted ammonium salt-protected activated carbon sorbent particles can include active sites, wherein the active sites include halide anions bound to the sorbent particles, such as carbocations bound to halide anions. The carbocations in the promoted ammonium salt-protected activated carbon sorbent particles can accept electrons from mercury atoms of the mercury-sorbent particulate.

In the promoted ammonium salt-protected activated carbon sorbent particles ammonia or an anionic ammonium counterion derived from the ammonium salt can intercepts SO$_2$, SO$_3$, NO$_x$, selenates, or a combination thereof, in the mercury-containing gas stream, preventing reaction thereof with active carbon sites in the promoted ammonium salt-protected activated carbon.

Coal-Fired Power Plant Mercury-Removal System.

Figure 3:
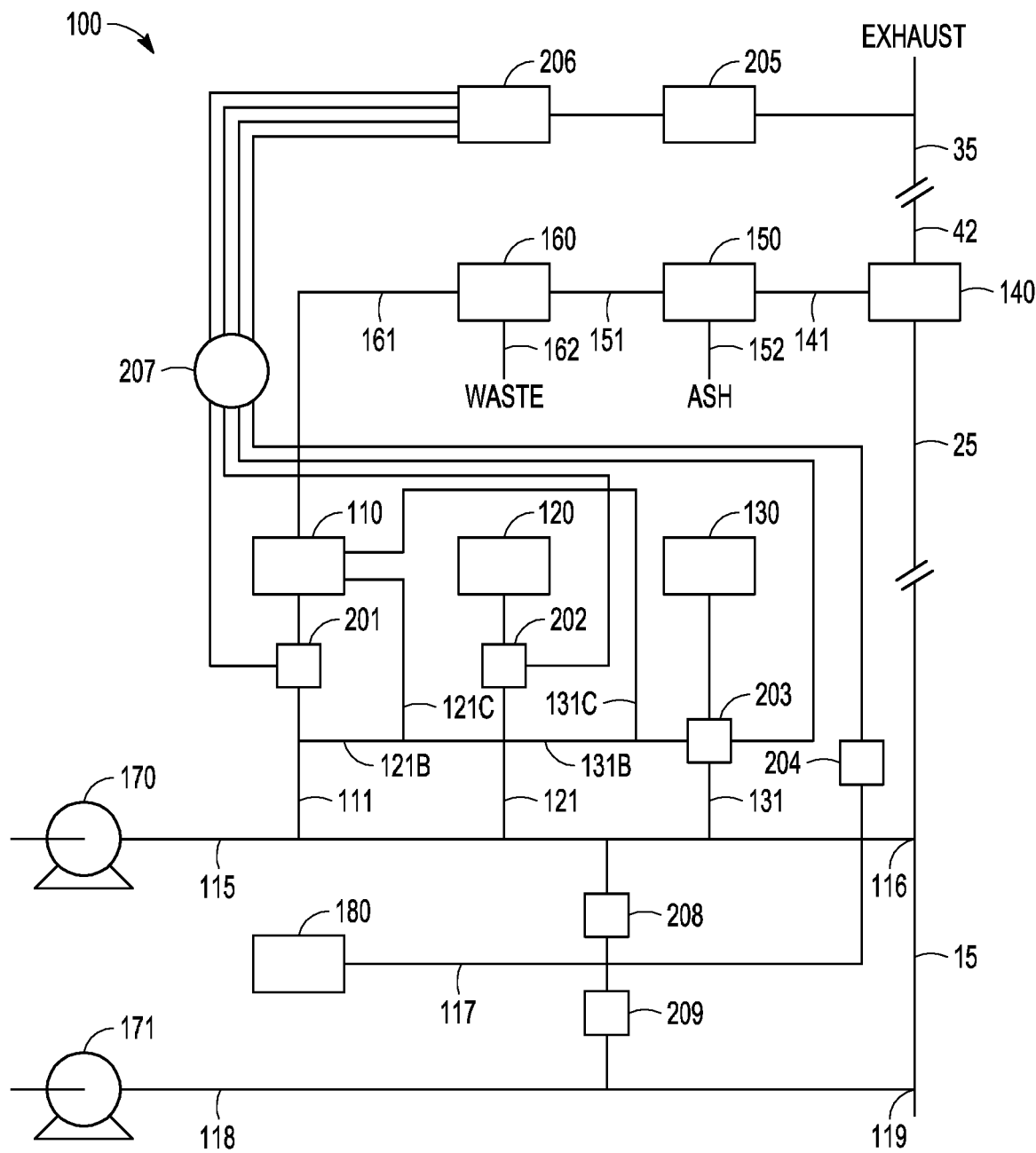
FIG. 3 schematically illustrates preparation of promoted carbon sorbents and processes for flue gas mercury reduction in flue gases and/or product gases from a gasification system in accordance with the present invention, including in-flight preparation of promoted carbon sorbent.

Referring now to FIG. 3, a schematic flow diagram is provided of mercury control system 100 comprising preparation of promoted carbon sorbents, and flue gas mercury reduction, in accordance with preferred embodiments of the present invention. There is provided an activated carbon reservoir 110 (e.g., powdered activated carbon, granular activated carbon, carbon black, carbon fiber, aerogel carbon, pyrolysis char, any carbonaceous material described herein or a material derived via pyrolization/devolatization thereof, or a combination thereof, and the reservoir 110 can optionally include ammonium salt and/or alkali), an optional halogen/halide promoter (or promoter precursor) reservoir 120, an optional ammonium salt reservoir 130, and an optional akali (or ammonium salt) component reservoir 180, each of which with corresponding flow control device(s) 201, 202, 203, and 208/209, respectively. In conjunction with the optional alkali (or ammonium salt) component reservoir 180, optional flow control devices 208 and 209 can be used independently, together, or not at all.

Reservoirs 110, 120, 130, and 180 connect through their respective flow control devices and via associated piping, to transport line 115. Optional alkali (or ammonium salt) component reservoir 180 may also connect, through respective flow control devices and via associated piping, to transport line 118. A source of air, nitrogen, or other transport gas(es) is provided by gas source 170 to transport line 115 for the purpose of entraining materials discharged from reservoirs 110, 120, 130, and 180 and injecting such materials, via injection point 116, into contaminated flue gas stream 15. A source of air, nitrogen, or other transport gas(es) may be provided by gas source 171 to transport line 118 for the purpose of entraining materials discharged from reservoirs 180 and injecting such materials, via injection point 119, into flue gas stream 15. Reservoirs 110, 120, 130, and 180 may be the same or different, as desired. Gas sources 170 and 171 may be the same or different, as desired. Alternatively, transport gas(es) may be provided to both transport lines 115 and 118 by gas source 170 (connection from source 170 to line 118 not shown). Although gas sources 170 and 171 are shown in FIG. 3 as compressors or blowers, any source of transport energy known in the art may be acceptable, as will be appreciated by those of skill in the art. Stream 15 may be contaminated flue gas, or coal stream that is combusted to generate contaminated flue gas stream.

For clarity, single injection points 116 or 119 are shown in FIG. 3, although one skilled in the art will understand that multiple injection points are within the scope of the present invention. Further, points 116 and 119 may be interchangeable, with one or the other preceding the other. Optical density measuring device (s) 204 is connected to transport line 115 and/or 118 to provide signals representative of the optical density inside transport line 115 and/or 118 as a function of time.

Downstream from injection point 116 and 119 is provided particulate separator 140. By way of illustration and not limitation, particulate separator 140 may comprise one or more fabric filters, one or more electrostatic precipitators (hereinafter "ESP"), one or more scrubbers, or other particulate removal devices as are known in the art. It should be further noted that more than one particulate separator 140 may exist, sequentially or in parallel, and that injection point 116 and 119 may be at a location upstream and/or downstream of 140 when parallel, sequential, or combinations thereof exist. Particulate separator 140 produces at least a predominantly gaseous ("clean") stream 142, and a stream 141 comprising separated solid materials. A sorbent/ash separator 150 separates stream 141 into a largely ash stream 152, and a largely sorbent stream 151. Stream 151 may then be passed to an optional sorbent regenerator 160, which yields a regenerated sorbent stream 161 and a waste stream 162.

An optional Continuous Emission Monitor (hereinafter "CEM") 205 for mercury is provided in exhaust gas stream 35, to provide electrical signals representative of the mercury concentration in exhaust stream 35 as a function of time. The optional mercury CEM 205 and flow controllers 201, 202, 203, 208, and 209 are electrically connected via optional lines 207 (or wirelessly) to an optional digital computer (or controller) 206, which receives and processes signals and controls the preparation and injection of promoted carbon sorbent into contaminated flue gas stream 15.

In operation, promoted ammonium salt-protected carbon sorbent (or precursor) and/or an optional alkali (or ammonium salt) component (or precursor) is injected into contaminated flue gas stream 15. After contacting the injected material with the contaminated flue gas stream 15, the injected promoted ammonium salt-protected carbon sorbent, or precursors that then form the promoted ammonium salt-protected carbon sorbent, reduces the mercury concentration, transforming contaminated flue gas into reduced mercury flue gas, 25. The injected material is removed from the flue gas 25, by separator 140, disposed of or further separated by optional separator 150, and disposed of or regenerated by an optional regenerator 160, respectively. The reduced mercury "clean" flue gas stream 42 (or 35) is then monitored for mercury content by an optional CEM 205, which provides corresponding signals to an optional computer/controller 206. Logic and optimization signals from

206 then adjust flow controllers 201, 202, 203, 208, 209 to maintain the mercury concentration in exhaust stream 35 within desired limits, according to control algorithms well known in the art. Flow controllers 201, 202, 203, 208, 209 can also be adjusted manually or be some other automated means to maintain the mercury concentration in exhaust stream 35 within desired limits, according to control algorithms well known in the art.

Referring still to FIG. 3, there are illustrated several preferred embodiments for preparation and injection of promoted ammonium salt-protected carbon sorbent and/or alkali (or ammonium salts) components in accordance with the present invention. Stream 111 provides for introduction of activated carbon (and optionally alkali, or ammonium salt) from reservoir 110, as metered by flow controller 201 manually or under the direction of computer 206. The halogen/halide may be combined and react with the activated carbon according to any of several provided methods. The halogen/halide and/or promoter precursors may be combined via line 121 directly into transport line 115, within which it contacts and reacts with the activated carbon prior to injection point 116. This option is one form of what is referred to herein as "in-flight" preparation of a promoted carbon sorbent in accordance with the invention. The halogen/halide and/or precursors may be combined via line 121 directly into stream 15, or upstream of stream 15 (such as in the furnace, or on the coal which is combusted to form stream 15), within which it contacts and reacts with the activated carbon in stream 15, This option is another form of what is referred to herein as "in-flight" preparation of a promoted carbon/sorbent or promoted ammonium salt protected sorbent in accordance with the invention. Further, the halogen/halide and/or promoter precursors may be combined via line 121b with activated carbon prior to entering transport line 115. Still further, the halogen/halide and/or promoter precursors may be contacted and react with the activated carbon by introduction via line 121c into reservoir 110. This option is employed when, for example, reservoir 110 comprises an ebulliated or fluidized bed of activated carbon, through which halogen/halide flows in gaseous form or as a vapor. The halogen/halide may be contacted with the activated carbon in liquid form or in a solvent, as discussed previously, and solvent removal (not shown in FIG. 3) may then be provided if necessary.

Similarly, the optional ammonium salt may be contacted and react directly in transport line 115 via line 131, or optionally as described above with respect to the halogen/halide, via lines 131b and 131c, or added in reservoir 110 (in which case 110 and 130 are same reservoir) and injected via. lines 111 and 115, or injected directly into stream 115 to form the promoted ammonium salt-protected carbon sorbent, either in line 115 or stream 15.

Similarly, the optional alkali and/or ammonium salt component (s) from 180 may either be added to reservoir 110 (in which case 110 and 180 are same reservoir) and injected via. lines 111 and 115, or injected in transport line 115 directly, or may be injected separately by transport line 118, combining in 115, or in flue gas stream 15 for synergistic effects with activated carbon, promoted carbon, or optional secondary components. Being able to vary the amount of the optional alkali and/or ammonium salt component (s) relative to activated carbon, promoted carbon, or optional secondary components is a key feature to overcome and optimize for site-specific operating and flue gas conditions.

Ammonium Salt-Protected Activated Carbon Sorbent Particles.

In various embodiments, the present invention provides ammonium salt-protected activated carbon sorbent particles, such as any embodiment of the promoted or unpromoted ammonium salt-protected activated carbon sorbent particles described herein or that can perform an embodiment of the method for mercury removal described herein. The ammonium salt-protected activated carbon sorbent particles can include ammonia, an ammonium salt, or a combination thereof in at least a surface layer thereof.

In some embodiments, the ammonium salt-protected activated carbon sorbent particles are promoted ammonium salt-protected activated carbon sorbent particles. For example, the promoted ammonium salt-protected activated carbon sorbent particles can include active sites that bind with mercury atoms. The active sites can include carbocations bound to promoter anions (e.g, halides).

The ammonium salt-protected activated carbon sorbent particles can further include an anionic counterion. The anionic counterion can be derived from the ammonium salt or precursor thereof.

Method of Making the Ammonium Salt-Protected Activated Carbon Particles.

In various embodiments, the present invention provides a method of making ammonium salt-protected activated carbon particles, such as any embodiment of the promoted or unpromoted ammonium salt-protected activated carbon sorbent particles described herein or that can perform an embodiment of the method for mercury removal described herein. For example, the method of making the ammonium salt-protected activated carbon particles can include subjecting a mixture including a precursor activated carbon sorbent and an ammonium salt to heating (e.g., in hot flue gas, hot air, or any suitable heating method), microwaving, irradiation, or a combination thereof, to form an activated carbon sorbent including promoted ammonium salt-protected activated carbon sorbent particles. The precursor activated carbon sorbent can be a promoted activated carbon sorbent, or an unpromoted activated carbon sorbent. The method can further include promoting an activated carbon with a promoter (e.g., which can optionally be formed from a promoter precursor) to provide the precursor activated carbon sorbent.

EXAMPLES

Various embodiments of the present invention can be better understood by reference to the following Examples which are offered by way of illustration. The present invention is not limited to the Examples given herein.
Part I (Include 3338.005 Examples and Figures).

Example 1-1. Preparation and Testing of
Halogenated Carbon (& Comparative Example).
Gas Phase Halogenation Finely powdered activated carbon (such as NORIT Darco FGD, NORIT Americas, Inc., Marshall, Tex. (USA), although others are suitable, as will be recognized by those skilled in the art), was placed in a rotating plastic barrel with side blades (a 5 ft$^3$ (0.14 m$^3$) cement mixer) fitted with a tight plastic lid to prevent loss of the fine powder during the preparation. In a separate vessel, gas phase bromine was generated by passing a nitrogen stream over a weighed amount of liquid bromine that is warmed to about 40°-50° C. The vapor pressure of the bromine was such that a dark red gas is generated and passed out of the generator. The outlet from the gaseous bromine generator is connected via a ¼ inch (0.64 cm) plastic hose to a stationary metal tube inserted through a flange in the center of the plastic lid and passing into the center of the barrel. The flange is not air tight so that the excess of nitrogen is released after the bromine is transferred to the tumbling carbon. Thus, the bromine gas stream continuously passed into the rotating barrel where it contacted the tumbling carbon. The unit is then operated until the desired amount of bromine has combined with the carbon. Typically, this is 0.4 to 1 kg of bromine to 20 kg of carbon (2-5 wt. %). When the reaction is completed, the carbon is weighed. The treated carbon is odorless and does not cause skin irritation since the bromine has completely reacted with the carbon to produce the brominated carbon.

XPS spectra demonstrate that the brominated carbon contains both covalent carbon-bound (organic) bromide as well as anionic bromide. The product contains the same moisture originally present in the activated carbon (5-17 wt %), but does not require further drying for use. The moisture is driven out at higher temperatures (>150° C.), and the bromine was not released until very high temperatures.

Bench-Scale Testing of Mercury Oxidation and Capture Efficiency.

A bench-scale apparatus and procedure based on the above description was used to test the initial activities and capacities of several promoted activated carbon sorbents using powdered carbon, including bromine-containing activated carbons prepared from a variety of carbons, including commercially available sorbents, aerogel film sorbents, and the original precursor carbons for comparison.

A detailed description of the apparatus and its operation is provided in Dunham, G. E.; Miller, S. J., Chang, R.; Bergman, P. Environmental Progress 1998, 17, 203, which is incorporated herein by reference in its entirety. The bench scale mercury sorbent tests in the flue gas compositions were performed with finely (−400 mesh) powdered sorbents (37 mg) mixed with 113 mg sand and loaded on a quartz filter (2.5 inch (6.35 cm)). The loaded filter and holder were heated in an oven (125° C.) in the simulated flue gas stream (30 SCFH (standard cubic feet/hr) or 0.79 NCMH (normal cubic meters per hour)) containing the following: 0 2 (6%), $CO_2$ (12%), $SO_2$ (600 ppm), NO (120 ppm), $NO_2$ (6 ppm), HCl (1 ppm), $Hg^0$ (11 µg/m), $H_2O$ (15%), and $N_2$ (balance). Elemental mercury was provided by a standard permeation tube source placed in a double jacketed glass condenser, and heated to the desired temperature. Mercury concentrations in the gas streams were determined with a continuous mercury emission monitor (Sir Galahad mercury CEM mfr. P.S. Analytical Deerfield Beach Fla. USA), and a SnCh cell was used to convert oxidized species to elemental, so that both elemental and oxidized mercury concentration data could be obtained for both the influent and the effluent concentrations from the sorbent bed. Mercury concentrations were calibrated for the flow rates used. Spent sorbents were analyzed for mercury to determine the mass balance.

Figure 4:
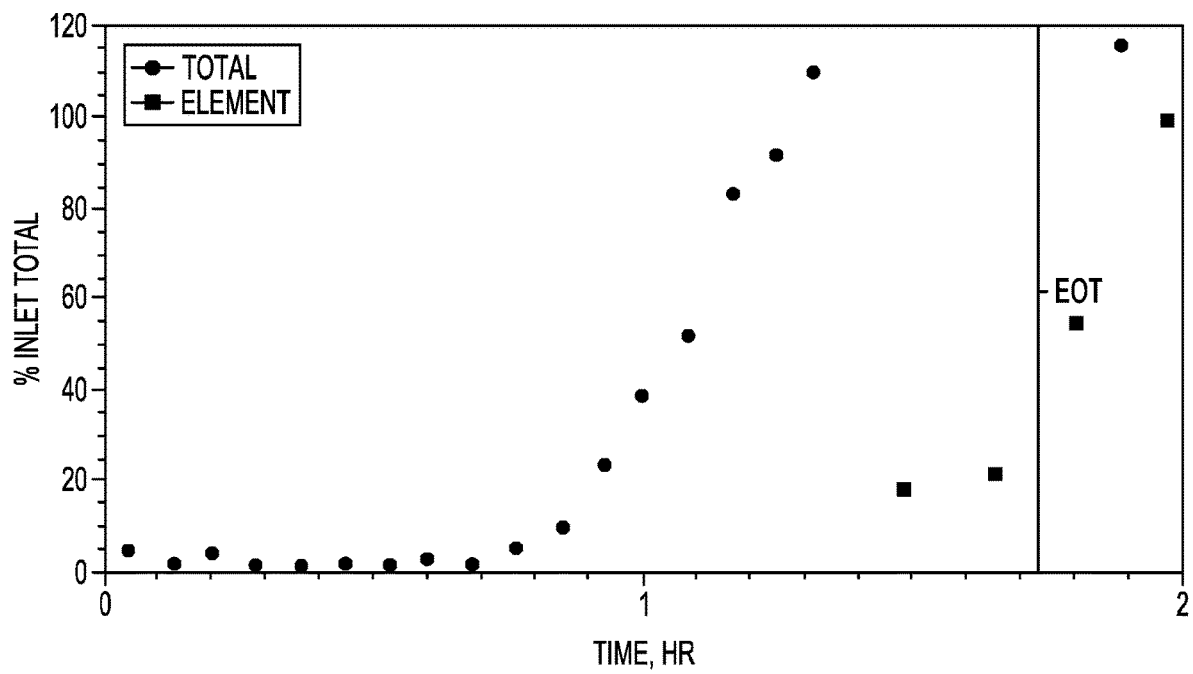
FIG. 4 is a diagram illustrating breakthrough curves for 5 wt/wt % brominated NORIT Darco FGD sorbent (37 mg+113 mg sand) in low-HCl (1 ppm) synthetic flue gas, in accordance with various embodiments.

Referring now to FIG. 4, the effluent mercury concentration data are plotted as a percent of the influent mercury versus time. The resulting curve (breakthrough curve) for the halogenated sorbents typically showed 0%-1% Hg in the effluent (99+% capture) at the beginning, and increasing only after 30-60 minutes (breakthrough point), depending on the sorbent. FIG. 4 illustrates the breakthrough curves for 5 wt/wt % brominated NORIT Darco FGD sorbent (37 mg+113 mg sand) with synthetic flue gas containing 1 ppm HCl. Total Hg (solid circles) and elemental Hg (solid squares) in the effluent are presented as a percent of the inlet Hg. "EOT" indicates the end of test (the later data points shown are for calibration checks).

Figure 5:
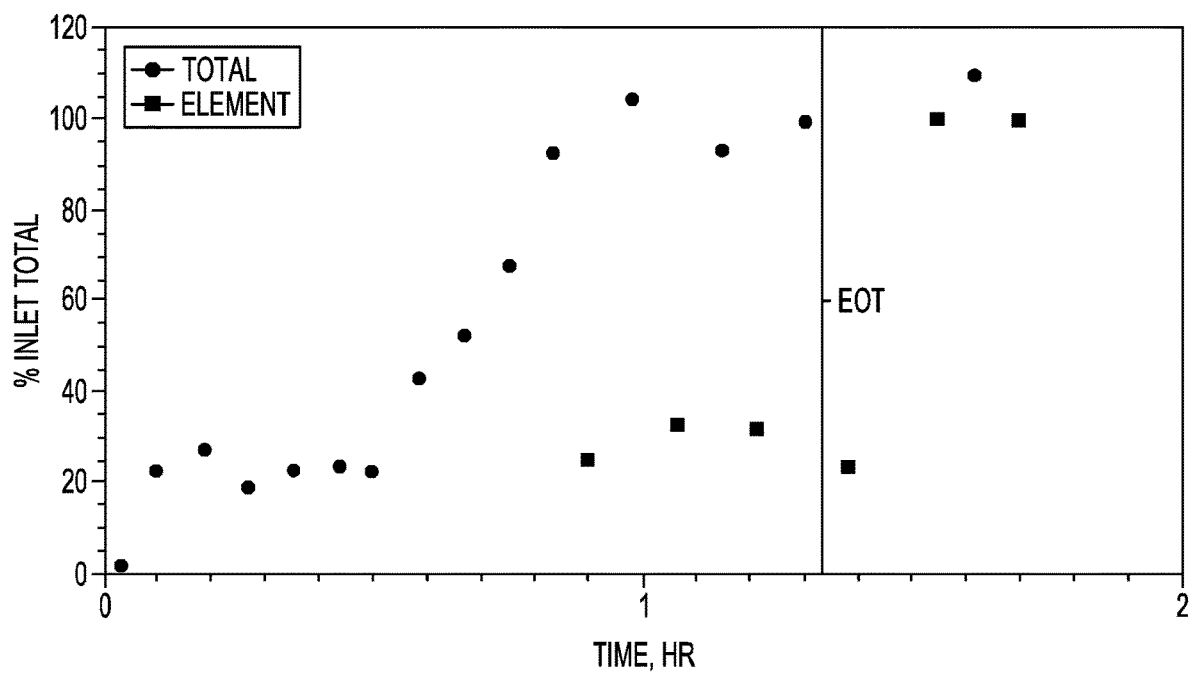
FIG. 5 is a diagram illustrating breakthrough curves for non-halogenated NORIT Darco FGD sorbent (37 mg+113 mg sand) in low-HCl (1 ppm) synthetic flue gas, in accordance with various embodiments.

FIG. 5 presents the comparative breakthrough curves for the corresponding nonhalogenated sorbents typically initiated at 5%-50% of inlet mercury, depending on the HCl concentration in the synthetic flue gas, thus indicating considerably lower reactivity for oxidation and capture of the mercury for the nonhalogenated sorbents. After breakthrough of either halogenated or nonhalogenated sorbent, most of the mercury in the effluent was oxidized mercury.

Example 1-2. Gas Phase Halogenation of Fluidized Carbon

A bed of activated carbon supported in a vertical tube by a plug of glass wool was fluidized by a nitrogen stream. The top of the fluidized bed tube was connected to a catching trap for carbon fines that blow out the top of the tube. The bromine gas generator as described in Example 1-1 was attached to the fluidized carbon bed and the desired amount of gaseous bromine was passed into the bed. The contents of the trap were then mixed with the material in the bed and weighed. The resulting brominated carbon exhibited properties similar to the brominated carbon of Example 1-1.

Example 1-3. Liquid Phase (Water) Halogenation

A 5% solution of bromine in water was prepared by carefully adding 50 g of bromine to 1 liter of cold water. One kg of activated carbon was added to the bromine solution in a large metal can. The resulting slurry was stirred with a large paddle during the addition and for a short time afterwards until all the bromine had reacted with the carbon, as indicated by the disappearance of the red color. The slurry was then filtered using a Buchner funnel under vacuum. The moist carbon that was collected on the filter was dried in an oven at 110° C. for several hours to constant weight. As in Example 1-1, some moisture remains in the carbon, however. The dried carbon was then tumbled in the rotating barrel with metal pieces to break up and fluff the carbon.

Example 1-4. Addition of the Optional Second Halide Component

Brominated carbon was produced by solution phase bromination similar to that described with reference to Example 1-3. However, before filtration, a solution of hydriodic acid (HI) was added to the slurry in an amount equal to 10% of the bromine amount. The slurry was stirred to complete the reaction and then filtered and dried as described in Example 1-3.

Example 1-5. Liquid Phase Phosphohalogenation

A solution of phosphorus tribromide (500 g) in ligroin (10 liters) was stirred in a large metal can and 10 kg of activated carbon was added. The resulting slurry was stirred with a large paddle at ambient temperature to complete the reaction. The slurry was filtered under vacuum on a large Buchner funnel in several batches. The wet filter cake was dried at 110° C. in an oven to constant weight. The dried product was fluffed in the rotating barrel as described in Example 1-3.

Example 1-6. Preparation and Sorption on Larger-Particle Carbon

Tests were conducted on a pilot-scale combustor while firing a subbituminous coal, to evaluate mercury control by injecting larger-than-normal sized treated activated carbon. Standard AC sorbents generally are of fine size with a mean particle diameter of less than 20 micrometers, which is also typical of the flyash that is generated from pulverized coal combustion. Consequently, because the sizes of standard AC and flyash are similar, separation of the two is difficult. Injection of larger sized AC is generally not considered because the sorbent effectiveness decreases with size.

In a scheme to recycle the injected carbon, the carbon is separated from the flyash. A separation based on size fractionation requires a treated larger particle sorbent. To test this concept, a treated larger sized (>60 μm) sorbent was developed, prepared, and tested.

Treatment—Gas Phase Halogenation.

Granular activated carbon (Calgon F400) was ground and sieved through conventional mesh screens. The mesh size fraction −170 to +240 (corresponding to about 60 to about 88 micrometers) was collected and placed in a rotating vessel as described in Example 1-1 above. In a separate vessel, gas phase bromine was generated by passing a nitrogen stream over a weighed amount of liquid bromine that was warmed to about 40°-50° C., and the outlet from this gaseous bromine generator was connected via a ¼ inch (6.35 mm) plastic hose to a stationary metal tube inserted through a flange in the center of the lid and passing into the center of the rotating vessel, also as described in Example 1-1. The unit was operated until the desired amount of bromine had combined with the carbon, in this case 0.05 kg of bromine to 1 kg of carbon (5 wt. %). When the reaction was completed, the carbon was weighed. The treated carbon was odorless as has been described above.

PTC Apparatus.

The pilot-scale combustor, known as the "Particulate Test Combustor" (hereinafter "PTC"), is a 550,000-Btu/hr (about 161 kW) pulverized coal ("PC")-fired unit, designed to generate combustion flue gas properties and fly ash that are representative of those produced in a full-scale utility boiler. The combustor is oriented vertically to minimize wall deposits. A refractory lining helps to ensure adequate flame temperature for complete combustion and prevents rapid quenching of the coalescing or condensing fly ash. Based on the superficial gas velocity, the mean residence time of a particle in the combustor is approximately 3 seconds. The coal nozzle of the PTC fires axially upward from the bottom of the combustor, and secondary air is introduced concentrically to the primary air with turbulent mixing. Coal is introduced to the primary air stream via a screw feeder and eductor. An electric air preheater is used for precise control of the combustion air temperature. Originally, the PTC used cold-water annular heat exchangers to provide flue gas temperature control to the baghouse (also referred to as a "fabric filter") or electrostatic precipitator (ESP). However, analysis of ash deposits collected from the heat exchangers indicated that some mercury was collected on the duct walls. To minimize this effect, the heat exchangers were modified to provide for higher duct wall temperatures.

The PTC instrumentation permits system temperatures, pressures, flow rates, flue gas constituent concentrations, and particulate control device (baghouse, Advanced Hybrid Particle Collector/AHPC™, and/or electrostatic precipitator/ESP) operating data to be monitored continuously and recorded on a data logger.

PTC Procedure.

Flue gas samples were taken at combinations of two of the three available system sample points: the furnace exit, the particulate control device inlet, and the particulate control device outlet. After passing through sample conditioners to remove moisture, the flue gas was typically analyzed for $O_2$, CO, $CO_2$, $SO_2$, and $NO_x$. Each constituent was normally analyzed at both the furnace exit and the outlet of the particulate control device simultaneously, using two analyzers. The concentration values from all of the instruments were recorded continuously. In addition, data were manually recorded at set time intervals. $NO_x$ was determined using a pair of Rosemount Analytical $NO_x$ chemiluminescent analyzers. $SO_2$ was measured using a pair of Ametek Instruments photometric gas analyzers. The remaining gases were measured by a pair of Rosemount Analytical multi-gas continuous emissions monitors. Each of these analyzers was regularly calibrated and maintained to provide accurate flue gas concentration measurements.

The baghouse vessel was a 20 inch (50.8 cm) (ID) chamber that is heat-traced and insulated, with the flue gas introduced near the bottom. The combustor produced about 200 ACFM (actual cubic feet per minute; about 5.7 actual $m^3$/min) of flue gas at 300° F. (about 150° C.), therefore three 13-ft by 5-inch (3.96 m by 12.7 cm) bags provided an air-to-cloth ratio of 4 ft/min (1.22 m/min). Each bag was cleaned separately in operation with its own diaphragm pulse valve. In order to quantify differences in pressure drop for different test conditions, the bags were cleaned on a time basis, rather than with the cleaning cycle initiated by pressure drop. Once bag cleaning was initiated, all three bags were pulsed in rapid succession on-line.

Tests were also conducted with a single-wire, tubular ESP replacing the fabric filter. The ESP unit was designed to provide a specific collection area of 125 at 300° F. (150° C.). Since the flue gas flow rate for the PTC is 130 SCFM (standard cubic feet per minute; about 3.7 NCMM (normal $m^3$/min)), the gas velocity through the ESP is 5 ft/min (about 1.52 m/min). The plate spacing for the ESP unit is 11 in (27.9 cm). The ESP was designed to facilitate thorough cleaning between tests so that all tests can begin on the same basis.

PTC Results.

Figure 6:
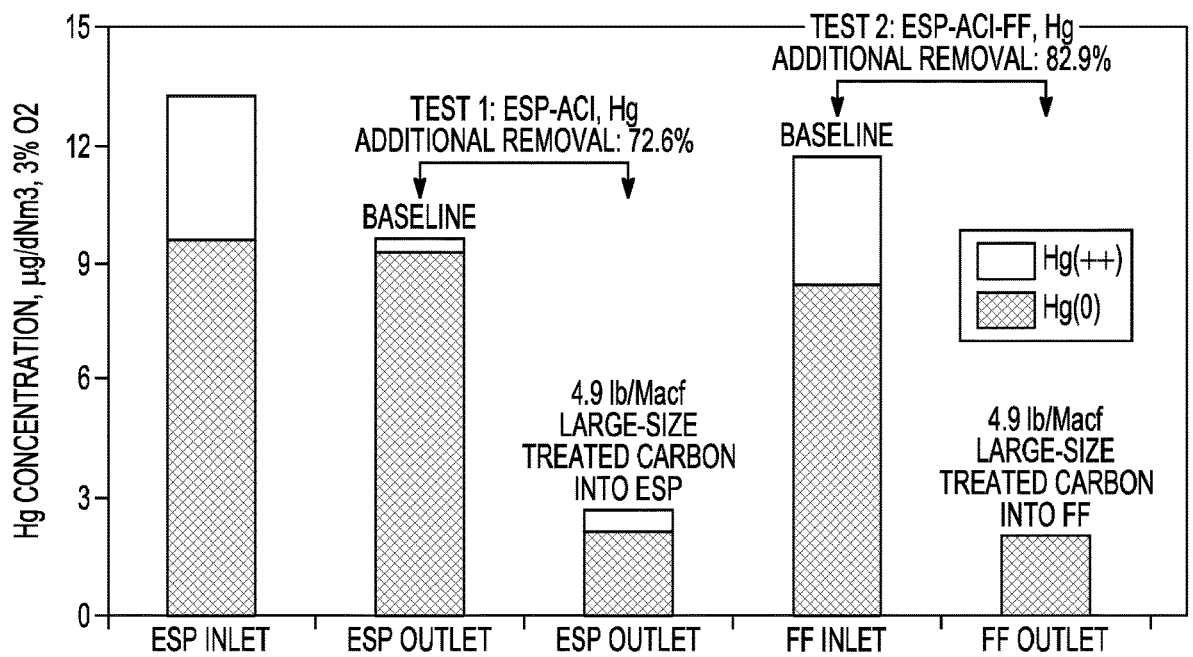
FIG. 6 is a bar chart illustrating pilot-scale mercury removal results, including large-size sorbent results, in accordance with various embodiments.

Results are illustrated in FIG. 6. As can be observed in FIG. 6, even though the tested sorbent particle size is significantly larger than normal sorbent particles, the treated larger-than-normal sized (that is, >60 micrometers) activated carbon sorbent was quite effective at capturing mercury. Approximately 75% of the mercury was captured when the larger-sized treated AC was injected ahead of the pilot-scale ESP, while approximately 85% of the mercury was captured when injected ahead of the pilot-scale fabric filter "FF"). Note that in FIG. 6 (and throughout) "Macf" (and "MACF") indicates million actual cubic feet (1 MACF is about 0.028 million actual cubic meters or "MACM").

Figure 7:
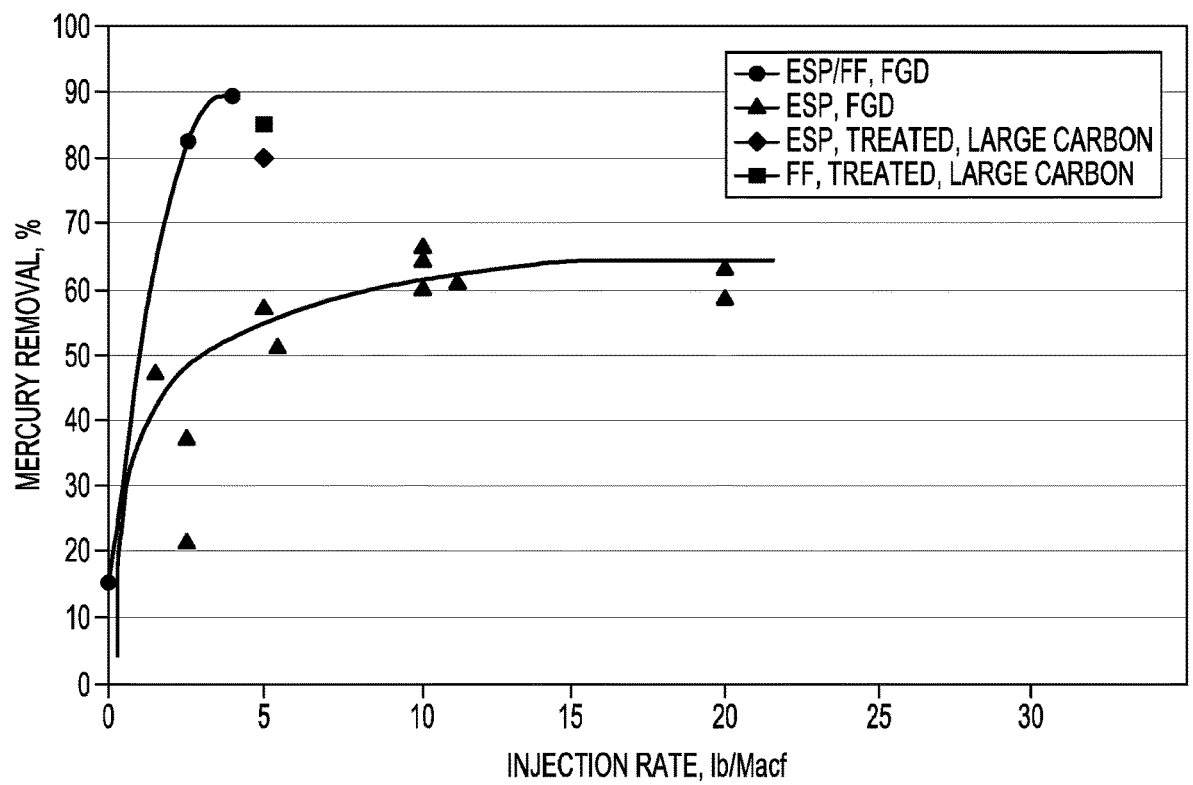
FIG. 7 is a diagram illustrating the effects of sorbent size and injection rate on mercury removal for ESPs and fabric filters, in accordance with various embodiments.

Referring now to FIG. 7, it can be observed that the larger-sized treated AC when injected ahead of the pilot-scale ESP (diamond symbol(s)) performed better than the finer standard AC (triangles) under the same arrangement. In comparison, when injected ahead of the fabric filter (FF), the larger-sized treated AC (square) performed similarly to slightly worse. However, for this application, the larger-sized treated AC can be physically separated from the smaller flyash particles, and the sorbent can then be regenerated, recycled, and reused. This will substantially improve overall utilization and economics. These data thus show that a larger-than-normal sized sorbent can provide effective mercury control and ease flyash and AC separation, thereby also preserving the characteristics of the flyash for sale and beneficial use. Accordingly, because >60 μm sorbent particles have been successfully demonstrated, superior mercury control can be obtained with >40 μm particles, which may be preferred in some applications, depending on the sorbent particle/ash separation system used. Note that in FIG. 7 (and throughout) "Macf" (and "MACF") indicates million actual cubic feet.

Example 1-7. Liquid Phase (Organic Solvent) Halogenation

A 5% solution of bromine in ligroin was prepared by carefully adding 50 g of bromine to 1 liter of cold ligroin. One kg of activated carbon was added to the bromine solution in a large metal can. The slurry was stirred with a large paddle during the addition and for a short time afterwards until all the bromine had reacted with the carbon as indicated by the disappearance of the red color. The slurry was filtered using a Buchner funnel under vacuum. The carbon cake that was collected on the filter was dried in an oven at 110° C. for several hours until it appeared dry and a constant weight was obtained. As in Example 1-1, some moisture was left in the carbon, however. The dried carbon was then tumbled in the rotating barrel with metal pieces to break up and fluff the carbon.

Example 1-8. Promoted Activated Carbon Sorbents

A bench-scale procedure based on the above description was used to test the initial activities and capacities of several promoted activated carbon sorbents using powdered carbon, including the bromine-containing activated carbons prepared from a commercially available sorbent and an aerogel carbon film sorbent, as well as the original precursor carbons for comparison. Bromine-treated carbons were prepared by impregnation of the powdered activated carbon precursors in a stirred solution of bromine in carbon tetrachloride or methylene chloride, or alternatively, in an aqueous solution of HBr, followed by drying in air at ambient temperature and drying in an oven at 100° C. in air or nitrogen. Bromine-treated carbons were also prepared by impregnating bromine from the gas phase by passing the gas through a rotating dry bed of the activated carbon precursor. The results indicated that adding a second component to the solution improved the capacity of the sorbent.

The carbons were initially tested in a heated bed, where a synthetic flue gas stream containing elemental mercury (11 g/m$^3$) was passed through the bed. Concentrations of total and elemental Hg in the effluent gas were determined using a Sir Galahad mercury CEM ("continuous emission monitor") (mfr. P S Analytical, Deerfield Beach, Fla., USA). The powdered sorbent was supported on a quartz filter during the test, and the other sorbents were tested as a triple layer. A comparison of the original commercial-grade powdered carbon sorbent with the sorbent after it was treated with 0.1 N HBr, and the powder was collected by centrifugation and drying, revealed that the mercury capture activity increased from an initial capture efficiency of about 50% of the Hg in the inlet to 100% capture. A comparison of the sorbent after subsequent regeneration with HBr indicated that it not only captured mercury at the same level as before (100% capture) but its capacity was prolonged by several minutes, and thus enhanced. Similar results were obtained with the carbon film and carbon fiber sorbents by treatment with molecular bromine in solution or in dry beds as described above.

Example 1-9. Fluidized/Ebulliated Bed Preparation

An activated carbon sorbent was prepared by treating the carbon by impregnating molecular bromine from a gas composition containing molecular bromine by flowing the gas through a liquid bromine reservoir in series with a fluidized bed or ebulliated bed of the carbon. The amount of bromine taken up by the carbon ranges (in one example) from <1 to about 30 g per 100 g of activated carbon, depending on the proportions used.

Example 1-10.—Full-Scale Testing

In this example, a baghouse (fabric filter) or ESP was used to collect particulates in the exhaust of a full-scale commercial pulverized coal-burning facility. A scrubber and sorbent bed were also used to remove undesired constituents from the flue gas stream, before being fed to the stack. In this Example, the halogen/halide promoted carbon sorbent was injected into the flue gas after the boiler. In general however, the inventive sorbent can be injected where desired (e.g., before, after, or within the boiler).

In one exemplary test conducted at a facility fired with lignite coal, the flue gas phase mercury (elemental) concentration was between 10 and 11 μg/m$^3$. The ash and injected carbon were collected in the baghouse at 350° F. to 375° F. (about 175-190° C.). Injection of commercial-grade activated carbon powder (untreated) at a rate of 1.0 lb/MACF ("MACF" and "Macf" represent one million actual cubic feet; 1.0 lb/MACF is about 16 kg/MACM (million actual cubic meters)) resulted in mercury effluent concentrations of 3.8-4.2 μg/m3 (representing 62%-58% removal of the mercury from the gas, respectively), and at 2.0 lb/MACF (about 32 kg/MACM), gave 74%-71% removal. Injection of the bromine-treated carbon at 1.0 lb/MACF resulted in 73%-69% removal and at 2.0 lb/MACF gave 86%-84% removal. Thus, a significant increase in the mercury capture was exhibited during use of the bromine promoted carbon sorbent of the present invention.

Example 1-11A. Addition of Optional Alkaline Component—Bench-Scale

The efficiency of the activated carbons for mercury capture can be improved considerably by employing a basic material co-injected with the activated carbon, in order to capture any oxidized mercury that may be released from the sorbent, or to capture some of the sulfur or selenium oxides in the flue gas that can have a detrimental effect on the sorbent capacity.

Figure 8:
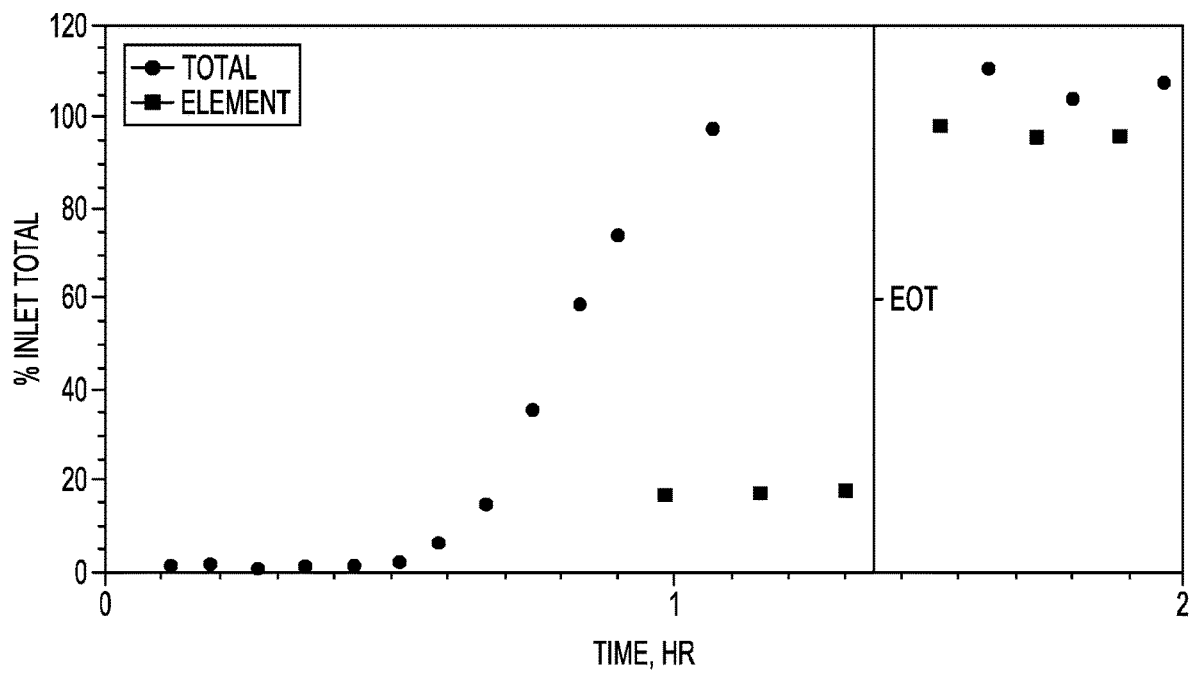
FIG. 8 is a diagram illustrating the breakthrough curves for a brominated NORIT Darco FGD sorbent with inert sand, in accordance with various embodiments.
Figure 9:
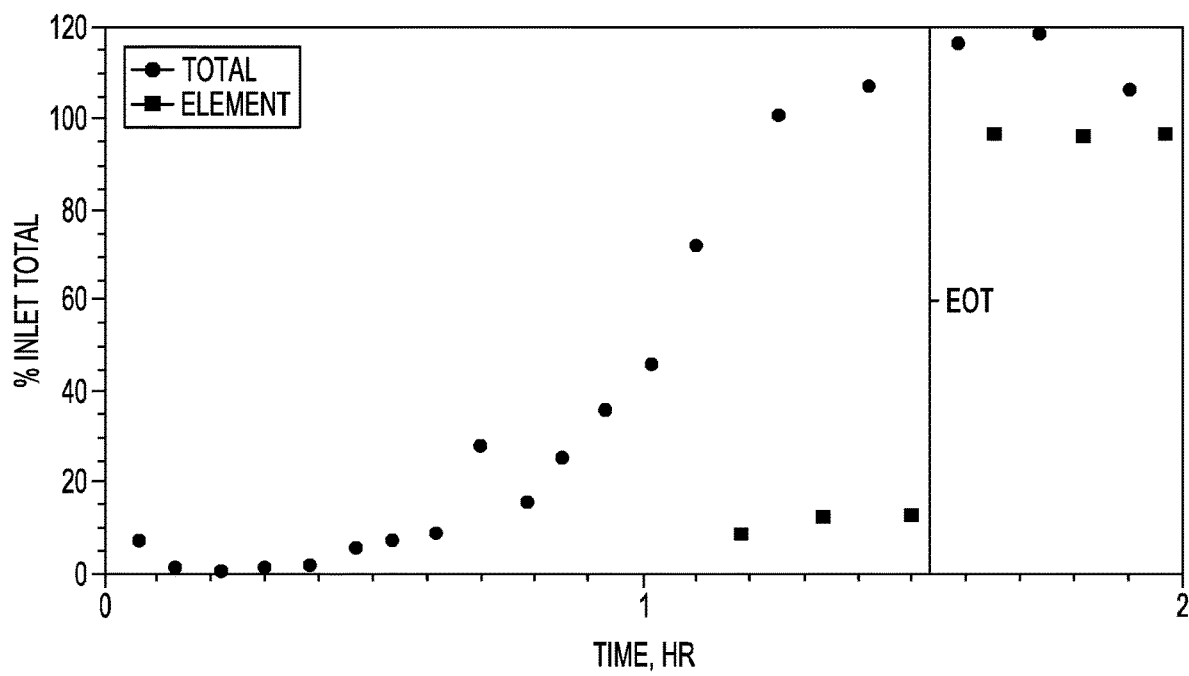
FIG. 9 is a diagram illustrating the breakthrough curves for brominated NORIT Darco FGD sorbent with a co-injected alkali material, in accordance with various embodiments.

Bench-scale testing was conducted by preparing a filter composed of 37 mg of brominated activated carbon mixed with 113 mg of calcium oxide. The test was conducted as described in Example 1-1 and compared with the same carbon sorbent but with an inert diluent. The breakthrough curve for the mixture of brominated (2%) NORIT Darco FGD sorbent with inert sand is shown in FIG. 8, and the breakthrough curve for the mixture with CaO is shown in FIG. 9. It can be seen that the point of 50% breakthrough improves to 65 minutes with the mixture with CaO from only 48 min with the sand mixture.

Example 11B. Addition of Optional Alkaline Component—Pilot-Scale

Tests were conducted on the pilot-scale PTC combustor described above with reference to Example 1-6 while firing a Texas lignite to evaluate mercury control by co-injecting a standard activated carbon (also referred to herein as "AC") and an alkali material upstream of a fabric filter.

Figure 10:
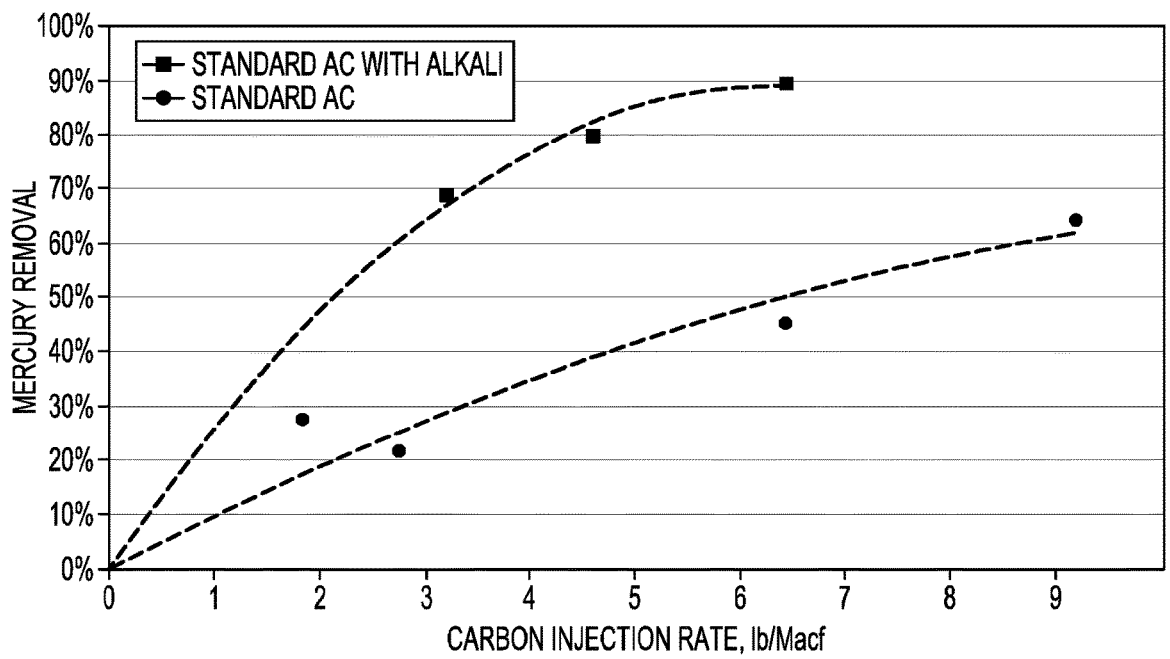
FIG. 10 is a plot of mercury removal vs. carbon injection rate with and without co-injection of alkali material, in accordance with various embodiments.

Typical results are illustrated in FIG. 10. As shown in FIG. 10, co-injecting lime with activated carbon vastly improved mercury removal. Mercury removals of approximately 90% were achieved with the co-injected sorbents, whereas less than 60% removal was achieved with the use of standard AC alone, even at much higher injection rates. Data from similar tests show that injecting similar quantities of sodium carbonate and AC, and lime and AC, resulted in mercury removals of approximately 80%, and 87%, respectively. These data suggest that other alkali can also be coinjected with AC to improve mercury removal. Other data show that flue gas temperature may impact the effectiveness of the alkali addition. Further test data indicate that flue gas contaminants, flue gas constituents ($SO_2$, $NO_x$, HCl, etc.), operating temperature, mercury form, and mercury concentration may impact the effectiveness of the alkali addition. This indicates that it may be desirable to be able to adjust and tailor, onsite, the alkali-to-AC ratio in order to optimize removal for a given set of site conditions.

Without wishing to be bound by any particular theory, the synergy observed in the improved performance when co-injecting the two materials can be explained as follows. First, tests indicate that binding sites on AC can be consumed by sulfur species and other contaminants. The alkali material interacts and reacts with these species thus minimizing their consumption of AC mercury binding sites. Second, other work has shown that standard AC will continue to oxidize mercury even though the binding sites are fully consumed. This oxidized mercury can then react with alkali material and subsequently be captured by the particulate control device. Thus, combining alkali with treated and/or non-treated AC synergistically takes advantage of these two mechanisms, resulting in improved mercury capture at reduced costs.

Example 1-12. Brominated Carbon Sorbent for Gasification Fuel Gas

Preparation of 5% $Br_2W$-AC.

Using a procedure similar to Example 1-3, a 2.5 wt/vol % solution of bromine in water was prepared. Granular Calgon F400 was added to the bromine solution to give a 5 wt/wt % brominated carbon product. The bromine solution was stirred with a large paddle during and after the addition until the red color in the water disappeared. The suspension was filtered by vacuum on a large Buchner funnel. The filter cake was dried in air, and then in an oven at 110° C. until a stable weight was obtained. The moisture was reduced to 15%.

Preparation of 5% Br2D-AC.

A brominated sorbent was prepared from $Br_2$ addition in solvent as described in Example 1-7, except that dichloromethane was used as the solvent instead of ligroin, and granular Calgon F400 was used.

Preparation of 5% $PBr_3$-AC.

A phosphohalogenated sorbent was prepared from $PBr_3$ using the method described in Example 1-5, except granular Calgon F400 was used.

Testing in Hydrogen Atmosphere—Procedure

To simulate the capture of mercury from a heated fuel gas or syngas from coal gasification, tests were conducted employing a stream including 10% vol/vol hydrogen in nitrogen passing through the sorbent at 500 cc/min. The stream contained 26.9 micrograms/$m^3$ of elemental mercury from a commercial mercury permeation source.

In the tests, the sorbent (0.5 g) was placed in a 0.39 inch (1 cm, inside diameter) glass tube fitted with a medium frit sintered glass filter disc to hold the sorbent in the gas stream. The tube containing the sorbent bed was connected to a gas inlet tube for introducing the gas stream containing the mercury vapor and at the outlet to a tube connection to the detector. The detector was a Semtech 2000 continuous mercury emission monitor. The tube was equilibrated in a nitrogen flow (450 cc/min) for 5 minutes at ambient temperature to protect the system. The detector showed 0 concentration of mercury in the effluent from the sorbent bed. (The blank run with no sorbent read 26.9 micrograms/$m^3$). The tube was then placed in an oven at the selected temperature for the test (from 250° to 400° C.). Effluent mercury concentration data from the detector were collected until the detector showed a constant reading for 5 minutes. Hydrogen (50 cc/min) was then added to the gas stream and detector readings were taken every 5 min. Tests were conducted at several oven temperatures for various periods of time up to 3 hours, depending on the temperature and sorbent. The elemental mercury concentration data were plotted as a percent of inlet mercury concentration versus time as in Example 1-1. All the mercury in the effluent was elemental, so a single detector was sufficient, and no $SnCl_2$ trap was needed to convert to elemental mercury (as in Example 1-1). The time for 50% breakthrough (time to reach 50% capture) was then determined from the breakthrough curves.

Results.

The results are shown in Table 1 (below) for the unbrominated sorbent (Calgon F-400), the brominated sorbents (5% Br2W-AC and 5% BrD-AC), and the phosphobrominated sorbent (5% $PBr_3$-AC). The maximum mercury concentration obtained in the effluent in each run is also reported in Table 1 for the time period indicated in the last column.

Under the reducing hydrogen conditions, the unbrominated sorbent broke through immediately and was exhausted after only 6.5 min. This complete failure occurred because the hydrogen reduces the captured mercury in the unbrominated sorbent at any temperature above 100° C.

Both of the brominated sorbents exhibited excellent reactivity and good capacity at all temperatures, up to at least 400° C. The phosphobrominated sorbent exhibited superior reactivity and capacity at all temperatures, up to at least 400° C.

TABLE 1

Times for 50% Breakthrough. Maximum Observed Hg Concentrations for Sorbents (10% Hydrogen Streams).

| Sorbent | Temp (° C.) | 50% breakthrough (min) | Maximum [Hg] (μg/$m^3$) | Time (min) |
|---|---|---|---|---|
| F-400 | 250 | 6 | 20.3 | 6.5 |
| 5% Br2W-AC | 250 | >150 | 1.4 | 150 |
| 5% Br2W-AC | 300 | >180 | 4.3 | 180 |
| 5% Br2W-AC | 350 | 160 | 15.1 | 180 |
| 5% Br2W-AC | 400 | 60 | 13.9 | 65 |
| 5% PBr3-AC | 250 | >140 | 0.4 | 140 |
| 5% PBr3-AC | 300 | >150 | 0.5 | 150 |
| 5% PBr3-AC | 350 | >150 | 1.4 | 150 |
| 5% Br2D-AC | 350 | >180 | 2.1 | 180 |
| 5% Br2D-AC | 400 | >180 | 10.9 | 180 |

Part II. Activated Carbon Sorbent Including Nitrogen.

Example 2-1. Impregnation of Nitrogen Precursors into a Char Followed by Carbonization and Activation of the Impregnated Char Example 2-1a. Carbon Precursor A carbon (20×60 mesh) prepared by steam activation of a lignite char was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was reactivated at 750° C. for 2 hours under nitrogen stream.

Example 2-1 b. Char Precursor

A char (20×60 mesh) prepared by heating a lignite at 400° C. was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was activated at 750° C. for 2 hours under nitrogen stream.

Example 2-1c. Wood Charcoal Precursor

A carbon (20×60 mesh) prepared by steam activation of a wood char was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was reactivated at 750° C. for 2 hours under nitrogen stream.

Example 2-1d. Wood Charcoal—Alanine

A carbon (20×60 mesh) prepared by steam activation of a wood char was stirred with an aqueous solution of dextrose and alanine in ratio of 1 part of carbon to 0.016 parts of ethanolamine and 0.034 parts of alanine. The water solvent was removed by rotovaporation and the impregnated carbon was air-dried. The dried material was reactivated at 750° C. for 2 hours under nitrogen stream.

Example 2-2. Tube Reactor Testing

The molecular sieve carbons obtained as described in Examples 2-1a to 2-1d were impregnated with 5 wt % of sulfuric acid. The impregnated carbon was then dried in an oven at 110° C. The carbon (0.100 g) was packed into a 3 mm diameter pyrex tube and held in place by glass wool plugs at both ends. A constriction in the pyrex tube at exit end prevented the plug from blowing out. The reactor tube was heated in a GC oven at 150° C.±0.50 as a constant temperature device. The mercury vapor was contained in an air flow of 100 $cm^3$/min through the reactor tube at a concentration of 429-447 micrograms/$m^3$, determined with a continuous mercury vapor monitor.

The mercury source was a temperature-calibrated permeation tube. The permeation tube was heated in a double-jacketed glass condenser with a circulating hot silicone oil system. The concentration in the effluent air stream from the reactor tube was monitored with a continuous cold-vapor UV mercury vapor monitor (EPM). Blank runs were conducted before each carbon test to determine the mercury concentration. The instrument was zeroed with an air stream passed through a large iodized carbon filter. This apparatus thus gave the percent of mercury not removed by the carbon bed (the concentration of mercury in the outlet divided by the concentration of mercury in the inlet, times 100). For the nitrogenous molecular sieve carbons (Examples 2-1 to 2-4) only 1% of the mercury vapor was not removed by the carbon bed over a period of several hours.

Example 2-3. Filter Bed Testing

The sorbent carbon pretreated as in Example 2-1e was ground to about 200 mesh and introduced into a tube where it could be drawn by reduced pressure onto a teflon or quartz filter held in a stainless steel holder. The carbon-impregnated filter and holder were then placed in the oven under air flow and tested as described in Example 2-2.

Example 2-4. Impregnation of Nitrogen-Containing Polymers into an Activated Carbon or Char Followed by Carbonization and Activation of the Impregnated Material

Example 2-4a. Vinylpyrrolidone-Acrylic Acid Copolymer

A carbon prepared by steam activation of a lignite was stirred with an aqueous solution of poly(vinylpyrrolidone-co-acrylic acid) for 30 min. The amount of the polymer was selected to provide loadings of 1% to 30% by weight. The solvent was evaporated by rotovaping at 50° C. and further dried in an oven at 110° C. The impregnated carbon was reactivated by heating at 750° C. for 2 hours in a stream of nitrogen. Approximately 40% of the polymer weight was converted to surface coating and 60% was volatilized.

Example 2-4b. Vinylpyrrolidone-Vinyl Acetate Copolymer

An activated carbon was impregnated with poly(vinylpyrrolidone-co-vinyl acetate) dissolved in dichloromethane. The solvent was evaporated and the impregnated carbon died in an oven at 110° C. The impregnated carbon was then activated by heating at 750° C. for 2 hours in a nitrogen stream.

Example 2-4c. Poly(Vinylpyrrolidone)

An activated carbon was impregnated with one of poly (vinylpyrrolidone) and the copolymers described in Examples 2-4a to 2-4b and activated as described in Example 2-4a.

Example 2-4d. Poly(Vinylpyrrolidone)

A KOH-activated lignite was impregnated with one of polyvinylpyrrolidone and and the copolymers described in Examples 2-4a to 2-4b and activated as described in Example 2-4a.

Example 2-4e. Wood-Derived Charcoal

Wood-derived charcoal was impregnated with one of poly(vinylpyrrolidone) and the copolymers described in Examples 2-4a to 2-4b and activated as described in Example 2-4a.

Example 2-4f. Carbonization of a Lignite. (Hypothetical Example)

Chars are produced by carbonization of a lignite, impregnated by one of poly(vinylpyrrolidone) and the copolymers described in Examples 2-4a to 2-4b, and activated as described in Example 2-4a. As an alternative, steam activation can be used.

Example 2-4g. Steam Activation

Examples 2-4a to 2-4b were carried out using steam activation of the carbon material impregnated with nitrogen-containing polymers to generate effective sorbents.

Example 2-5. Impregnation of Nitrogen Precursors into a Coal, Lignite, or Leonardite, Followed by Carbonization and Activation of the Impregnated Material

Example 2-5a. 1,4-Diazabicyclo[2.2.2]octane (DABCO)

Lignite (as received) was stirred with an aqueous solution of DABCO in a ratio of 1 part of coal to 0.02 parts of DABCO. The water solvent was removed by filtration, and the impregnated coal was air-dried. The dried material was carbonized at 400° C. and activated at 750° C. for 2 hours under a nitrogen stream.

Example 2-5b. Sulfamic Acid

Lignite (as received) was stirred with an aqueous solution of sulfamic acid in a ratio of 1 part of coal to 0.02 parts of sulfamic acid. The water solvent was removed by filtration, and the impregnated coal was air-dried. The dried material was carbonized and activated at 750° C. for 2 hours under a nitrogen stream.

Example 2-5c. Carbonized Lignite

Lignite was carbonized at 400° C. for 30 minutes, and the resulting char was treated by stirring with sulfamic acid solution as described in Example 2-5b. The treated char was then activated as described in Example 2-5b.

Example 2-5d. Steam Activation

Steam activation of the DABCO or sulfamic acid-impregnated chars was also effective in producing mercury sorbent carbons.

Example 2-6. Preparation of Nitrogen-Containing Pitches

Nitrogen-containing pitches were prepared using a procedure reported by Mochida et al. (Mochida, I.; An, K. H.; Korai. Y. Carbon 1995, 33, 1069). Preparations are summarized in Table 2. As an example, a mixture of isoquinoline (26 g, 0.2 mole), anhydrous aluminum(III) chloride (13.3 g, 0.25 mole), and nitrobenzene (7.68 g, 0.06 mole) was placed in a two-necked flask equipped with a reflux condenser and a nitrogen inlet tube. The mixture was refluxed at 280° C. for 4 hours. The residue was extracted with 0.1 N hydrochloric acid and filtered. The residue was washed with 0.1 N hydrochloric acid. The residue was further extracted with methanol to remove any monomer. The methanol-insoluble pitch was dried in vacuo. The yield of the pitch was 49%. A portion of the nitrogen-containing pitches were carbonized using Procedure A or B in a nitrogen stream, as described in Example 2-7.

TABLE 2

Preparation of nitrogen-containing pitches.

| Substrate (g, mole) | Catalyst (g, mole) | Cocatalyst (g, mole) | Temperature (° C.) | Time (hr) | Yield (g, %) | Soluble (%) |
|---|---|---|---|---|---|---|
| Indole (10, 0.77) | None | None | 253* | 4 | 9.6 (96%) | Methanol (100) |
| Quinoxaline (26, 0.2) | AlCl₃ (13.3, 0.1) | Nitrobenzene (7.68, 0.06) | 225* | 4 | 13.5 (52%) | EDA** |
| Carbazole (16.7, 0.1) | AlCl₃ (27.7, 0.2) | Nitrobenzene (3.6, 0.03) | 25 | 12 | 59.1 (92%) | EDA** |
| Isoquinoline (26, 0.2) | AlCl₃ (13.3, 0.1) | Nitrobenzene (7.68, 0.06) | 280 | 4 | 6.5 (25%) | EDA** |

*indicates reactions carried out in 300-mL Parr reactor.
**indicates ethylenediamine.

Several modifications of the method were utilized for the quinoline polymerization. In addition to the flask method, a Parr reactor was used for the reaction, and temperatures and reaction times were varied. The yields are reported in Table 3. In this procedure, 64.5 g of quinoline and 33.25 g of aluminum(III) chloride were placed in a 300-mL Parr autoclave. The reactor was sealed under nitrogen and heated at 280° C. for 4 hours. The hard black mass was extracted with 0.1 N hydrochloric acid followed by extraction with methanol and drying in vacuo. In order to determine the solubility of the polymer, a 10-g portion of this black mass was extracted with 100 mL of ethanol. Extraction data showed that 27 wt % of the product dissolved in ethanol.

TABLE 3

Preparation of nitrogen-containing pitches.

| Quinoline (g) | AlCl₃ (g) | Temp. (° C.) | Time (hr) | Yield (g, %) | Ethanol-S (g) | Ethanol-I (g) |
|---|---|---|---|---|---|---|
| 64.5 | 33.25 | 280 | 12 | 57.7 (89%) | — | — |
| 64.5* | 33.25 | 175 | 12 | 0 (0%) | — | — |
| 64.5* | 33.25 | 280 | 12 | 59.1 (92%) | — | — |
| 64.5* | 33.25 | 280 | 4 | 56.8 (88%) | 7.3** (73%) | 2.7 (27%) |

*indicates reactions carried out in 300-mL Parr reactor.
**indicates 10 g of pitch was extracted with ethanol.

Example 2-7. Preparation of Nitrogen-Impregnated Carbon

Impregnations and recarbonizations were performed to investigate the effects of precursor concentration, activation procedure, and sorbent particle size on mercury sorption. The precursor base carbon, granular activated carbon (Calgon F400 or Gascoyne AC, 20×60) was impregnated with various nitrogen-containing polymers and pitches using an incipient wetness method, described below. For the fine-particle sorbent tests in flue gas compositions, the Calgon carbon was ground to about a 400 mesh size prior to impregnation. The nitrogen polymers such as vinylpyrrolidone polymers and copolymers are commercially available.

The urea, alanine-dextrose, piperazine-dextrose, and polyethylenimine-dextrose compositions were prepared similarly.

In a typical procedure for the incipient wetness method, the desired amount of polymer or pitch dissolved in an appropriate solvent was added to the carbon slowly with thorough mixing. The paste was dried to remove solvent. The dried product was packed in a stainless steel tube and activated in a gentle flow of nitrogen using procedure A or procedure B.

Procedure A included: Heated from 25° C. to 400° C. at 10° C./min; held at 400° C. for 30 min; heated from 400° to 750° C. at 20° C./min; and held at 750° C. for 4 hr.

Procedure B included: Heat from 25° C. to 225° C. at 15° C./min; heated from 225° C. 270° C. at 1° C./min; held at 270° C. for 1 hr; cooled to room temperature; heated up to 750° C. at 15° C./min; and held at 750° C. for 4 hr.

Example 2-8. Preparation of Nitrogen-Containing Carbons from Insoluble Fractions Insoluble fractions of pitches described in Table 2 were converted into nitrogen-containing carbons by heating in a gentle flow of nitrogen using Procedure B as described above. The resulting carbons were porous glassy materials, similar to cokes.

Example 2-9. Preliminary Screening of Sorbents Made Using the Nitrogen Containing Materials of Examples 6-7 for Mercury Capture

Example 2-9a. Simulation of the Sulfuric Acid Accumulation

Capture of $SO_3$ and subsequent sulfuric acid formation on the surface of the nitrogen containing carbons in the hot flue gas stream was simulated by adding 5 wt % sulfuric acid by the incipient wetness method. The acid-impregnated carbons were dried at 110° C.

Example 2-9b. Packed-Bed Tests

Packed-bed tests in airflow were conducted on the granular carbon products to evaluate the effects of surface modification. The mercury sorption was tested in a flow-through tubular reactor system equipped with continuous in-line mercury analysis of the effluent from the bed to determine mercury removal rates as a function of time. Integration of breakthrough volumes allows determination of mercury sorption per unit mass carbon (mg/g). Air with an elemental mercury concentration of 56 or 81 µg/m³ was passed through the heated (150° C.) reactor. To obtain this concentration, the mercury source was placed in a double-jacketed glass condenser and heated to the desired temperature by pumping hot oil through the condenser.

A glass tube with constriction and glass wool plug was used as the reactor for the mercury sorption tests. A gas chromatography (GC) oven was used as a constant temperature (150° C.) chamber for the reactor. Before the actual test, a blank test was run. The glass tube was attached to the source and the mercury analyzer by Teflon tubes. Mercury vapors diluted with air (2000-4000 cm³/min or 4-8 scfh measured at the detector end) were passed through the tube. The mercury analyzer (Environmental and Process Monitoring [EPM] continuous vapor monitor) was interfaced to a Hydra and personal computer (PC) to record the data. For the packed-bed tests, impregnated activated carbons (20× 60-mesh size) were used. In an actual test, about 0.2-0.6 g of sorbent was packed in the glass tube and held by glass wool plugs on both ends. The tests were conducted with a source temperature of 150° C., an oven temperature of 150° C., and an airflow=4 or 8 scfh (4000 cm³/min). Numerous tests were performed at 4000 cm³/min (8 scfh) with carbons prepared by impregnation of various nitrogen compounds, polymers, and pitches into a base Calgon carbon (Tables 4 and 5). These conditions gave partial breakthroughs for the sorbents and allowed comparisons of their kinetic activities.

TABLE 4

Sorbent testing of surface-treated carbons for mercury removal at 8 scfh.

| Carbon source | Recarbonization method | $H_2SO_4$ Impregnation | % Hg removed (time, min) | | |
|---|---|---|---|---|---|
| | | | Initial | 50% | End of test |
| Blank | — | — | 0 (0) | <1 | — |
| Calgon | | 5% | 87 (0) | 50 (171) | 38 (304) |
| Calgon/urea | A | 5% | 95 (0) | 50 (305) | 49 (306) |
| EERC*/urea | A | 5% | 100 (0) | 50 (575) | 38 (1221) |
| Calgon/2% sulfamic acid | A | 5% | 92 (0) | 50 (226) | 39 (1303) |
| Calgon/5% PVP | A | 5% | 94 (0) | 50 (2217) | 42 (2574) |
| Calgon/10% PVP | A | 5% | 88 (0) | 50 (150) | 55 (253) |
| Calgon/10% PVP | A | 5% | 90 (0) | 50 (300) | 65 (1098) |
| Calgon/5% PVP | A | 5% | 98 (0) | 50 (3315) | 43 (4010) |
| Calgon/2% PVP | A | 5% | 79 (0) | 50 (312) | 49 (320) |
| Calgon/10% PVP | A | 5% | 85 (0) | 50 (424) | 30 (1114) |

TABLE 4-continued

Sorbent testing of surface-treated carbons for mercury removal at 8 scfh.

| Carbon source | Recarbonization method | $H_2SO_4$ Impregnation | % Hg removed (time, min) | | |
|---|---|---|---|---|---|
| | | | Initial | 50% | End of test |
| Calgon/5% vinylpyrrolidone-vinyl acetate copolymer | A | 5% | 90 (0) | 50 (84) | 39 (180) |
| Calgon/5% vinylpyrrolidone-acrylic acid copolymer | A | 5% | 90 (0) | 50 (76) | 29 (362) |
| Calgon/5% vinylpyrrolidone-acrylic acid copolymer | A | 5% | 98 (0) | 50 (223) | 50 (223) |
| Calgon/polyethylenimine | A | 5% | 88 (0) | 50 (373) | 22 (1147) |
| Calgon/dextrose + polyethylenimine | A | 5% | 88 (0) | 50 (51) | 35 (350) |
| Calgon/dextrose + alanine | A | 5% | 88 (0) | 50 (76) | 53 (216) |
| Calgon/dextrose + piperazine | A | 5% | 65 (0) | 50 (35) | 25 (942) |

Airflow = 4000 cm³/min (8 scfh), over temperature = 150° C., mercury concentration = 81 µg/m³.
*indicates that the activated carbon was prepared in Example 2-4a.

TABLE 5

Sorbent testing of nitrogenous pitch-impregnated carbons for mercury capture. Recarbonization procedure B was used for all samples.

| File name | Sorbent (g) | $H_2SO_4$ (wt %) | Mercury Concentration (µg/m³) | % Hg removed (time, min) | | |
|---|---|---|---|---|---|---|
| | | | | Initial | 50% | Final |
| RKS32 | None | — | 81 | — | 50 <1 | — |
| RKS35 | Calgon/5 wt % quinolone * | 5% | — | 89 (0) | 50 (306) | 49 (308) |
| RKS23 | Calgon/5 wt % quinolone * | 5% | — | 91 (0) | 50 (204) | 46 (292) |
| RKS37 | Calgon/5 wt % quinoxaline | 5% | — | 90 (0) | 50 (632) | 25 (1300) |
| RKS31 | Calgon/5 wt % isoquinoline | 5% | — | 90 (0) | 54 (584) | 34 (1214) |
| RKS75 | Calgon/5 wt % indole | 5% | — | 98 (0) | 50 (1403) | 49 (1473) |

Sorbent = 0.20 g, particle size = 20 × 50 mesh, airflow = 8 scfh (4000 mL/min), source temperature = 150° C., oven temperature = 150° C.
* indicates pitch obtained from heating quinolone and aluminum(III) chloride in Parr reactor was dissolved in ethanol and impregnated on Calgon carbon.
** indicates pitch obtained from refluxing of quinolone with aluminum(III) chloride was dissolved in EDA and impregnated on Calgon carbon.

Example 2-9c. Test Results

Carbons prepared by impregnation of urea or sulfamic acid into the Calgon base carbon and recarbonization gave initial capture rates of 95% or 92%, respectively. These results are significantly better than those observed with the unmodified Calgon carbon. Testing the urea carbon at lower temperature (75° C.) gave 100% initial capture. Carbons prepared by impregnation of a nitrogen-containing polymer were highly active in these tests. The sorbent prepared by impregnation of 5 wt % PVP and activated using procedure A (fast heating rate) demonstrated superior activity. The initial removal was 94%, and the decrease to 50% removal required 2217 min. Thus this sorbent retains its high activity far longer than the urea carbon. The sorbent prepared using 10% PVP (also Procedure A) was less active (initially 88% removal decreasing to 50% at 150 min.

Using procedure B (slower heating rate) gave more active sorbent at the 10% PVP concentration level. Another set of carbons was prepared with different concentrations using Procedure B. Again, the impregnation with 5% concentration of PVP resulted in high activity (initially 98% removal, decreasing to 50% at 3315 mm). The 10% PVP was again less active, and the 2% PVP concentration was the least active.

The carbons prepared from the copolymers of PVP were also prepared and evaluated. The copolymer with vinyl acetate (PVPcoVA) impregnated at 5% concentration (Procedure A) gave a sorbent with relatively low activity. The poly(vinylpyrrolidone-co-acrylic acid) (PVPcOAA) at 5% also gave a low activity sorbent. Using Procedure B for activation improved the activity slightly.

Another type of N-polymer-impregnated carbon was prepared using polyethylenimine. This polymer precursor contains nitrogen in the polymer backbone, in contrast to the PVP where the nitrogen is attached to the carbon chain backbone. The activity was similar to that of the 10% PVP polymers.

Several carbons were prepared by impregnating mixtures of dextrose and amines. None of these exhibited high activities in these tests. Previous tests showed that the dextrose+alanine-impregnated carbon (Procedure B) was fairly active. Since Procedure A was used in the present study, decreases in activity might be related to the fast heating rate used. It may be quite beneficial to perform the reaction slowly in preparing sorbents from these precursors.

The sorbents prepared by impregnation of the nitrogenous pitches prepared by polymerization of various heterocyclics were all fairly active (Table 5), but significant differences in activity were observed. The N-carbon prepared from impregnation of quinoxaline pitch was 2-3 times more active than the quinoline-derived N-carbon. The activity of the isoquinoline-derived carbon was also very high. The high activity of the indole-derived carbon was also of great interest. It is an important lead since indoles are more readily available than the quinoxaline precursors.

Testing was also conducted on the carbonized pitches prepared from the insoluble fractions of the nitrogenous pitches. The activities of the carbonized pitches were very poor. Initial breakthrough was substantial, with percent removals of 21% to 54%, possibly related to the glassy nature of the carbonized pitches. Although the surface areas were not determined, they may be very low, since the materials did not resemble activated carbons but, rather, cokes.

Part III. Promoted Ammonium Salt-Protected Sorbent.

Example 3-1. Full-Scale Plant with Low-Sulfur Coal and $SO_3$ Injection for Ash Conditioning Tests were conducted on a full-scale 550 Mw plant equipped with an ESP for particulate control and that burns a low-sulfur coal for $SO_2$ compliance. $SO_3$ ash conditioning was used to assist the ESP in controlling opacity and particulate matter (PM) stack emissions. During the test, $SO_3$ was injected upstream of the ESP in the range of 0-20 ppmv. The addition of $SO_3$ to the flue gas has been previously shown to significantly negatively impact mercury capture efficiency. All tests were conducted at full load.

During the test, a halogen promoter (NaBr, to form HBr) was injected into the furnace along with three different sorbents included activated carbon and additional components to protect mercury binding sites. These sorbents were injected upstream of the air heaters. Sorbent 1 was approximately 75% activated carbon and 25% clay material (bentonite, as described in U.S. Pat. No. 8,652,235 B2). Sorbent 2 was approximately 75% activated carbon and 25% hydrated lime (per U.S. Pat. No. 7,435,286 B). Sorbent 3 included approximately 75% activated carbon and 25% ammonium sulfate. The activated carbon component had a mean size of approximately 14-18 microns. Each of the other three components (clay, alkali, and ammonium salt) had a mean size of approximately 4-9 microns. The halogen promoter was injected with rates in the range of 0.0-0.7 lb/Macf (million actual cubic feet) and the sorbents were injected in the range of 0-7 lb/Macf. Each sorbent was tested separately along with the halogen promoter.

Figure 11:
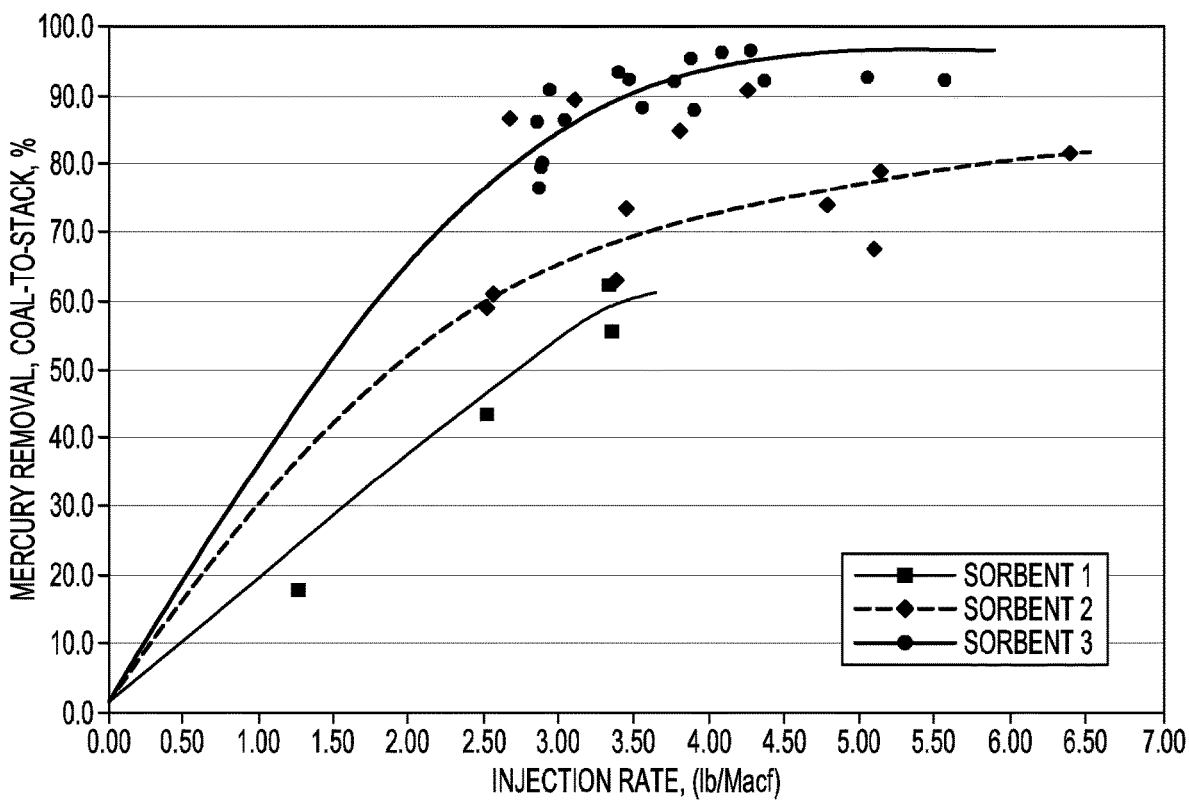
FIG. 11 illustrates mercury removal versus sorbent injection rate, according to various embodiments.

Typical results are illustrated in FIG. 11 while 5-6 ppmv of $SO_3$ was injected. As shown in FIG. 11, the addition of the alkaline component (lime) or the ammonium salt with the activated carbon vastly improved mercury removal. Sorbent 3 and 2 performed better than Sorbent 1, which based on past data generally performs similar to slightly better than standard activated carbon alone. The results show that adding ammonium salts resulted in consistent mercury removals of greater than 90% and addition of alkali components showed greater than 80% with some results up to 90%. FIG. 11 clearly shows the impact of $SO_3$ on the binding sites of activated carbon when no alkaline or ammonium salt component was added (e.g., for Sorbent 1). While the addition of optional components such as alkali and ammonium convincingly assist in protecting binding sites, they cannot totally eliminate the impact of contaminant flue gas components, such as $SO_3$.

Figure 12:
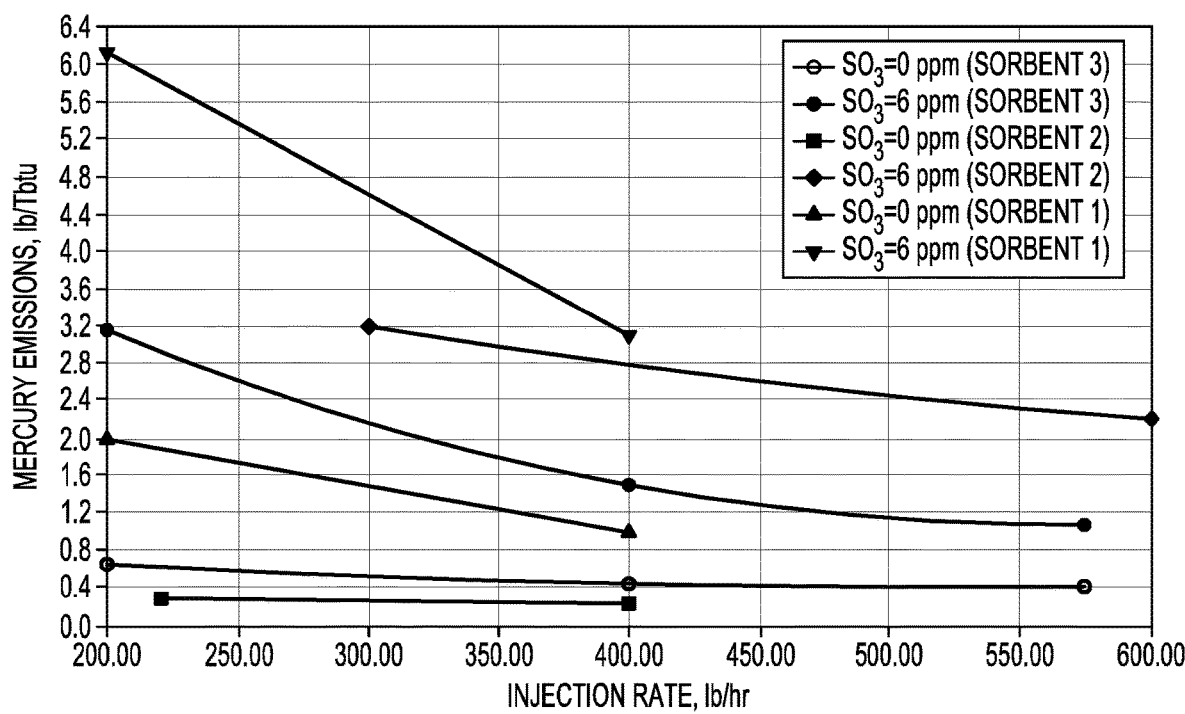
FIG. 12 illustrates mercury emissions versus sorbent injection rate at various $SO_3$ injection rates for various sorbents, in accordance with various embodiments.

Data from similar tests show that injecting similar quantities of other alkali and ammonium along with activated carbon show improved mercury capture. This indicates that synergy occurs that improves performance when adding (or co-injecting) two materials together. FIG. 12 illustrates mercury emissions versus injection rate at various $SO_3$ injection rates (0 or 6 ppmv) for Sorbent 2 or 3. The results indicate that binding sites on activated carbon can be consumed by sulfur species and other contaminants. The ammonium and/or alkali material (together or separately) interact and react with these species thus minimizing their consumption of activated carbon mercury binding sites. Further, the addition of these components may also further promote the activated carbon such that it is more reactive toward mercury capture. Thus, combining additional components with treated and/or non-treated activated carbon synergistically takes advantage of these mechanisms, resulting in improved mercury capture at reduced costs. Further, depending on the operating conditions and the presence of different flue gas constituents/contaminants ($NO_x$, $SO_2$, $SO_3$, selenium oxides, etc.), to optimize overall capture of mercury at each plant (and thereby reduce costs), different components, different combinations of components, or different ratios of components may be needed.

Example 3-2. Full-Scale Plant with High Sulfur Coal

Tests were conducted on a full-scale 150 Mw plant equipped with an ESP for particulate control. During the test, the plant burned a blended coal with a sulfur content of approximately 2%. High sulfur coals produce flue gas contaminants (sulfur species, $SO_2$, $SO_3$, etc.) that significantly impact mercury capture efficiency. $SO_2$ emissions of 1200-1600 ppm were measured at the stack and $SO_3$ concentrations of 15-25 ppm were measured in the flue gas at the point of sorbent injection. All tests were conducted at full load.

During the test, a halide promoter (NaBr, to form HBr) was injected into the furnace along with three different sorbents including activated carbon and additional components to protect mercury binding sites. These sorbents were injected upstream of the air heaters, with limited distance and residence time between the air heaters and ESP inlet. Sorbent 1 was approximately 75% activated carbon and 25% clay material (bentonite, as described in U.S. Pat. No. 8,652,235 B2). Sorbent 2 was approximately 75% activated carbon and 25% hydrated lime (per U.S. Pat. No. 7,435,286 B2. Sorbent 3 was approximately 75% activated carbon and 25% ammonium salts (ammonium sulfate specifically). The activated carbon and added components had a mean size of approximately 6-9 microns. Larger sized sorbents were tested, but were shown to be not as effective. The halogen promoter was injected at rates in the range of 0.0-4.0 lb/Macf (million actual cubic feet) and the sorbents were injected in the range of 0-20 lb/Macf. Each sorbent was tested separately along with the halogen promoter with results discussed below.

Figure 13:
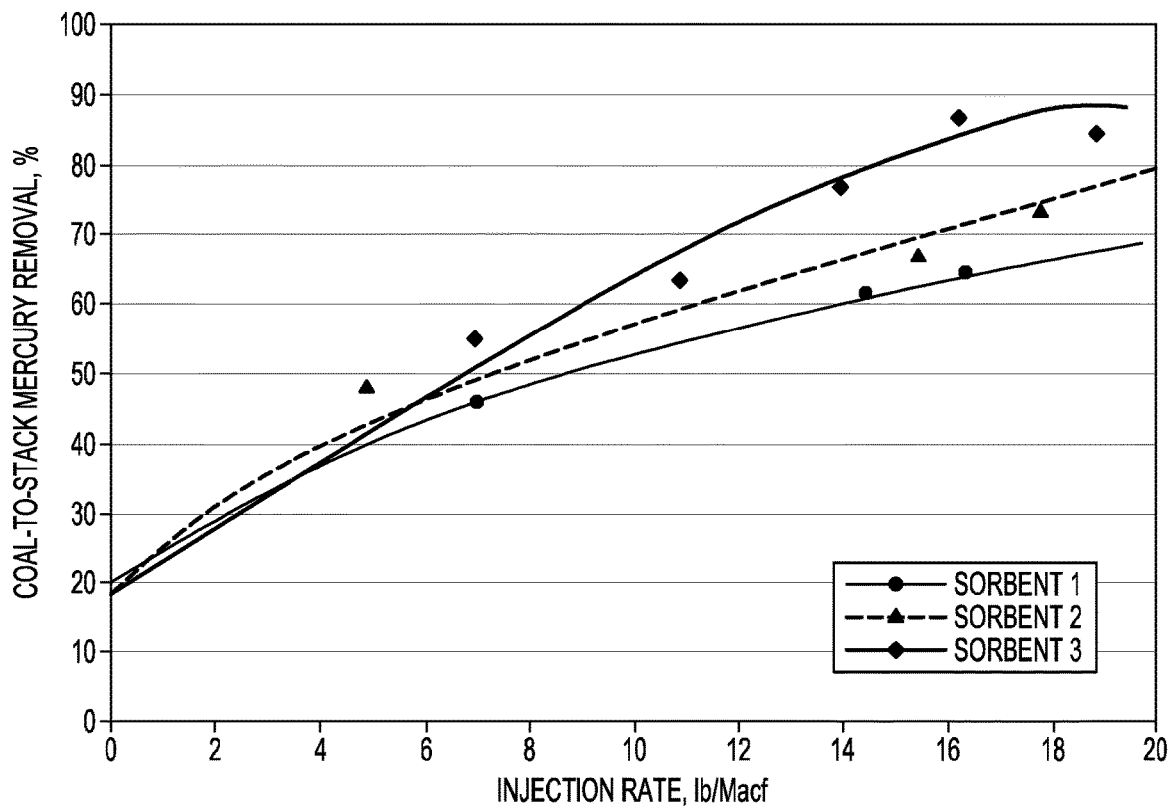
FIG. 13 illustrates mercury removal versus injection rate of sorbent for various sorbents, in accordance with various embodiments.
Figure 14:
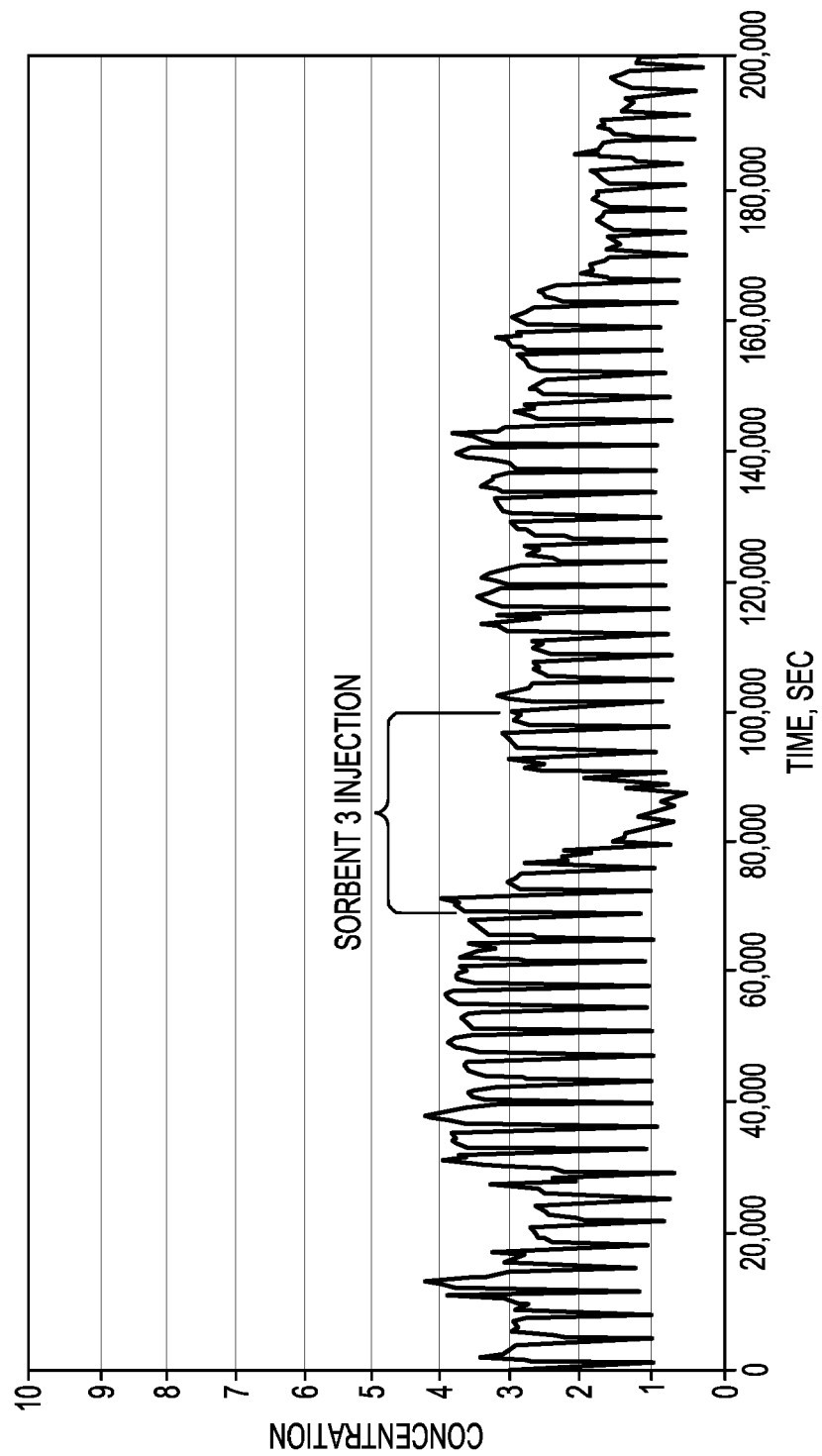
FIG. 14 shows mercury concentration versus time while a sorbent including an ammonium salt was injected with a promoter, in accordance with various embodiments.
Figure 15:
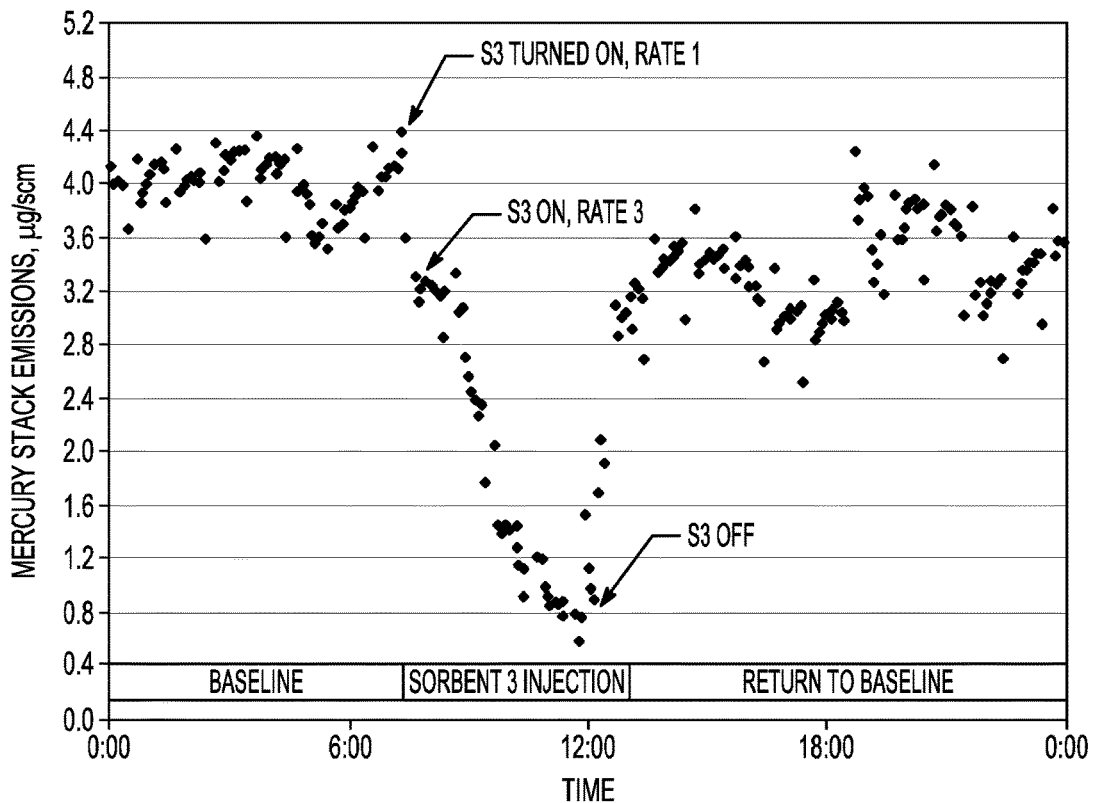
FIGS. 15-16 illustrate mercury emissions versus time with and without injection of a sorbent including an ammonium salt at various rates, in accordance with various embodiments.
Figure 16:
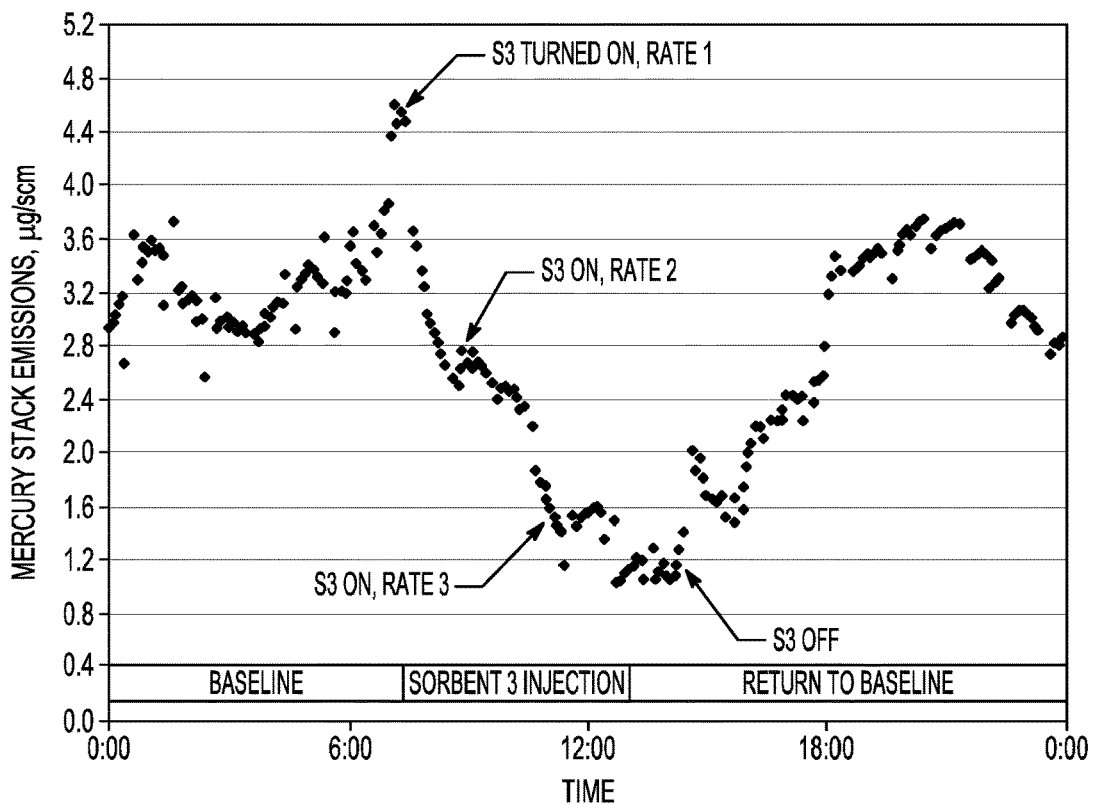

Typical results are illustrated in FIG. 13. As shown in FIG. 13, the addition of a second component with activated carbon vastly improved mercury removal. Sorbent 3 and 2 performed better than sorbent 1, which based on past data generally performs similar to slightly better than standard activated carbon alone. The data shows that adding ammonium salts resulted in mercury removals approaching 90% and addition of alkali components showed greater than 70%. FIG. 14 shows the raw continuous monitor mercury data as Sorbent 3 was injected along with the halide promoter. FIGS. 15 (day 1) and 16 (day 2) show the rather rapid decline in mercury emissions as Sorbent 3 injection is turned on and as injection rates are increased. The slight difference observed in mercury capture between the two days is that on day 2 the $SO_2$ concentration at the stack was 200-300 ppm higher than day 1.

While the addition of optional components such as alkali and ammonium convincingly assist in protecting binding sites, they cannot totally eliminate the impact of contaminant flue gas components (e.g., sulfur species such as $SO_2$ and $SO_3$) that are generated when combusting a high sulfur coal. Data from similar tests show that injecting similar quantities of other alkali and ammonium along with activated carbon show improved mercury capture. This indicates that synergy occurs that improves performance when adding (or co-injecting) two materials together. FIG. 12 illustrates that binding sites on activated carbon can be consumed by sulfur species and other contaminants. The ammonium and/or alkali material (together or separately) interact and react with these species thus minimizing their consumption of activated carbon mercury binding sites. Further, the addition of these components may also further promote the activated carbon such that it is more reactive toward mercury capture. Thus, combining additional components with treated and/or non-treated activated carbon synergistically takes advantage of these mechanisms, resulting in improved mercury capture at reduced costs. Further, depending on the operating conditions and the presence of different flue gas constituents/contaminants ($NO_x$, $SO_2$, $SO_3$, selenates, etc.), it is necessary to use different components (or combination thereof) and/or different ratios to optimize overall capture of mercury at each plant; thereby reducing costs.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method for separating mercury from a mercury-containing gas stream, the method comprising:

contacting a mercury-containing gas stream with an activated carbon sorbent comprising promoted ammonium salt-protected activated carbon sorbent particles, to form a mercury-sorbent composition; and separating at least some of the mercury-sorbent composition from the mercury-containing gas stream, to give a separated gas.

Embodiment 2 provides the method of Embodiment 1, further comprising combusting coal to form the mercury-containing gas stream.

Embodiment 3 provides the method of any one of Embodiments 1-2, wherein the mercury-containing gas stream comprises a concentration of sulfur(VI) that is about 1 ppm-2000 ppm.

Embodiment 4 provides the method of any one of Embodiments 1-3, wherein the activated carbon sorbent combines with about 0.001 wt % to about 100 wt % of mercury in the mercury-containing gas stream to form the mercury-sorbent composition.

Embodiment 5 provides the method of any one of Embodiments 1-4, wherein the activated carbon sorbent combines with at least about 70 wt % of mercury in the mercury-containing gas stream to form the mercury-sorbent composition.

Embodiment 6 provides the method of any one of Embodiments 1-5, wherein the activated carbon sorbent is in a fixed bed, in a moving bed, in a scrubber, in a filter, suspended in the mercury-containing gas stream, or a combination thereof.

Embodiment 7 provides the method of any one of Embodiments 1-6, further comprising injecting a sorbent into the mercury-containing gas stream, wherein the injected sorbent is the activated carbon sorbent comprising the promoted ammonium salt-protected activated carbon sorbent particles, the injected sorbent is a precursor of the activated carbon sorbent comprising the promoted ammonium salt-protected activated carbon sorbent particles with halide-promotion, ammonium salt-protection, or a combination thereof, occurring after the injection of the precursor, or a combination thereof.

Embodiment 8 provides the method of Embodiment 7, wherein the injected sorbent is the activated carbon sorbent comprising the promoted ammonium salt-protected activated carbon sorbent particles.

Embodiment 9 provides the method of any one of Embodiments 7-8, wherein the precursor is a promoted non-ammonium salt-protected activated carbon sorbent, wherein the ammonium salt-protection occurs after injection of the precursor into the mercury-containing gas stream.

Embodiment 10 provides the method of any one of Embodiments 7-9, wherein the precursor is an ammonium salt-protected non-promoted activated carbon sorbent, wherein the halide-promotion occurs after injection of the precursor into the mercury-containing gas stream.

Embodiment 11 provides the method of any one of Embodiments 7-10, wherein the precursor is a non-promoted non-ammonium salt-protected activated carbon sorbent, wherein halide-promotion and ammonium salt-protection occurs after injection of the precursor in the mercury-containing gas stream.

Embodiment 12 provides the method of any one of Embodiments 1-11, wherein the activated carbon sorbent comprises an alkaline component selected from the group consisting of alkali elements, alkaline earth elements, alkali salts, alkaline earth salts, and combinations thereof.

Embodiment 13 provides the method of any one of Embodiments 1-12, wherein the activated carbon sorbent comprises a mercury-stabilizing reagent selected from the group consisting of S, Se, $H_2S$, $SO_2$, $H2Se$, $SeO_2$, $CS_2$, $P_2S_5$, and combinations thereof.

Embodiment 14 provides the method of any one of Embodiments 1-13, wherein the activated carbon sorbent further comprises a substrate comprising at least one of diatomaceous earth, a clay, a zeolite, or a mineral.

Embodiment 15 provides the method of Embodiment 14, wherein the activated carbon sorbent comprises a product of subjecting a mixture comprising a carbonaceous material and the substrate to heating, microwaving, irradiating, or a combination thereof, comprises a material derived from the product via one or more of halide-promotion and ammonium salt-protection, or a combination thereof.

Embodiment 16 provides the method of Embodiment 15, wherein the heating comprises heating to about 100° C. to about 1200° C.

Embodiment 17 provides the method of any one of Embodiments 15-16, wherein the heating of the mixture comprising the carbonaceous material and the substrate to form the product thereof is performed prior to contacting the activated sorbent and the mercury-containing gas stream.

Embodiment 18 provides the method of any one of Embodiments 1-17, wherein the activated carbon sorbent comprises a carbon nanocomposite sorbent.

Embodiment 19 provides the method of any one of Embodiments 1-18, wherein the promoted ammonium salt-protected activated carbon sorbent particles comprise promoted ammonium salt-protected powdered activated carbon, granular activated carbon, carbon black, carbon fiber, aerogel carbon, pyrolysis char, or a combination thereof.

Embodiment 20 provides the method of Embodiment 19, wherein the promoted ammonium salt-protected powdered activated carbon, granular activated carbon, carbon black, carbon fiber, aerogel carbon, pyrolysis char, or a combination thereof have a particle size of about 0.1 µm to about 1000 µm.

Embodiment 21 provides the method of any one of Embodiments 19-20, wherein the promoted ammonium salt-protected powdered activated carbon, granular activated carbon, carbon black, carbon fiber, aerogel carbon, pyrolysis char, or a combination thereof have a particle size of about 0.1 µm to about 30 µm.

Embodiment 22 provides the method of any one of Embodiments 1-21, wherein the promoted ammonium salt-protected activated carbon sorbent particles comprise a product of subjecting a mixture comprising a carbonaceous material and a nitrogenous material to heating, microwaving, irradiating, or a combination thereof, comprise a material derived from the product via one or more of halide-promotion and ammonium salt-protection, or a combination thereof.

Embodiment 23 provides the method of Embodiment 22, wherein the promoted ammonium salt-protected activated carbon sorbent particles comprise a product of acid or base treatment of the product of subjecting a mixture comprising a carbonaceous material and a nitrogenous material to heating, microwaving, irradiating, or a combination thereof.

Embodiment 24 provides the method of any one of Embodiments 22-23, wherein the carbonaceous material comprises powdered activated carbon, granular activated carbon, carbon black, carbon fiber, aerogel carbon, pyrolysis char, brown sugar, barley sugar, caramel, cane sugar, corn syrup, starch, molasses, a glucan, a galactan, a xylan, a sugar waste product, or a combination thereof.

Embodiment 25 provides the method of any one of Embodiments 22-24, wherein the nitrogenous material comprises a nitrogen-containing organic or inorganic material.

Embodiment 26 provides the method of Embodiment 25, wherein the nitrogenous material comprises a nitrogen heterocycle, a nitrogen-containing polymer or copolymer, a nitrile, a carbamate, an amino acid, nitrobenzene, hydroxylamine, urea, hydrazine, sulfamic acid, an ammonium salt, or a combination thereof.

Embodiment 27 provides the method of any one of Embodiments 25-26, wherein the nitrogenous material comprises indole, quinoxaline, carbazole, isoquinoline, nitrobenzene, urea, sulfamic acid, polyvinylpyrrolidone, vinylpyrrolidone-vinyl acetate copolymer, vinylpyrrolidone-acrylic acid copolymer, vinylpyrrolidone-maleic acid copolymer, polyethylenimine, alanine, piperazine, quinolone, quinoxaline, diazabicyclooctane, an amino acid, an ammonium salt, or a combination thereof.

Embodiment 28 provides the method of any one of Embodiments 1-27, wherein the promoted ammonium salt-protected activated carbon comprises a halide, a hydrogen halide, or a combination thereof.

Embodiment 29 provides the method of Embodiment 28, wherein the halide, hydrogen halide, or combination thereof is about 0.001 wt % to about 30 wt % of the promoted ammonium salt-protected activated carbon.

Embodiment 30 provides the method of any one of Embodiments 28-29, wherein the halide, hydrogen halide, or combination thereof is about 1 wt % to about 15 wt % of the promoted ammonium salt-protected activated carbon.

Embodiment 31 provides the method of any one of Embodiments 1-30, wherein the promoted ammonium salt-protected activated carbon comprises ammonia, the ammonium salt, or a combination thereof.

Embodiment 32 provides the method of Embodiment 31, wherein the ammonia, the ammonium salt, or the combination thereof, is about 0.001 wt % to about 30 wt % of the promoted ammonium salt-protected activated carbon.

Embodiment 33 provides the method of any one of Embodiments 31-32, wherein the ammonia, the ammonium salt, or the combination thereof, is about 0.01 wt % to about 15 wt % of the promoted ammonium salt-protected activated carbon.

Embodiment 34 provides the method of any one of Embodiments 1-33, wherein the promoted ammonium salt-protected activated carbon comprises an anionic counterion of the ammonium salt.

Embodiment 35 provides the method of Embodiment 34, wherein the anionic counterion of the ammonium salt is about 0.001 wt % to about 30 wt % of the promoted ammonium salt-protected activated carbon.

Embodiment 36 provides the method of any one of Embodiments 34-35, wherein the anionic counterion of the ammonium salt is about 0.01 wt % to about 15 wt % of the promoted ammonium salt-protected activated carbon.

Embodiment 37 provides the method of any one of Embodiments 1-36, wherein the promoted ammonium salt-protected activated carbon sorbent particles comprise nitrogen atoms in at least a surface layer thereof.

Embodiment 38 provides the method of Embodiment 37, wherein the surface layer of the promoted ammonium salt-protected activated carbon sorbent particles is a continuous surface layer.

Embodiment 39 provides the method of any one of Embodiments 37-38, wherein the surface layer of the promoted ammonium salt-protected activated carbon sorbent particles has a thickness of about 0.001% to about 99% of a radius of the particles.

Embodiment 40 provides the method of any one of Embodiments 37-39, wherein the surface layer of the promoted ammonium salt-protected activated carbon sorbent particles has a thickness of about 0.001% to about 50% of a radius of the particles.

Embodiment 41 provides the method of any one of Embodiments 37-40, wherein the surface layer of the promoted ammonium salt-protected activated carbon sorbent particles comprises about 0.001 wt % to about 99 wt % nitrogen.

Embodiment 42 provides the method of any one of Embodiments 37-41, wherein the promoted ammonium salt-protected activated carbon sorbent particles have an overall nitrogen atom concentration of about 0.001 wt % to about 50 wt %.

Embodiment 43 provides the method of any one of Embodiments 37-42, wherein a concentration of nitrogen atoms in the surface layer is greater than a concentration of nitrogen atoms in a core of the promoted ammonium salt-protected activated carbon sorbent particles.

Embodiment 44 provides the method of Embodiment 43, wherein the core of the promoted ammonium salt-protected activated carbon sorbent particles comprises about 0 wt % to about 99 wt % nitrogen atoms.

Embodiment 45 provides the method of any one of Embodiments 43-44, wherein the core of the promoted ammonium salt-protected activated carbon sorbent particles comprises about 1 wt % to about 6 wt % nitrogen atoms.

Embodiment 46 provides the method of any one of Embodiments 43-45, wherein the surface layer of the promoted ammonium salt-protected activated carbon sorbent particles comprises about 0.001 wt % to about 99 wt % nitrogen atoms.

Embodiment 47 provides the method of any one of Embodiments 43-46, wherein the surface layer of the promoted ammonium salt-protected activated carbon sorbent particles comprises about 5 wt % to about 80 wt % nitrogen atoms.

Embodiment 48 provides the method of any one of Embodiments 37-47, wherein nitrogen atoms are substantially homogeneously distributed throughout the promoted ammonium salt-protected activated carbon sorbent particles.

Embodiment 49 provides the method of any one of Embodiments 37-48, wherein the nitrogen in the surface layer decreases neutralization of carbocations in the promoted ammonium salt-protected activated carbon sorbent particles by at least one of $SO_3$, $H_2SO_4$, and $HSO_4^{1-}$, as compared to corresponding promoted ammonium salt-protected activated carbon sorbent particles comprising less or substantially no nitrogen in a corresponding particle surface layer.

Embodiment 50 provides the method of any one of Embodiments 37-49, wherein the nitrogen in the surface layer at least partially blocks carbocations in the promoted ammonium salt-protected activated carbon sorbent particles from at least one of $SO_3$, $H_2SO_4$, and $HSO_4^{-1}$, as compared to a corresponding promoted ammonium salt-protected activated carbon sorbent particles comprising less or substantially no nitrogen in a corresponding particle surface layer.

Embodiment 51 provides the method of any one of Embodiments 37-50, wherein the mercury-containing gas stream further comprises a concentration of sulfur(VI) that is greater than about 0 ppm by mole and the activated carbon sorbent forms a mercury-sorbent composition at a higher absorption rate relative to a corresponding activated carbon sorbent comprising less or substantially no ammonium salt-protection.

Embodiment 52 provides the method of any one of Embodiments 1-51, wherein the mercury-containing gas stream further comprises a concentration of sulfur(VI) that is greater than about 0 ppm by mole and the activated carbon sorbent forms a mercury-sorbent composition at a higher absorption rate relative to a corresponding activated carbon sorbent comprising at least one of
 a) less or substantially no halide- or halogen-promotion, wherein the activated carbon sorbent comprising the activated carbon sorbent particles is halide- or halogen-promoted, and
 b) less or substantially no ammonium salt-protection.

Embodiment 53 provides the method of any one of Embodiments 1-52, wherein the promoted ammonium salt-protected activated carbon sorbent particles have a particle size of about 0.1 µm to about 1000 µm.

Embodiment 54 provides the method of any one of Embodiments 1-53, wherein the promoted ammonium salt-protected activated carbon sorbent particles have a particle size of about 0.1 µm to about 10 µm.

Embodiment 55 provides the method of any one of Embodiments 1-54, wherein the promoted ammonium salt-protected activated carbon sorbent particles are promoted prior to addition to the mercury-containing gas stream.

Embodiment 56 provides the method of any one of Embodiments 1-55, further comprising promoting precursor activated carbon sorbent particles with a promoter to form promoted activated carbon sorbent particles.

Embodiment 57 provides the method of Embodiment 56, wherein promoting precursor activated carbon sorbent particles with the promoter comprises chemically reacting carbene species edge sites in the activated carbon sorbent particles with the promoter.

Embodiment 58 provides the method of any one of Embodiments 56-57, wherein promoting precursor activated carbon sorbent particles with the promoter comprises subjecting a mixture comprising the precursor activated carbon sorbent particles and the promoter to heating, microwaving, irradiating, or a combination thereof.

Embodiment 59 provides the method of any one of Embodiments 56-58, wherein during the promoting the promoter is substantially in vapor or gaseous form.

Embodiment 60 provides the method of any one of Embodiments 56-59, wherein the promoting of the precursor activated carbon sorbent particles occurs in-flight in the mercury-containing gas stream.

Embodiment 61 provides the method of any one of Embodiments 56-60, wherein the promoting of the precursor activated carbon sorbent particles occurs prior to addition of the activated carbon sorbent particles to the mercury-containing gas stream.

Embodiment 62 provides the method of any one of Embodiments 56-61, further comprising combusting coal that comprises the promoter, a promoter precursor, or a combination thereof.

Embodiment 63 provides the method of Embodiment 62, wherein the promoter precursor transforms into the promoter which then reacts with a precursor activated carbon sorbent to give a promoted activated carbon sorbent.

Embodiment 64 provides the method of any one of Embodiments 62-63, further comprising adding the promoter, promoter precursor, or a combination thereof, to the coal prior to the combustion thereof.

Embodiment 65 provides the method of Embodiment 64, wherein the promoter, promoter precursor, or a combination thereof, is added to the coal in an organic solvent.

Embodiment 66 provides the method of Embodiment 65, wherein the organic solvent is a hydrocarbon, a chlorinated hydrocarbon, supercritical carbon dioxide, or a combination thereof.

Embodiment 67 provides the method of any one of Embodiments 56-66, wherein the promoting occurs in an aqueous scrubber, wherein the scrubber comprises an aqueous slurry that comprises the promoter.

Embodiment 68 provides the method of any one of Embodiments 56-67, further comprising injecting into the mercury-containing gas stream the promoter, a promoter precursor, or a combination thereof.

Embodiment 69 provides the method of Embodiment 68, wherein the promoter, promoter precursor, or a combination thereof, is added together with the precursor activated carbon sorbent particles into the mercury-containing gas stream.

Embodiment 70 provides the method of any one of Embodiments 68-69, wherein the promoter, promoter precursor, or a combination thereof, is added into the mercury-containing gas stream separately from addition of the precursor activated carbon sorbent particles into the mercury-containing gas stream.

Embodiment 71 provides the method of any one of Embodiments 56-70, wherein the promoter is HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, NHBr, $NH_4Cl$, $NH_4I$, $NH_4F$, or a combination thereof.

Embodiment 72 provides the method of any one of Embodiments 56-71, wherein the promoter is HBr.

Embodiment 73 provides the method of any one of Embodiments 56-72, further comprising forming the promoter from a promoter precursor.

Embodiment 74 provides the method of Embodiment 73, wherein the promoter precursor is an elemental halogen, a Group V halide, a Group VI halide, a hydrohalide, an ammonium halide, a metal halide, a nonmetal halide, an alkali earth metal halide, an alkaline earth metal halide, or a combination thereof.

Embodiment 75 provides the method of any one of Embodiments 73-74, wherein the promoter precursor is NaBr, NaCl, NaI, $Br^-$, $Cl^-$, $I^-$, KI, KCl, LiCl, LiBr, $CuCl_2$, $CuBr_2$, AgCl, AgBr, $CHI_3$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, or a combination thereof.

Embodiment 76 provides the method of any one of Embodiments 73-75, wherein the promoter precursor has a particle size of about 0.1 µm to about 1000 µm.

Embodiment 77 provides the method of any one of Embodiments 1-76, further comprising protecting promoted activated carbon sorbent particles with an ammonium salt, to form the promoted ammonium salt-protected activated carbon sorbent particles.

Embodiment 78 provides the method of Embodiment 77, wherein protecting promoted activated carbon sorbent particles with the ammonium salt comprises subjecting a mixture comprising the promoted activated carbon sorbent particles and the ammonium salt to heating, microwaving, irradiating, or a combination thereof.

Embodiment 79 provides the method of Embodiment 78, wherein the mixture comprising the promoted activated carbon sorbent particles and the ammonium salt has a ratio of the promoted activated carbon sorbent particles to the ammonium salt of about 1:100 to about 100:1.

Embodiment 80 provides the method of any one of Embodiments 78-79, wherein the mixture comprising the promoted activated carbon sorbent particles and the ammonium salt has a ratio of the promoted activated carbon sorbent particles to the ammonium salt of about 1:1 to about 1:5.

Embodiment 81 provides the method of any one of Embodiments 1-80, wherein the promoted ammonium salt-protected activated carbon sorbent particles are ammonium salt-protected prior to addition to the mercury-containing gas stream.

Embodiment 82 provides the method of any one of Embodiments 77-81, wherein the ammonium salt-protection of the promoted activated carbon sorbent particles or of precursor activated carbon sorbent particles occurs in-flight in the mercury-containing gas stream.

Embodiment 83 provides the method of any one of Embodiments 77-82, wherein the ammonium salt-protection of the promoted activated carbon sorbent particles or of precursor activated carbon sorbent particles occurs prior to addition of the promoted activated carbon sorbent particles to the mercury-containing gas stream.

Embodiment 84 provides the method of any one of Embodiments 77-83, further comprising combusting coal that comprises the ammonium salt.

Embodiment 85 provides the method of any one of Embodiments 77-84, further comprising injecting into the mercury-containing gas stream the ammonium salt.

Embodiment 86 provides the method of Embodiment 85, wherein the ammonium salt is added together with the promoted activated carbon sorbent particles or precursor activated carbon sorbent particles into the mercury-containing gas stream.

Embodiment 87 provides the method of any one of Embodiments 85-86, wherein the ammonium salt is added into the mercury-containing gas stream separately from addition of the promoted activated carbon sorbent particles or precursor activated carbon sorbent particles into the mercury-containing gas stream.

Embodiment 88 provides the method of any one of Embodiments 77-87, wherein the ammonium salt is an ammonium halide, a methylammonium halide, an ammonium salt of an oxyacid of a Group VI element, an ammonium salt of an oxyacid of a Group V element, or a combination thereof.

Embodiment 89 provides the method of any one of Embodiments 77-88, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

Embodiment 90 provides the method of any one of Embodiments 77-89, wherein the ammonium salt is ammonium sulfate.

Embodiment 91 provides the method of any one of Embodiments 77-90, wherein the ammonium salt has a particle size of about 0.1 µm to about 1000 µm.

Embodiment 92 provides the method of any one of Embodiments 77-91, wherein the ammonium salt has a particle size of about 0.1 µm to about 10 µm.

Embodiment 93 provides the method of any one of Embodiments 1-92, wherein contacting the mercury-containing gas stream with the activated carbon sorbent comprising promoted ammonium salt-protected activated carbon sorbent particles to form the mercury-sorbent composition comprises chemically reacting the mercury in the mercury-containing gas stream with the promoted ammonium salt-protected activated carbon sorbent.

Embodiment 94 provides the method of any one of Embodiments 1-93, wherein the promoted ammonium salt-protected activated carbon sorbent particles comprise active sites, wherein the active sites comprise halide anions bound to the sorbent particles.

Embodiment 95 provides the method of any one of Embodiments 1-94, wherein the promoted ammonium salt-protected activated carbon sorbent particles comprise active sites, wherein the active sites comprise carbocations bound to halide anions.

Embodiment 96 provides the method of any one of Embodiments 1-95, wherein carbocations in the promoted ammonium salt-protected activated carbon sorbent particles accept electrons from mercury atoms of the mercury-sorbent particulate.

Embodiment 97 provides the method of any one of Embodiments 1-96, wherein in the promoted ammonium salt-protected activated carbon sorbent particles ammonia or an anionic ammonium counterion derived from the ammonium salt intercepts $SO_2$, $SO_3$, $NO_x$, selenates, or a combination thereof, in the mercury-containing gas stream, preventing reaction thereof with active carbon sites in the promoted ammonium salt-protected activated carbon.

Embodiment 98 provides the method of any one of Embodiments 1-97, wherein ammonia or an anionic ammonium counterion derived from the ammonium salt intercepts $SO_3$ in the mercury-containing gas stream, preventing reaction thereof with active carbon sites in the promoted ammonium salt-protected activated carbon.

Embodiment 99 provides the method of any one of Embodiments 1-98, wherein the separating at least some of the mercury-sorbent composition from the mercury-containing gas stream comprises separating in a particulate separator.

Embodiment 100 provides the method of Embodiment 99, wherein the particulate separator comprises an electrostatic precipitator (ESP), a baghouse, a wet scrubber, a filter, cyclone, fabric separator, or any combination thereof.

Embodiment 101 provides the method of any one of Embodiments 1-100, further comprising regenerating the mercury-sorbent composition to give a regenerated activated carbon sorbent.

Embodiment 102 provides the method of any one of Embodiments 1-101, wherein the contacting, the separating, or a combination thereof, occurs in an aqueous scrubber.

Embodiment 103 provides the method of Embodiment 102, wherein the scrubber comprises an aqueous slurry that comprises the activated carbon sorbent.

Embodiment 104 provides a method for separating mercury from a mercury-containing gas stream, the method comprising:
  contacting a mercury-containing gas stream with an activated carbon sorbent comprising HBr-promoted ammonium sulfate-protected activated carbon sorbent particles, to form a mercury-sorbent composition; and
  separating at least some of the mercury-sorbent composition from the mercury-containing gas stream, to give a separated gas.

Embodiment 105 provides ammonium salt-protected activated carbon sorbent particles comprising
  active sites that bind with mercury atoms, wherein the active sites comprise carbocations bound to promoter anions, and
  ammonia, an ammonium salt, or a combination thereof, in at least a surface layer thereof.

Embodiment 106 provides the ammonium salt-protected activated carbon sorbent particles of Embodiment 105, wherein the ammonium salt-protected activated carbon sorbent particles are promoted ammonium salt-protected activated carbon sorbent particles comprising active sites that bind with mercury atoms, wherein the active sites comprise carbocations bound to promoter anions.

Embodiment 107 provides the ammonium salt-protected activated carbon sorbent particles of any one of Embodiments 105-106, wherein the promoted ammonium salt-protected activated carbon sorbent particles further comprise an anionic counterion.

Embodiment 108 provides the ammonium salt-protected activated carbon sorbent particles of any one of Embodiments 106-107, wherein the anionic counterion is derived from the ammonium salt.

Embodiment 109 provides a method of making the ammonium salt-protected activated carbon particles of any one of Embodiments 105-108, the method comprising:
  subjecting a mixture comprising a precursor activated carbon sorbent and an ammonium salt to heating, microwaving, irradiation, or a combination thereof, to form an activated carbon sorbent comprising the ammonium salt-protected activated carbon sorbent particles.

Embodiment 110 provides the method of Embodiment 109, wherein the precursor activated carbon sorbent is a promoted activated carbon sorbent.

Embodiment 111 provides the method of any one of Embodiments 109-110, further comprising promoting an activated carbon with a promoter to provide the precursor activated carbon sorbent.

Embodiment 112 provides a method for separating mercury from a mercury-containing gas stream, the method comprising:
  contacting a mercury-containing gas stream with an activated carbon sorbent comprising promoted or non-promoted activated carbon sorbent particles and ammonia, to form a mercury-sorbent composition; and
  separating at least some of the mercury-sorbent composition from the mercury-containing gas stream, to give a separated gas.

Embodiment 113 provides the method of Embodiment 112, wherein the ammonia or a precursor thereof is injected into the mercury-containing gas stream.

Embodiment 114 provides the method or sorbent of any one or any combination of Embodiments 1-113 optionally configured such that all elements or options recited are available to use or select from.

What is claimed is:

1. A method for separating mercury from a mercury-containing gas stream, the method comprising:
  combusting coal in a combustion chamber, to provide the mercury-containing gas stream comprising $Br^-$, HBr, HI, $I^-$ or a combination thereof, wherein
    the coal comprises an additive comprising $Br_2$, a bromide, HBr, $I_2$, an iodide, HI, or a combination thereof, added to the coal before the coal enters the combustion chamber, or
    the combustion chamber comprises an additive comprising $Br_2$, a bromide, HBr, $I_2$, an iodide, HI, or a combination thereof, or
    a combination thereof;
  injecting an ammonium salt into the mercury-containing gas stream;
  injecting activated carbon sorbent into the mercury-containing gas stream at or downstream of the injection of the ammonium salt into the mercury-containing gas stream, to add the $Br^-$, HBr, HI, $I^-$ or the combination thereof from the mercury-containing gas stream to the activated carbon, wherein the $Br^-$, HBr, HI, $I^-$, or the combination thereof is 0.1 wt % to 30 wt % of the activated carbon sorbent in the mercury-containing gas stream;

contacting the mercury-containing gas stream with the activated carbon sorbent, to form a mercury-sorbent composition; and separating at least some of the mercury-sorbent composition from the mercury-containing gas stream, to give a separated gas.

2. The method of claim 1, wherein the mercury-containing gas stream further comprises an added mercury-stabilizing reagent selected from the group consisting of S, Se, $H_2S$, $SO_2$, $H_2Se$, $SeO_2$, $CS_2$, $P_2S_5$, and combinations thereof.

3. The method of claim 1, wherein at or downstream of the injection of the activated carbon into the mercury-containing gas stream, the activated carbon comprises ammonia, the ammonium salt, or a combination thereof.

4. The method of claim 1, wherein at or downstream of the injection of the activated carbon into the mercury-containing gas stream, the activated carbon comprises an anionic counterion of the ammonium salt.

5. The method of claim 1, wherein the additive comprises HBr, HI, $Br_2$, BrCl, IBr, ICl, $PBr_3$, $Al_2Br_6$, $FeI_x$ (x =1, 2, 3, or 4), $FeBr_y$ (y=1, 2, 3, or 4), $MnBr_2$, $NiBr_2$, $NiI_2$, $ZnBr_2$, $ZnI_2$, $NH_4Br$, $NH_4I$, $NH_4F$, or a combination thereof.

6. The method of claim 1, wherein the additive comprises NaBr, NaI, Br',I', KI, LiBr, $CuBr_2$, AgBr, $CHI_3$, $CH_3Br$, AuBr, $FeI_x$ (x=1, 2, 3, or 4), $FeBr_y$ (y=1, 2, 3, or 4), $MgBr_2$, $MnBr_2$, $NiBr_2$, $NiI_2$, $ZnBr_2$, $ZnI_2$, $CaBr_2$, or a combination thereof.

7. The method of claim 1, further comprising
at or downstream of the injection of the activated carbon into the mercury-containing gas stream, protecting promoted activated carbon sorbent with the ammonium salt, or
at or downstream of the injection of the activated carbon into the mercury-containing gas stream, protecting unpromoted activated carbon sorbent with the ammonium salt to form unpromoted ammonium salt-protected activated carbon sorbent, and promoting the unpromoted ammonium salt-protected activated carbon sorbent, or
a combination thereof.

8. The method of claim 1, wherein the ammonium salt is an ammonium halide, a methylammonium halide, an ammonium salt of an oxyacid of a Group VI element, an ammonium salt of an oxyacid of a Group V element, or a combination thereof.

9. The method of claim 1, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, or a combination thereof.

10. A method for separating mercury from a mercury-containing gas stream, the method comprising:

combusting coal in a combustion chamber, to provide the mercury-containing gas stream comprising Br', HBr, or a combination thereof, wherein
the coal comprises an NaBr additive, a $CaBr_2$ additive, or a combination thereof, added to the coal before the coal enters the combustion chamber, or
the combustion chamber comprises an NaBr additive, a $CaBr_2$ additive, or a combination thereof, or
a combination thereof;

injecting ammonium bromide, ammonium sulfate, or a combination thereof into the mercury-containing gas stream;

injecting activated carbon sorbent into the mercury-containing gas stream at or downstream of the injection of the ammonium bromide or ammonium sulfate into the mercury-containing gas stream, to add the $Br^-$, HBr, or the combination thereof from the mercury-containing gas stream to the activated carbon, wherein the $Br^-$, HBr, or the combination thereof is 0.1 wt % to 30 wt % of the activated carbon sorbent in the mercury-containing gas stream;

contacting a mercury-containing gas stream with the activated carbon sorbent, to form a mercury-sorbent composition; and separating at least some of the mercury-sorbent composition from the mercury-containing gas stream, to give a separated gas.

11. The method of claim 1, wherein at or downstream of the injection of the activated carbon into the mercury-containing gas stream, the activated carbon sorbent comprises
active sites that bind with mercury atoms, wherein the active sites comprise carbocations bound to $I^-$, $Br^-$, or a combination thereof, and
ammonia, an ammonium salt, an anionic counterion of the ammonium salt, or a combination thereof, in at least a surface layer thereof.

12. The method of claim 1, further comprising
subjecting a mixture comprising the activated carbon sorbent and the ammonium salt to heating, microwaving, irradiation, or a combination thereof, wherein the injecting of the activated carbon and the ammonium salt into the mercury-containing gas comprises injecting the heated, microwaved, or irradiated mixture of the activated carbon sorbent and the ammonium salt together into the mercury-containing gas.

13. The method of claim 1, wherein the ammonium salt comprises an ammonium halide, wherein the additive on the coal or in the combustion chamber comprises $CaBr_2$, NaBr, $CaI_2$, KI, NaI, or a combination thereof.

14. The method of claim 1, wherein the ammonium salt comprises ammonium bromide, wherein the additive on the coal or in the combustion chamber comprises $CaBr_2$, NaBr, $CaI_2$, KI, NaI, or a combination thereof.

15. A method for separating mercury from a mercury-containing gas stream, the method comprising:
combusting coal in a combustion chamber, to provide the mercury-containing gas stream comprising $Br^-$, HBr, HI, $I^-$or a combination thereof, wherein
the coal comprises an additive comprising $Br_2$, a bromide, HBr, $I_2$, an iodide, HI, or a combination thereof, added to the coal before the coal enters the combustion chamber, or
the combustion chamber comprises an additive comprising $Br_2$, a bromide, HBr, $I^2$, an iodide, HI, or a combination thereof, or a combination thereof;

injecting an ammonium salt into the mercury-containing gas stream;

injecting activated carbon sorbent into the mercury-containing gas stream at or downstream of the injection of the ammonium salt into the mercury-containing gas stream, to add the $Br^-$, HBr, HI, $I^-$, or the combination thereof from the mercury-containing gas stream to the activated carbon, wherein the $Br^-$, HBr, HI, $I^-$, or the combination thereof is 1 wt % to 30 wt % of the activated carbon sorbent in the mercury-containing gas stream;

contacting the mercury-containing gas stream with the activated carbon sorbent, to form a mercury-sorbent composition; and separating at least some of the mercury-sorbent composition from the mercury-containing gas stream, to give a separated gas.

16. The method of claim 1, further comprising:

modifying, in response to a measured mercury content, an injection rate of injecting the activated carbon sorbent into the mercury-containing gas stream.

* * * * *

UNITED STATES PATENT AND TRADEMARK OFFICE
CERTIFICATE OF CORRECTION

Page 1 of 3

PATENT NO. : 10,828,596 B2
APPLICATION NO. : 15/382114
DATED : November 10, 2020
INVENTOR(S) : Olson et al.

It is certified that error appears in the above-identified patent and that said Letters Patent is hereby corrected as shown below:

On the Title Page

In Column 1, under "Related U.S. Application Data", Line 1, delete "(60)" and insert --(63)-- therefor On page 5, in Column 2, Item (56), under "Other Publications", Lines 21-22, delete "Feb. 27, 2017"," and insert --Feb. 7, 2017",-- therefor On page 7, in Column 1, Item (56), under "Other Publications", Line 39, Delete ""CO2" and insert --"$CO_2$-- therefor On page 7, in Column 2, Item (56), under "Other Publications", Line 43, delete "SiO2-TiO2" and insert --$SiO_2$-$TiO_2$-- therefor On page 7, in Column 2, Item (56), under "Other Publications", Line 52, delete "AlCl3"," and insert --$AlCl_3$",-- therefor On page 8, in Column 1, Item (56), under "Other Publications", Line 7, delete "CO2" and insert --$CO_2$-- therefor On page 8, in Column 1, Item (56), under "Other Publications", Line 32, delete "Researcg"," and insert --Research",-- therefor On page 8, in Column 1, Item (56), under "Other Publications", Line 37, delete "CeO-WO3/TiO2" and insert --$CeO_2$-$WO_3$/$TiO_2$-- therefor On page 8, in Column 1, Item (56), under "Other Publications", Line 45, delete ""Effectsof" and insert --"Effects of-- therefor Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*

On page 8, in Column 1, Item (56), under "Other Publications", Line 46, delete "Reducton" and insert --Reduction-- therefor On page 9, in Column 2, Item (56), under "Other Publications", Line 72, delete "SHeet"," and insert --Sheet",-- therefor On page 10, in Column 1, Item (56), under "Other Publications", Line 1, delete ""Fluegas" and insert --"Flue gas-- therefor In the Specification In Column 9, Line 48, delete "$HSO_4^{1-}$," and insert --$HSO_4^{-1}$,-- therefor In Column 9, Line 55, "$HSO_4^{1-}$," and insert --$HSO_4^{-1}$,-- therefor In Column 11, Line 38, delete "NHBr," and insert --$NH_4Br$,-- therefor In Column 11, Line 38, Delete "NHsI," and insert --$NH_4I$,-- therefor In Column 15, Line 3, delete "H2SO4+SO3→$H_2S_2O_7$(pyrosulfuric acid)+$NH_3$" and insert --$H_2SO_4$+$SO_3$→$H_2S_2O_7$(pyrosulfuric acid)+$NH_3$-- therefor In Column 15, Line 5, delete "H2S2O7+$NH_3$→$(NH_4)_2S_2O_7$(ammonium pyrosulfate)" and insert --$H_2S_2O_7$+$NH_3$→$(NH_4)_2S_2O_7$(ammonium pyrosulfate)-- therefor In Column 16, Line 19, delete "device (s)" and insert --device(s)-- therefor In Column 17, Lines 54-55, delete "component (s)" and insert --component(s)-- therefor In Column 17, Line 62, delete "component (s)" and insert --component(s)-- therefor In Column 23, Lines 43-44, delete "(11 $g/m^3$)" and insert --(11 $\mu g/m^3$)-- therefor In Column 24, Line 27, delete "μg/m3" and insert --$\mu g/m^3$-- therefor In Column 25, Line 37, delete "$Br_2$W-AC." and insert --Br2W-AC.-- therefor In Column 38, Line 49, delete "H2Se," and insert --$H_2Se$,-- therefor In Column 41, Line 27, delete "$HSO_4^{1-}$," and insert --$HSO_4^{-1}$,-- therefor In Column 43, Line 9, delete "NHBr," and insert --$NH_4Br$,-- therefor In the Claims In Column 46, Line 48, in Claim 1, delete "I-" and insert --I$^-$,-- therefor

CERTIFICATE OF CORRECTION (continued)
U.S. Pat. No. 10,828,596 B2

In Column 46, Line 62, in Claim 1, delete "I"" and insert --I$^-$,-- therefor

In Column 47, Line 22, in Claim 5, after "PBr$_3$,", insert --CuBr$_2$,--

In Column 47, Line 26, in Claim 6, delete "Br',I'," and insert --Br$^-$, I$^-$,-- therefor In Column 47, Line 28, in Claim 6, after "ZnI$_2$,", insert --CaI$_2$,--

In Column 48, Line 2, in Claim 10, delete "Br'," and insert --Br$^-$,-- therefor In Column 48, Line 60, in Claim 15, delete "I'or" and insert --I$^-$, or-- therefor In Column 48, Line 66, in Claim 15, delete "I$^2$," and insert --I$_2$,-- therefor